United States Patent
Kim et al.

(10) Patent No.: US 12,231,524 B2
(45) Date of Patent: Feb. 18, 2025

(54) METHOD AND APPARATUS FOR COMPRESSING HEADER TO SUPPORT HIGHLY RELIABLE LOW-LATENCY TERMINAL IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Anil Agiwal, Suwon-si (KR); Sangkyu Baek, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 623 days.

(21) Appl. No.: 17/277,488

(22) PCT Filed: Oct. 11, 2019

(86) PCT No.: PCT/KR2019/013342
§ 371 (c)(1),
(2) Date: Mar. 18, 2021

(87) PCT Pub. No.: WO2020/080749
PCT Pub. Date: Apr. 23, 2020

(65) Prior Publication Data
US 2022/0038560 A1    Feb. 3, 2022

(30) Foreign Application Priority Data

Oct. 17, 2018  (KR) .................... 10-2018-0124046
Mar. 27, 2019  (KR) .................... 10-2019-0035182
(Continued)

(51) Int. Cl.
*H04L 69/22*    (2022.01)

(52) U.S. Cl.
CPC .................................. *H04L 69/22* (2013.01)

(58) Field of Classification Search
CPC .............................. H04L 69/22; H04L 67/141
See application file for complete search history.

(56) References Cited

U.S. PATENT DOCUMENTS 7,190,284 B1 * 3/2007 Dye ...................... G06F 12/023
                                                   711/170
8,081,662 B2 * 12/2011 Chun ..................... H04L 69/22
                                                   370/437
(Continued)

FOREIGN PATENT DOCUMENTS

CN    103825869 A    5/2014
CN    106332178 A    1/2017
(Continued)

OTHER PUBLICATIONS

CMCC, 'Enhancement for Time-Sensitive Networking', R2-1815270, 3GPP TSG-RAN WG2 Meeting #103bis, Chengdu, China, Sep. 28, 2018.
(Continued)

*Primary Examiner* — Khaled M Kassim
(74) *Attorney, Agent, or Firm* — Jefferson IP Law, LLP

(57) ABSTRACT

The present disclosure relates to a communication scheme and system for combining an IoT technology with a 5G communication system for supporting a higher data transfer rate beyond a 4G system. The present disclosure may be applied to intelligent services (e.g. smart home, smart building, smart city, smart car or connected car, health care, digital education, retail, and security and safety services) on the basis of a 5G communication technology and an IoT-related technology. The present disclosure provides a method and an apparatus for supporting compression and decompression of an Ethernet header.

16 Claims, 28 Drawing Sheets

(30) Foreign Application Priority Data

| | | |
|---|---|---|
| May 21, 2019 | (KR) | 10-2019-0059702 |
| Aug. 23, 2019 | (KR) | 10-2019-0103989 |
| Oct. 10, 2019 | (KR) | 10-2019-0125296 |

(56) References Cited

U.S. PATENT DOCUMENTS

| | | | |
|---|---|---|---|
| 2001/0054131 A1* | 12/2001 | Alvarez, II | H03M 7/40 711/170 |
| 2005/0271066 A1 | 12/2005 | Valadarsky | |
| 2007/0070913 A1* | 3/2007 | Kallio | H04L 69/32 370/252 |
| 2009/0201875 A1* | 8/2009 | Hasegawa | H04W 72/569 370/329 |
| 2010/0202476 A1 | 8/2010 | Chun et al. | |
| 2014/0074805 A1* | 3/2014 | Kapoor | G06F 16/902 707/693 |
| 2014/0369365 A1 | 12/2014 | Denio et al. | |
| 2016/0255675 A1 | 9/2016 | Van Lieshout et al. | |
| 2017/0257796 A1* | 9/2017 | Hsu | H04L 69/04 |
| 2017/0288821 A1* | 10/2017 | Baek | H04L 1/1635 |
| 2017/0353973 A1* | 12/2017 | Dinan | H04L 5/0053 |
| 2018/0227793 A1 | 8/2018 | Kim et al. | |
| 2019/0116521 A1* | 4/2019 | Qiao | H04L 69/04 |
| 2019/0124572 A1* | 4/2019 | Park | H04W 80/10 |
| 2022/0014966 A1* | 1/2022 | Kim | H04L 69/04 |
| 2022/0279380 A1* | 9/2022 | Hori | H04W 4/70 |

FOREIGN PATENT DOCUMENTS

| | | |
|---|---|---|
| CN | 107172662 A | 9/2017 |
| EP | 2 854 359 A2 | 4/2015 |
| KR | 10-2013-0134727 A | 12/2013 |

OTHER PUBLICATIONS

Ericsson, 'Ethernet Header Compression', R2-1814811, 3GPP TSG-RAN WG2 #103bis, Chengdu, China, Sep. 28, 2018.

Vivo, 'Consideration on Ethernet header compression for supporting IIOT', R2-1814273, 3GPP TSG-RAN WG2 Meeting #103bis, Chengdu, China, Sep. 28, 2018.

Ericsson, 'On the scope of study for NR Industrial IoT study', RP-181882, 3GPP TSG-RAN #81, Gold Coast, Australia, Sep. 3, 2018.

Indian Office Action dated Dec. 16, 2022, issued in Indian Patent Application No. 202117016583.

Extended European Search Report dated Oct. 12, 2021, issued in European Patent Application No. 19873944.3-1215.

Chinese Office Action dated Dec. 5, 2023, issued in Chinese Patent Application No. 201980068696.2.

* cited by examiner

METHOD AND APPARATUS FOR COMPRESSING HEADER TO SUPPORT HIGHLY RELIABLE LOW-LATENCY TERMINAL IN NEXT GENERATION MOBILE COMMUNICATION SYSTEM

TECHNICAL FIELD

The disclosure relates to a method and an apparatus for compressing a header to support a highly-reliable low-latency terminal in a next-generation mobile communication system and, more particularly, to a method and an apparatus for supporting Ethernet header compression and decompression.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, there is a need to efficiently support a service regarding a highly-reliable low-latency terminal in a next-generation mobile communication system, and there has accordingly been ongoing discussion regarding various schemes for accomplishing the same.

DISCLOSURE OF INVENTION

Technical Problem

In a next-generation mobile communication system, it is necessary to efficiently use transmission resources in order to support a service requiring low latency and high reliability (for example, ultra-reliable low-latency communication (URLLC) or industrial IoT (IIoT) service).

Solution to Problem

A method of a transmission apparatus according to an embodiment for solving the above-mentioned problems includes: receiving a packet data convergence protocol (PDCP) service data unit (SDU) from an upper layer; performing an Ethernet header compression on an Ethernet header included in the PDCP SDU; placing a header including information related to the Ethernet header compression in front of the compressed Ethernet header to generate a PDCP protocol data unit (PDU); and transferring the PDCP PDU to a lower layer.

A method of a reception apparatus according to an embodiment for solving the above-mentioned problems includes: receiving a packet data convergence protocol (PDCP) protocol data unit (PDU) from a lower layer; and identifying a PDCP service data unit (SDU) and a header related to an Ethernet header compression from the PDCU PDU, wherein the header includes information related to an Ethernet header compression performed on an Ethernet header included in the PDCP SDU, and is located in front of the compressed Ethernet header.

A transmission apparatus according to an embodiment for solving the above-mentioned problems includes: a transceiver configured to transmit and receive a signal; and a controller configured to: receive a packet data convergence protocol (PDCP) service data unit (SDU) from an upper layer; perform an Ethernet header compression on an Ethernet header included in the PDCP SDU; place a header including information related to the Ethernet header compression in front of the compressed Ethernet header to generate a PDCP protocol data unit (PDU); and transfer the PDCP PDU to a lower layer.

A reception apparatus according to an embodiment for solving the above-mentioned problems includes: a transceiver configured to transmit and receive a signal; and a controller configured to: receive a packet data convergence protocol (PDCP) protocol data unit (PDU) from a lower layer; and identify a PDCP service data unit (SDU) and a header related to an Ethernet header compression from the PDCU PDU, wherein the header includes information related to an Ethernet header compression performed on an Ethernet header included in the PDCP SDU, and is located in front of the compressed Ethernet header.

Advantageous Effects of Invention

The disclosure proposes a method for compressing and decompressing an Ethernet header in a next-generation mobile communication system that uses an Ethernet protocol such that transmission resources can be used efficiently.

BRIEF DESCRIPTION OF DRAWINGS

FIG. 1O is a diagram illustrating operations of transmission and reception SDAP layer devices or PDCP layer devices according to an embodiment of the disclosure;

MODE FOR THE INVENTION

Figure 1A:
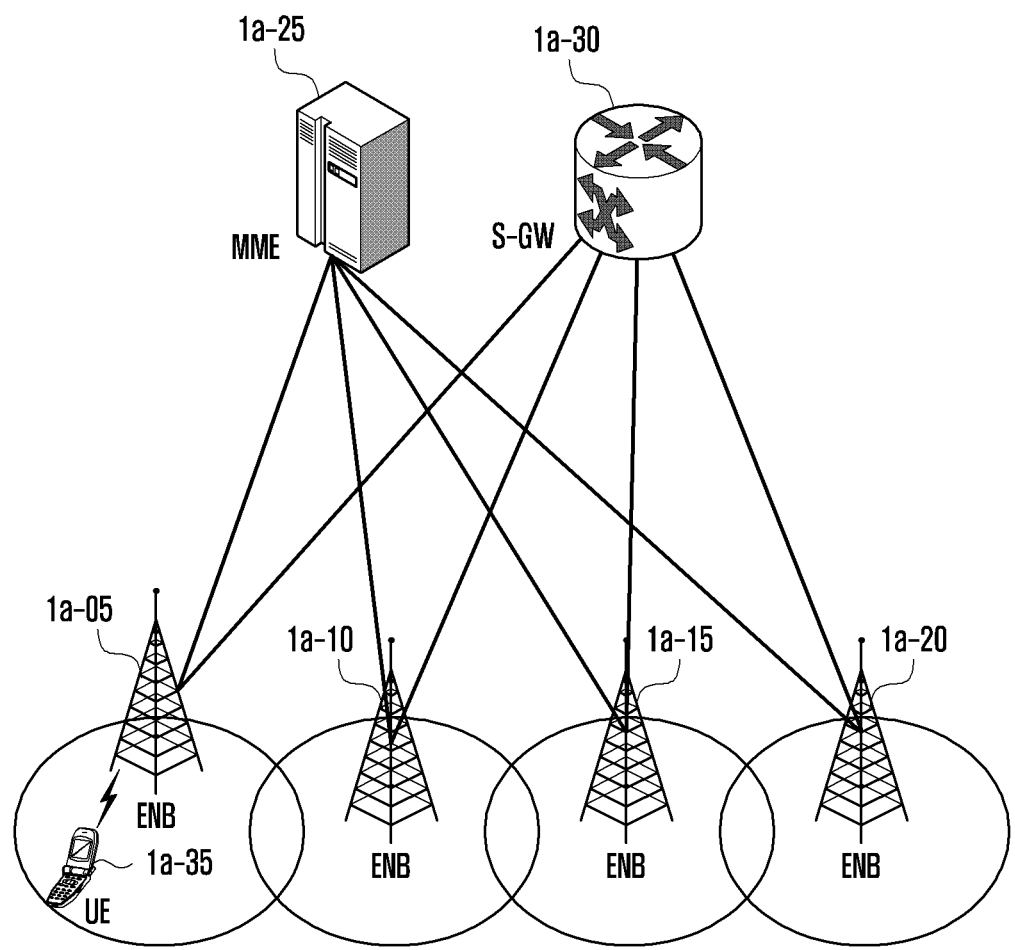
FIG. 1A is a diagram illustrating a structure of an LTE system to which an embodiment of the disclosure may be applied.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description of the disclosure, a detailed description of known functions or configurations will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

In the disclosure, a transmitting end refers to a device that transmits data, and may include a base station, a terminal, a network entity, and a transmission PDCP layer device. Further, in the disclosure, a receiving end refers to a device that receives data, and may include a base station, a terminal, a network entity, and a reception PDCP layer device.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

The disclosure relates to a method and an apparatus for supporting compression and decompression of an Ethernet header in a next generation mobile communication system.

The disclosure proposes a method for compressing and decompressing an Ethernet header in a next generation mobile communication system using an Ethernet protocol. Through the Ethernet header compression and decompression method proposed in the disclosure, transmission resources can efficiently be used. Furthermore, by using the method proposed in the disclosure, fewer transmission resources can enable the transmission of more data, and the use of a modulation method with higher reliability. Therefore, high reliability and low latency can be ensured.

Embodiment 1

FIG. 1A is a diagram illustrating a structure of an LTE system to which an embodiment of the disclosure may be applied.

Referring to FIG. 1A, as illustrated, a wireless access network of an LTE system may include next generation base stations (evolved node Bs, hereinafter, ENBs, Node Bs, or base stations) 1a-05, 1a-10, 1a-15, and 1a-20, a mobility management entity (MME) 1a-25, and a serving gateway (S-GW) 1a-30. A user equipment (hereinafter, a UE or a terminal) 1a-35 accesses an external network through the ENBs 1a-05 to 1a-20 and the S-GW 1a-30.

In FIG. 1A, each of the ENBs 1a-05 to 1a-20 corresponds to a conventional node B of a universal mobile telecommunication system (UMTS). The ENBs are connected to the UE 1a-35 through a wireless channel and perform complex functions compared to a conventional node B. In the LTE system, all the user traffic including real-time services such as a voice over IP (VoIP), which is performed through the Internet protocol, is serviced through a shared channel.

Therefore, the LTE system requires a device configured to collect pieces of state information including a buffer state, an available transmission power state, and a channel state of UEs and perform scheduling, and the ENBs 1a-05 to 1a-20 serve as the device.

One ENB generally controls a plurality of cells. For example, the LTE system uses, as a wireless access technology, for example, orthogonal frequency division multiplexing (hereinafter, referred to as OFDM) in a bandwidth of 20 MHz in order to implement a transfer rate of 100 Mbps. Furthermore, the LTE system applies an adaptive modulation and coding (hereinafter, referred to as an AMC) scheme for determining a modulation scheme and a channel coding rate according to a channel state of a terminal. The S-GW 1a-30 is a device configured to provide a data bearer, and generates or removes a data bearer according to a control of the MME 1a-25. The MME is a device which is responsible for various control functions as well as a mobility management function for a terminal, and is connected to a plurality of base stations.

Figure 1B:
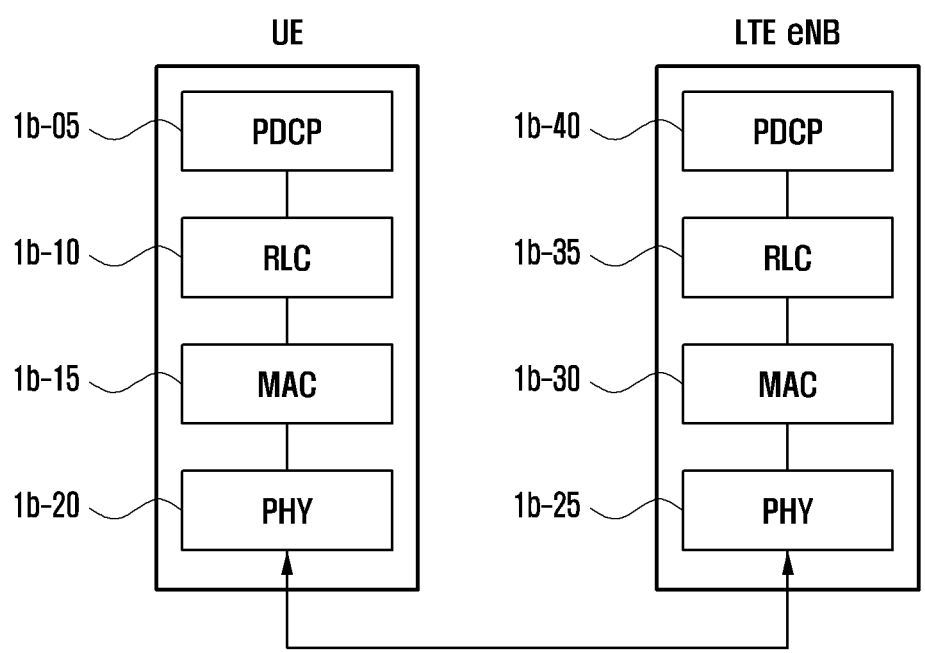
FIG. 1B is a diagram illustrating a wireless protocol structure in an LTE system to which an embodiment of the disclosure may be applied.

FIG. 1B is a diagram illustrating a wireless protocol structure in an LTE system to which an embodiment of the disclosure may be applied.

Referring to FIG. 1B, a wireless protocol of an LTE system includes packet data convergence protocols (PDCPs) 1b-05 and 1b-40, radio link controls (RLCs) 1b-10 and 1b-35, and medium access controls (MACs) 1b-15 and 1b-30 in a terminal and an ENB, respectively. Each of the packet data convergence protocols (PDCPs) 1b-05 and 1b-40 is configured to perform an operation of compressing/reconstructing an IP header. Main functions of the PDCPs are summarized as below.

- Header compression and decompression (ROHC only)
- Transfer of user data
- In-sequence delivery (In-sequence delivery of upper layer PDUs at PDCP re-establishment procedure for RLC AM)
- Reordering (For split bearers in DC (only support for RLC AM): PDCP PDU routing for transmission and PDCP PDU reordering for reception)
- Duplicate detection (Duplicate detection of lower layer SDUs at PDCP re-establishment procedure for RLC AM)
- Retransmission (Retransmission of PDCP SDUs at handover and, for split bearers in DC, of PDCP PDUs at PDCP data-recovery procedure, for RLC AM)
- Ciphering and deciphering
- Timer-based SDU discard (Timer-based SDU discard in uplink)

Each of the radio link controls (hereinafter, referred to as RLCs) 1b-10 and 1b-35 reconfigures a PDCP packet data unit (PDU) to have a proper size and then performs an ARQ operation. Main functions of the RLCs are summarized as below.

- Data transfer (Transfer of upper layer PDUs)
- ARQ (Error Correction through ARQ (only for AM data transfer))
- Concatenation, segmentation and reassembly (Concatenation, segmentation and reassembly of RLC SDUs (only for UM and AM data transfer))
- Re-segmentation (Re-segmentation of RLC data PDUs (only for AM data transfer))
- Reordering (Reordering of RLC data PDUs (only for UM and AM data transfer))
- Duplicate detection (Duplicate detection (only for UM and AM data transfer))
- Error detection (Protocol error detection (only for AM data transfer))
- RLC SDU discard (only for UM and AM data transfer)
- RLC re-establishment Each of the MACs 1b-15 and 1b-30 is connected to several RLC layer devices configured in a single terminal, and multiplexes RLC PDUs to a MAC PDU, and demultiplexes a MAC PDU to RLC PDUs. Main functions of the MACs are summarized as below.

- Mapping (Mapping between logical channels and transport channels)
- Multiplexing and demultiplexing (Multiplexing/demultiplexing of MAC SDUs belonging to one or different logical channels into/from transport blocks (TB) delivered to/from the physical layer on transport channels)
- Scheduling information reporting
- HARQ (Error correction through HARQ)
- Priority handling between logical channels (Priority handling between logical channels of one UE)
- Priority handling between UEs (Priority handling between UEs by means of dynamic scheduling)
- MBMS service identification
- Transport format selection
- Padding Each of physical layers 1b-20 and 1b-25 performs channel coding and modulation on upper layer data to make the data into an OFDM symbol and transmit the OFDM symbol through a wireless channel, or performs demodulation and channel decoding on an OFDM symbol received through a wireless channel, and then transfers the OFDM symbol to an upper layer.

Figure 1C:
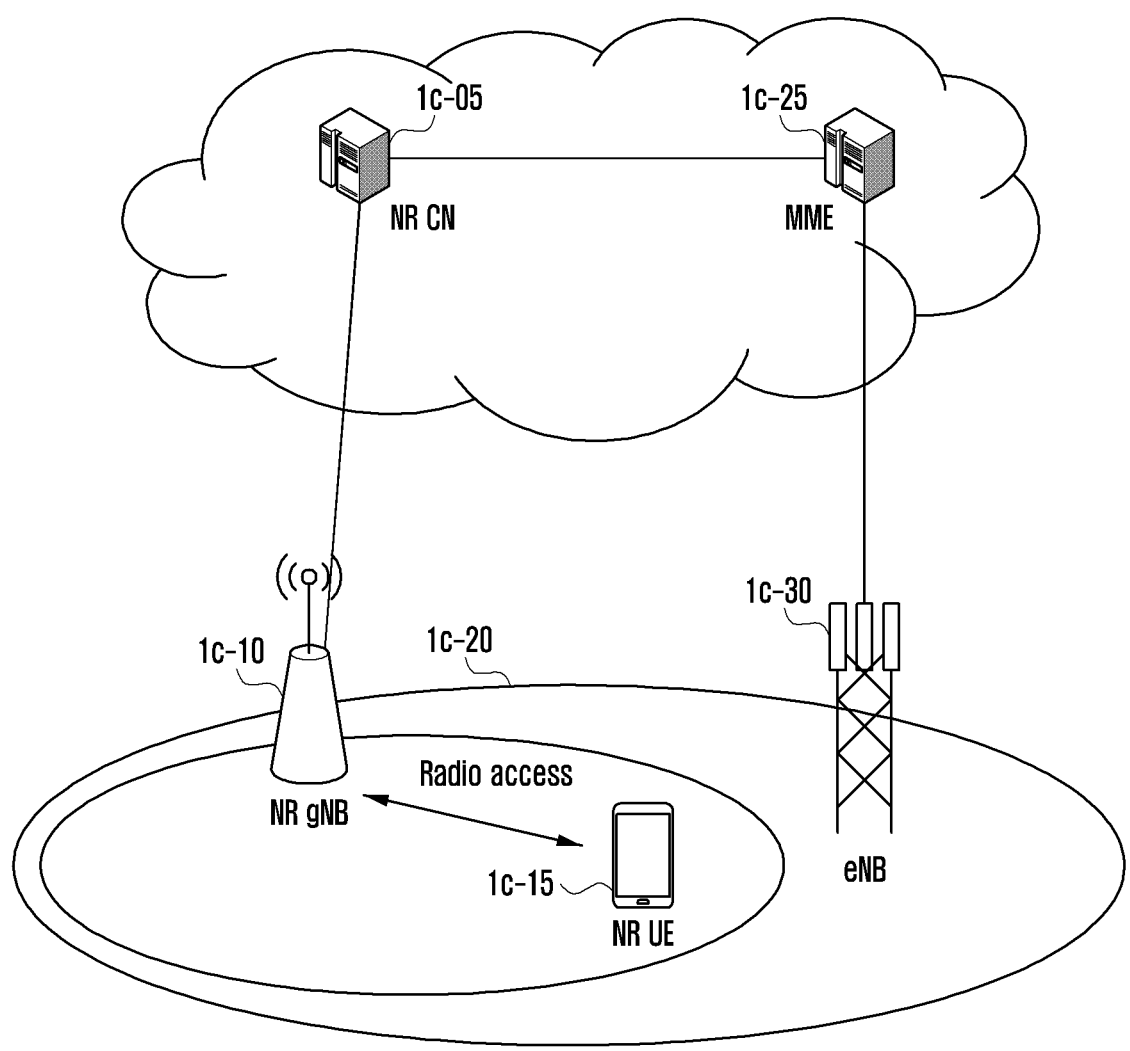
FIG. 1C is a diagram illustrating a structure of a next generation mobile communication system to which an embodiment of the disclosure may be applied.

FIG. 1C is a diagram illustrating a structure of a next generation mobile communication system to which an embodiment of the disclosure may be applied.

Referring to FIG. 1C, as illustrated, a wireless access network of a next generation mobile communication system (hereinafter, an NR system or a 5G system) includes a next generation base station (a new radio node B, hereinafter, an NR gNB or an NR base station) 1c-10, and a new radio core network (NR CN) 1c-05. A user terminal (a new radio user equipment, hereinafter, an NR UE or a terminal) 1c-15 accesses an external network through the NR gNB 1c-10 and the NR CN 1c-05.

In FIG. 1C, the NR gNB 1c-10 corresponds to an evolved node B (eNB) of a conventional LTE system. The NR gNB is connected to the NR UE 1c-15 through a wireless channel and may provide an outstanding service compared to a conventional node B. In the NR system, all the user traffic is serviced thorough shared channels. Therefore, the NR system requires a device configured to collect pieces of state information including a buffer state, an available transmission power state, and a channel state of UEs and perform scheduling, and the NR gNB 1c-10 serves as the device. One NR gNB generally controls a plurality of cells. In order to implement ultra-high-speed data transfer compared to the current LTE, the NR system may provide a bandwidth wider than the conventional maximum bandwidth, may employ an orthogonal frequency division multiplexing (hereinafter, referred to as OFDM) as a wireless access technology, and may additionally integrate a beamforming technology therewith. Furthermore, the NR system applies an adaptive modulation and coding (hereinafter, referred to as an AMC) scheme for determining a modulation scheme and a channel coding rate according to a channel state of a terminal. The NR CN 1c-05 performs functions such as mobility support, bearer configuration, and QoS configuration. The NR CN is a device which is responsible for various control functions as well as a mobility management function for a terminal, and is connected to a plurality of base stations. Also, the NR system may also be linked to a conventional LTE system, and the NR CN is connected to an MME 1c-25 through a network interface. The MME is connected to an eNB 1c-30 that is a conventional base station.

Figure 1D:
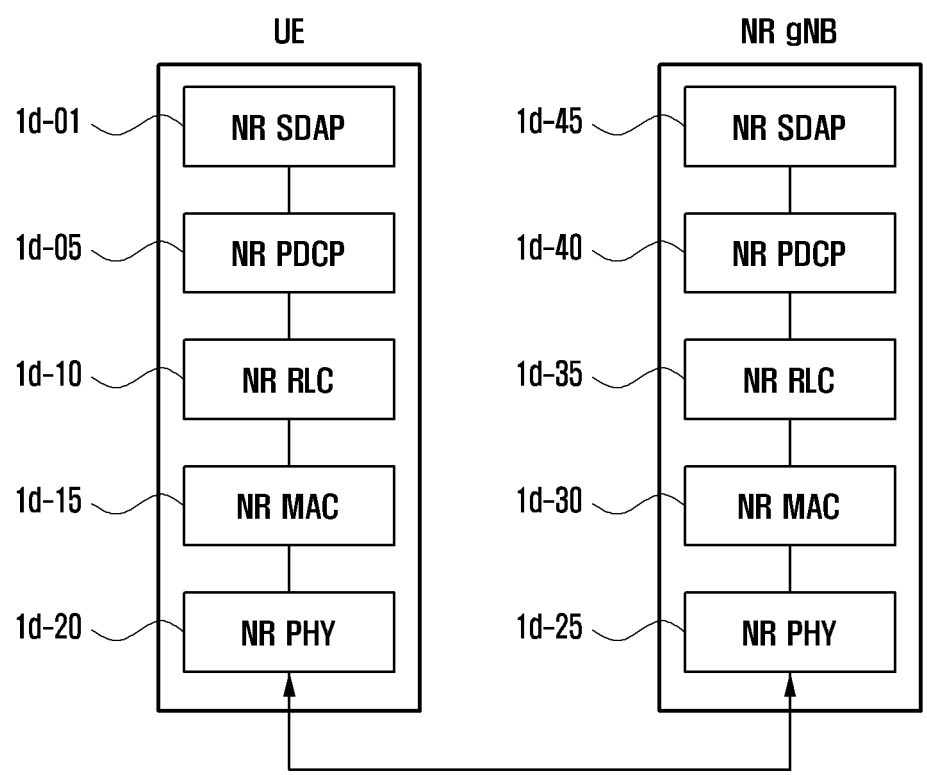
FIG. 1D is a diagram illustrating a wireless protocol structure of a next generation mobile communication system to which an embodiment of the disclosure may be applied.

FIG. 1D is a diagram illustrating a wireless protocol structure of a next generation mobile communication system to which an embodiment of the disclosure may be applied.

Referring to FIG. 1D, a wireless protocol of a next generation mobile communication system includes NR service data adaptation protocols (SDAPs) 1d-01 and 1d-45, NR PDCPs 1d-05 and 1d-40, NR RLCs 1d-10 and 1d-35, and NR MACs 1d-15 and 1d-30 in a terminal and an NR base station, respectively.

Main functions of the NR SDAPs 1d-01 and 1d-45 may include a part of functions below.
  Transfer of user data (transfer of user plane data)
  Mapping between a QoS flow and a data bearer (DRB) for both downlink (DL) and uplink (UL)
  Marking QoS flow ID in DL and UL (marking QoS flow ID in both DL and UL packets)
  Mapping a reflective QoS flow to a data bearer with respect to UL SDAP PDUs (reflective QoS flow to DRB mapping for the UL SDAP PDUs)

Whether to use a header of the SDAP layer device, or whether to use a function of the SDAP layer device may be configured for the terminal with respect to the SDAP layer device through an RRC message for each PDCP layer device, each bearer, or each logical channel. Furthermore, in a case where an SDAP header is configured, an NAS QoS reflective configuration one-bit indicator (NAS reflective QoS) and an As QoS reflective configuration one-bit indicator (As reflective QoS) of the SDAP header may instruct the terminal to update or reconfigure mapping information of a QoS flow and a data bearer for the uplink and downlink. The SDAP header may include QoS flow ID information indicating a QoS. The QoS information may be used as data processing priority, scheduling information, etc. for smoothly supporting services.

Main functions of the NR PDCPs 1d-05 and 1d-40 may include a part of functions below.
  Header compression and decompression (ROHC only)
  Transfer of user data
  In-sequence delivery (In-sequence delivery of upper layer PDUs)
  Out-of-sequence delivery (Out-of-sequence delivery of upper layer PDUs)
  Reordering (PDCP PDU reordering for reception)
  Duplicate detection (Duplicate detection of lower layer SDUs)
  Retransmission (Retransmission of PDCP SDUs)
  Ciphering and deciphering
  Timer-based SDU discard (Timer-based SDU discard in uplink)

The reordering function of the NR PDCP device may indicate a function of rearranging PDCP PDUs received from a lower layer, in an order based on a PDCP sequence number (SN). Further, the reordering function may include a function of transferring data to an upper layer according to a rearranged order, or may include a function of directly transferring data without considering order, may include a function of rearranging an order to record lost PDCP PDUs, may include a function of reporting the state of lost PDCP PDUs to a transmission side, and may include a function of requesting retransmission of lost PDCP PDUs.

Main functions of the NR RLCs 1d-10 and 1d-35 may include a part of functions below.
  Data transfer (Transfer of upper layer PDUs)
  In-sequence delivery (In-sequence delivery of upper layer PDUs)
  Out-of-sequence delivery (Out-of-sequence delivery of upper layer PDUs)
  ARQ (Error correction through ARQ)
  Concatenation, segmentation and reassembly (Concatenation, segmentation and reassembly of RLC SDUs)
  Re-segmentation (Re-segmentation of RLC data PDUs)
  Reordering (Reordering of RLC data PDUs)
  Duplicate detection
  Error detection (Protocol error detection)
  RLC SDU discard
  RLC re-establishment The in-sequence delivery function of the NR RLC device may indicate a function of transferring RLC SDUs received from a lower layer, to an upper layer in an order. Furthermore, the in-sequence delivery function may include a function of, if one original RLC SDU is divided into several RLC SDUs and then the RLC SDUs are received, reassembling the several RLC SDUs and transferring the reassembled RLC SDUs; may include a function of rearranging received RLC PDUs with reference to a RLC sequence number (SN) or a PDCP sequence number (SN); may include a function of rearranging an order to record lost RLC PDUs; may include a function of reporting the state of lost RLC PDUs to a transmission side; and may include a function of requesting retransmission of lost RLC PDUs. Moreover, the in-sequence delivery function may include a function of, if there is a lost RLC SDU, transferring only RLC SDUs before the lost RLC SDU, to an upper layer in an order; may include a function of, although there is a lost RLC SDU, if a predetermined timer is expired, transferring all the RLC SDUs received before the timer is started, to an upper layer in an order; or may include a function of, although there is a lost RLC SDU, if a predetermined timer is expired, transferring all the RLC SDUs received up to the current, to an upper layer in an order. In addition, the NR RLC device may process RLC PDUs in a reception order (an order in which the RLC PDUs have arrived, regardless of an order based on a sequence number) and then transfer the processed RLC PDUs to a PDCP device regardless of the order (out-of-sequence delivery). In a case of segments, the NR RLC device may receive segments stored in a buffer or to be received in the future, reconfigure the segments to be one whole RLC PDU, then process the RLC PDU, and transfer the processed RLC PDU to a PDCP device. The NR RLC layer may not include a concatenation function, and the concatenation function may be performed in an NR MAC layer or replaced with a multiplexing function of an NR MAC layer.

The out-of-sequence delivery function of the NR RLC device may indicate a function of immediately transferring RLC SDUs received from a lower layer, to an upper layer regardless of the order thereof. Furthermore, the out-of-sequence delivery function may include a function of, if one original RLC SDU is divided into several RLC SDUs and then the RLC SDUs are received, reassembling the several RLC SDUs and transferring the reassembled RLC SDUs; and may include a function of storing a RLC sequence number (SN) or a PDCP sequence number (SN) of received RLC PDUs and arranging an order to record lost RLC PDUs.

Each of the NR MACs 1*d*-15 and 1*d*-30 may be connected to several NR RLC layer devices configured in a single terminal, and main functions of the NR MACs may include a part of functions below.

Mapping (Mapping between logical channels and transport channels)

Multiplexing and demultiplexing (Multiplexing/demultiplexing of MAC SDUs)

Scheduling information reporting

HARQ (Error correction through HARQ)

Priority handling between logical channels (Priority handling between logical channels of one UE)

Priority handling between UEs (Priority handling between UEs by means of dynamic scheduling)

MBMS service identification

Transport format selection

Padding

Each of NR physical layers 1*d*-20 and 1*d*-25 may perform channel coding and modulation on upper layer data to make the data into an OFDM symbol and transmit the OFDM symbol through a wireless channel, or may demodulate and channel-decode an OFDM symbol received through a wireless channel, and then transfer the OFDM symbol to an upper layer.

In the disclosure, proposed is a method for compressing and decompressing an Ethernet header when an Ethernet protocol is used in a next generation mobile communication system.

Figure 1E:
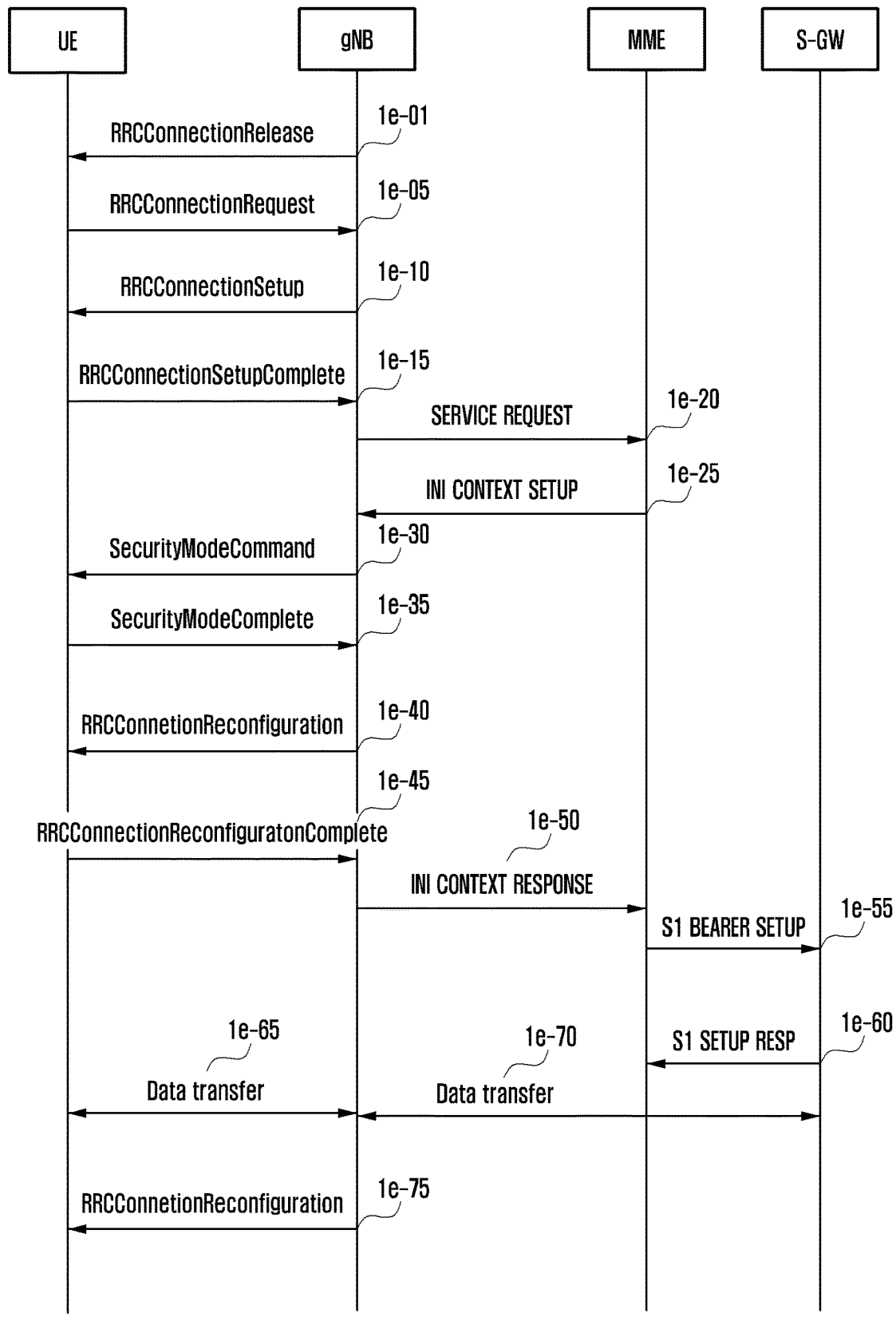
FIG. 1E is a diagram illustrating a procedure in which a base station configures Ethernet header protocol-related configuration information for a terminal when the terminal configures a connection with a network according to an embodiment of the disclosure.

FIG. 1E is a diagram illustrating a procedure in which a base station configures Ethernet header protocol-related configuration information for a terminal when the terminal configures a connection with a network according to an embodiment of the disclosure.

FIG. 1E illustrates a procedure in which a terminal switches an RRC idle mode or an RRC inactive mode (or lightly-connected mode) to an RRC connected mode, and configures a connection with a network, and illustrates a procedure in which a base station configures Ethernet protocol-related configuration information for the terminal. Specifically, the base station may indicate whether to perform an Ethernet header compression or decompression procedure in an SDAP layer device or a PDCP layer device, may indicate whether the same is to be used only for the uplink, the downlink, or both of them bidirectionally, and may configure the Ethernet header protocol-related configuration information only for a terminal having a terminal capability (UE capability) by which the terminal can use an Ethernet protocol, or a terminal having a terminal capability by which the terminal can use an Ethernet header compression and decompression procedure. When the terminal reports a terminal capability to the base station, the terminal may define a new indicator, and may report whether the terminal can use an Ethernet protocol, or whether the terminal can use an Ethernet header compression and decompression procedure, to the base station by using the indicator.

In FIG. 1E, when a terminal transmitting or receiving data in an RRC connected mode does not transmit or receive data due to a predetermined reason or during a predetermined time interval, a base station may transmit a RRCConnectionRelease message to the terminal to allow the terminal to be switched to an RRC idle mode or an RRC inactive mode (operation 1*e*-01). Thereafter, when data to be transmitted occurs, the terminal (hereinafter, an idle mode UE or an inactive UE), which is not currently connected, performs an RRC connection establishment process or an RRC Connection Resume procedure with the base station. The terminal establishes a reverse transmission synchronization with the base station through a random access process, and transmits an RRCConnectionRequest message (an RRCResumeRequest message for the Resume procedure) to the base station (operation 1*e*-05). The message contains an identifier of the terminal and a cause (establishmentCause) of configuring a connection.

The base station transmits an RRCConnectionSetup message (an RRCResume message for the Resume procedure) to the terminal so that the terminal configures an RRC connection (operation 1*e*-10). The message may include information indicating whether or not to use an Ethernet protocol or whether or not to use an Ethernet header compression and decompression procedure, for each logical channel (logicalchannelconfig), each bearer, each PDCP device (PDCP-config), or each SDAP layer device. More specifically, the base station may indicate whether or not to use the Ethernet protocol or whether to use the Ethernet header compression and decompression procedure only for an IP flow or a QoS flow in each logical channel, each bearer, or each PDCP device (or SDAP device) (the base station may configure, for an SDAP device, information on an IP flow or a QOS flow for which the Ethernet protocol is or is not to be used, or for which the Ethernet header compression method is or is not to be used, so that the SDAP device may instruct a PDCP device on whether or not to apply the Ethernet protocol or whether or not to use the Ethernet header compression method, for each QoS flow. In another method, an SDAP layer device or a PDCP device may identify each QoS flow by itself, and determine whether or not to apply the Ethernet protocol or whether or not to apply the Ethernet header compression method).

Furthermore, if the base station indicates whether or not to apply the Ethernet protocol or indicates that the Ethernet header compression method be used, the base station may indicate an identifier for a pre-defined library or dictionary to be used in connection with the Ethernet header compression method (or whether or not to apply the Ethernet protocol), or the size of a buffer to be used therefor. In addition, the message may include a command for setting up or releasing execution of the Ethernet header compression method or determination regarding whether or not to apply the Ethernet protocol. In addition, when the base station configures whether or not to apply the Ethernet protocol or use of the Ethernet header compression method, the base station may always configure an RLC AM bearer (a mode employing an ARQ function and a retransmission function and thus causing no loss) or an RLC UM bearer, and may configure the protocol or method together with a header compression protocol (ROHC) or may not configure them together in some cases.

Moreover, the base station may indicate whether to use a function of an SDAP layer device or whether to use an SDAP header, for each logical channel (logicalchannelconfig), each bearer, or each PDCP device (PDCP-config) through the message, and the message may indicate whether to apply an ROHC (IP packet header compression) for each logical channel (logicalchannelconfig), each bearer, or each PDCP device (PDCP-config), and may use indicators to configure whether to apply the ROHC in the uplink and downlink, respectively. In addition, the base station may configure whether to use a user data compression method (UDC) for each logical channel, each bearer, or each PDCP device in the uplink and downlink, respectively. That is, the base station may configure the method to be used in the uplink and not to be used in the downlink or, on the contrary, may configure the method not to be used in the uplink and to be used in the downlink. In addition, the base station may configure the method to be used in both directions. In addition, the message may configure both an Ethernet header compression procedure and an ROHC header compression procedure.

Furthermore, the base station may define and indicate, through the message, an indicator (drbEthHCContinue) indicating that Ethernet header compression protocol-related configuration information or context continue to be used without being initialized in a case of a handover (e.g., a handover in the base station), or when an RRC inactive mode transitions into an RRC connected mode. The terminal having received the indicator may not initialize, and continue to use the Ethernet header compression protocol-related configuration information or context by considering the indicator when the terminal re-establishes an SDAP layer device or a PDCP layer device. Through this operation, the overhead caused by reconfiguration of an Ethernet header compression protocol can be reduced. In addition, the message may define a new indicator to indicate initialization of Ethernet header compression protocol-related configuration information or context. In addition, the RRC message may configure whether or not to configure an SDAP protocol or an SDAP header.

In addition, the message contains RRC connection configuration information. An RRC connection is also called a signaling radio bearer (SRB), and is used for transmission and reception of an RRC message that is a control message between the terminal and the base station. The terminal having configured an RRC connection transmits an RRC-ConnetionSetupComplete message to the base station (operation 1e-15). If the base station does not know the terminal capability of the terminal configuring the current connection or desires to identify the terminal capability, the base station may transmit a message asking about the capability of the terminal. Thereafter, the terminal may transmit a message reporting the capability of the terminal. The terminal may show, through the message, whether or not the terminal can use an Ethernet protocol or an Ethernet header compression and decompression procedure, and may transmit the message after including an indicator indicating the above fact in the message. The RRCConnetionSetupComplete message includes a control message, called SERVICE REQUEST, through which the terminal requests the configuration of a bearer for a predetermined service from an MME. The base station transmits the SERVICE REQUEST message contained in the RRCConnetionSetupComplete message to the MME (operation 1e-20), and the MME determines whether to provide the service requested by the terminal.

If a result of the determination shows that the MME has decided to provide the service requested by the terminal, the MME transmits an INITIAL CONTEXT SETUP REQUEST message to the base station (operation 1e-25). The message includes information such as quality-of-service (QoS) information to be applied at the time of configuration of a data radio bearer (DRB), and security-related information (e.g., a security key or a security algorithm) to be applied to the DRB. The base station exchanges a SecurityModeCommand message (operation 1e-30) and a SecurityModeComplete message (operation 1e-35) with the terminal in order to configure security with the terminal. When the configuring of the security is completed, the base station transmits an RRCConnectionReconfiguration message to the terminal (operation 1e-40).

The message may include information indicating whether or not to use an Ethernet protocol or whether or not to use an Ethernet header compression and decompression procedure, for each logical channel (logicalchannelconfig), each bearer, each PDCP device (PDCP-config), or each SDAP layer device. In addition, more specifically, whether or not to use the Ethernet protocol, or whether to use the Ethernet header compression and decompression procedure may be indicated only for an IP flow or a QoS flow in each logical channel, each bearer, or each PDCP device (or SDAP device) (information on an IP flow or a QOS flow for which the Ethernet protocol is or is not to be used, or for which the Ethernet header compression method is or is not to be used may be configured for an SDAP device, so that the SDAP device may instruct a PDCP device on whether or not to apply the Ethernet protocol or whether or not to use the Ethernet header compression method, for each QoS flow.

In another method, an SDAP layer device or a PDCP device may identify each QoS flow by itself, and determine whether or not to apply the Ethernet protocol or whether or not to apply the Ethernet header compression method). Furthermore, if whether or not to apply the Ethernet protocol, or use of the Ethernet header compression method is indicated, an identifier for a pre-defined library or dictionary to be used in connection with the Ethernet header compression method (or whether or not to apply the Ethernet protocol), or the size of a buffer to be used therefor may be indicated. In addition, the message may include a command for setting up or releasing execution of the Ethernet header compression method or determination regarding whether or not to apply the Ethernet protocol.

In addition, when whether or not to apply the Ethernet protocol or use of the Ethernet header compression method is configured, an RLC AM bearer (a mode employing an ARQ function and a retransmission function and thus causing no loss) or an RLC UM bearer may always be configured, and the protocol or method may be configured together with a header compression protocol (ROHC) or may not be configured together in some cases.

Moreover, the message may indicate whether to use a function of an SDAP layer device or whether to use an SDAP header, for each logical channel (logicalchannelconfig), each bearer, or each PDCP device (PDCP-config), and the message may indicate whether to apply an ROHC (IP packet header compression) for each logical channel (logicalchannelconfig), each bearer, or each PDCP device (PDCP-config), and may use indicators to configure whether to apply the ROHC in the uplink and downlink, respectively. In addition, whether to use a user data compression method (UDC) in each of the uplink and downlink may be configured for each logical channel, each bearer, or each PDCP device. That is, the method may be configured to be used in the uplink and not to be used in the downlink. On the contrary, the method may be configured not to be used in the uplink and to be used in the downlink. In addition, the method may be configured to be used in both directions.

In addition, the base station may configure both an Ethernet header compression procedure and an ROHC header compression procedure in the message. Furthermore, the base station may define and indicate, in the message, an indicator (drbEthHCContinue) indicating that Ethernet header compression protocol-related configuration information or context continue to be used without being initialized in a case of a handover (e.g., a handover in the base station), or when an RRC inactive mode transitions into an RRC connected mode. The terminal having received the indicator may not initialize, and continue to use the Ethernet header compression protocol-related configuration information or context by considering the indicator when the terminal re-establishes an SDAP layer device or a PDCP layer device.

Through this operation, the overhead caused by reconfiguration of an Ethernet header compression protocol can be reduced. In addition, the message may define a new indicator to indicate initialization of Ethernet header compression protocol-related configuration information or context. In addition, the RRC message may configure whether or not to configure an SDAP protocol or an SDAP header.

In addition, the message includes configuration information of a DRB through which user data is processed, and the terminal configures the DRB by applying the information and transmits an RRCConnectionReconfigurationComplete message to the base station (operation 1e-45). The base station having completed the configuring of the DRB with the terminal transmits an INITIAL CONTEXT SETUP COMPLETE message to the MME (operation 1e-50), and the MME having received the message exchanges an S1 BEARER SETUP message and an S1 BEARER SETUP RESPONSE message with an S-GW in order to configure a S1 bearer with the S-GW (operations 1e-55 and 1e-60). The S1 bearer is a data transmission connection configured between the S-GW and the base station and corresponds to the DRB in one-to-one correspondence. If all the processes are completed, the terminal transmits or receives data to or from the base station through the S-GW (operations 1e-65 and 1e-70). As described above, a general data transmission process generally includes three stages of RRC connection configuration, security configuration, and DRB configuration. In addition, the base station may transmit an RRCConnectionReconfiguration message to newly establish, add, or change a configuration for the terminal due to a predetermined reason (operation 1e-75).

The message may include information indicating whether or not to use an Ethernet protocol or whether or not to use an Ethernet header compression and decompression procedure, for each logical channel (logicalchannelconfig), each bearer, each PDCP device (PDCP-config), or each SDAP layer device. In addition, more specifically, whether or not to use the Ethernet protocol or whether to use the Ethernet header compression and decompression procedure may be indicated only for an IP flow or a QoS flow in each logical channel, each bearer, or each PDCP device (or SDAP device) (information on an IP flow or a QOS flow for which the Ethernet protocol is or is not to be applied, or for which the Ethernet header compression method is or is not to be used may be configured for an SDAP device, so that the SDAP device may instruct a PDCP device on whether or not to apply the Ethernet protocol or whether or not to use the Ethernet header compression method, for each QoS flow. In another method, an SDAP layer device or a PDCP device may identify each QoS flow by itself, and determine whether or not to apply the Ethernet protocol or whether or not to apply the Ethernet header compression method).

Furthermore, if whether or not to apply the Ethernet protocol or use of the Ethernet header compression method is indicated, an identifier for a pre-defined library or dictionary to be used in connection with the Ethernet header compression method (or whether or not to apply the Ethernet protocol), or the size of a buffer to be used therefor may be indicated. In addition, the message may include a command for setting up or releasing execution of the Ethernet header compression method or determination regarding whether or not to apply the Ethernet protocol.

In addition, when whether or not to apply the Ethernet protocol or use of the Ethernet header compression method is configured, an RLC AM bearer (a mode employing an ARQ function and a retransmission function and thus causing no loss) or an RLC UM bearer may always be configured, and the protocol or method may be configured together with a header compression protocol (ROHC), or may not be configured together in some cases. Moreover, the message may indicate whether to use a function of an SDAP layer device or whether to use an SDAP header, for each logical channel (logicalchannelconfig), each bearer, or each PDCP device (PDCP-config), and the message may indicate whether to apply an ROHC (IP packet header compression) for each logical channel (logicalchannelconfig), each bearer, or each PDCP device (PDCP-config), and may use indicators to configure whether to apply the ROHC in the uplink and downlink, respectively.

In addition, whether to use a user data compression method (UDC) may be configured for each logical channel, each bearer, or each PDCP device in the uplink and downlink, respectively. That is, the method may be configured to be used in the uplink and not to be used in the downlink. On the contrary, the method may be configured not to be used in the uplink and to be used in the downlink. In addition, the method may be configured to be used in both directions.

In addition, the base station may configure both an Ethernet header compression procedure and an ROHC header compression procedure in the message. Furthermore, the base station may define and indicate, in the message, an indicator (drbEthHCContinue) indicating that Ethernet header compression protocol-related configuration information or context continue to be used without being initialized in a case of a handover (e.g., a handover in the base station), or when an RRC inactive mode transitions into an RRC connected mode. The terminal having received the indicator may not initialize, and continue to use the Ethernet header compression protocol-related configuration information or context by considering the indicator when the terminal re-establishes an SDAP layer device or a PDCP layer device. Accordingly, the overhead caused by reconfiguration of an Ethernet header compression protocol can be reduced. In addition, the message may define a new indicator to indicate initialization of Ethernet header compression protocol-related configuration information or context. In addition, the RRC message may configure whether or not to configure an SDAP protocol or an SDAP header.

Figure 1F:
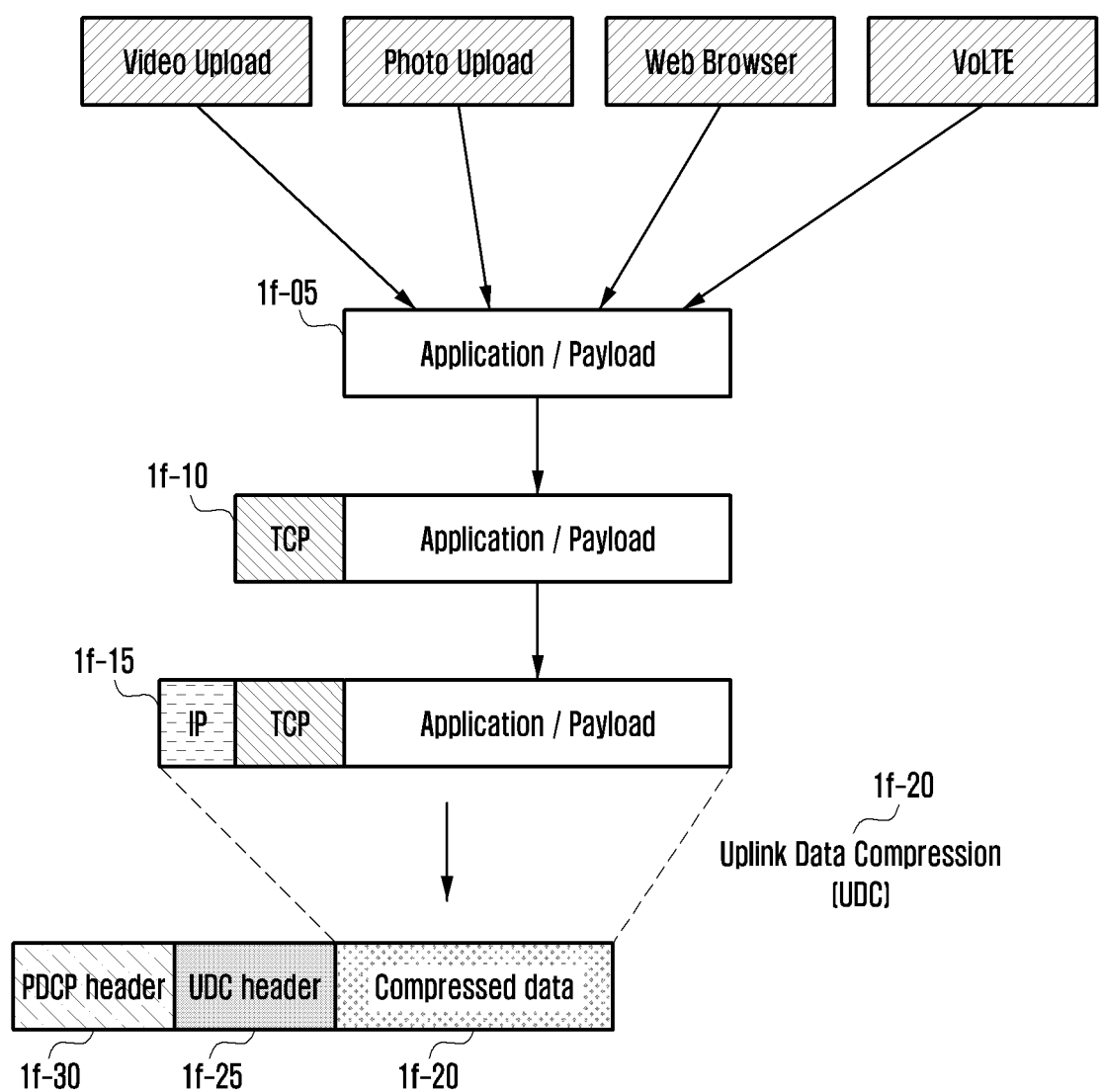
FIG. 1F is a diagram illustrating a procedure of performing an uplink data compression (UDC), which is the (1-1)th embodiment of the disclosure, and a data configuration therefor.

FIG. 1F is a diagram illustrating a procedure of performing an uplink data compression (UDC), which is the (1-1)th embodiment of the disclosure, and a data configuration therefor.

In FIG. 1F, uplink data 1f-05 may be generated as data corresponding to services, such as video transmission, photo transmission, Web search, and voice over LTE (VoLTE). Pieces of data generated in an application layer device may be processed through a TCP/IP or a UDP corresponding to a network data transmission layer, may configure individual headers 1f-10 and 1f-15, and may be transferred to a PDCP layer. When data (a PDCP SDU) is received from an upper layer, the PDCP layer may perform the following procedure.

If an uplink data compression method is configured to be used in the PDCP layer, by an RRC message used as in operation 1e-10, 1e-40, or 1e-75 in FIG. 1E, a transmission node may: perform an uplink data compression (UDC) method on a PDCP SDU as in the case of 1f-20, to compress uplink data; configure a UDC header (a header 1f-25 for compressed uplink data) corresponding to the compression; and if an integrity protection is configured, perform the integrity protection, perform ciphering, and configure a PDCP header 1f-30, so as to configure a PDCP PDU. In the above description, a PDCP layer device includes a UDC compression/decompression device, determines whether or not to perform a UDC procedure on each data, according to the configuration of the RRC message, and uses the UDC compression/decompression device. At the transmission node, a transmission PDCP layer device performs data compression by using a UDC compression device, and at the reception node, a reception PDCP layer device performs data decompression by using a UDC decompression device.

The procedure in FIG. 1F described above may also be applied to compression of downlink data, as well as compression of uplink data by a terminal. In addition, the above description about uplink data may also be applied to downlink data in the same way.

Figure 1G:
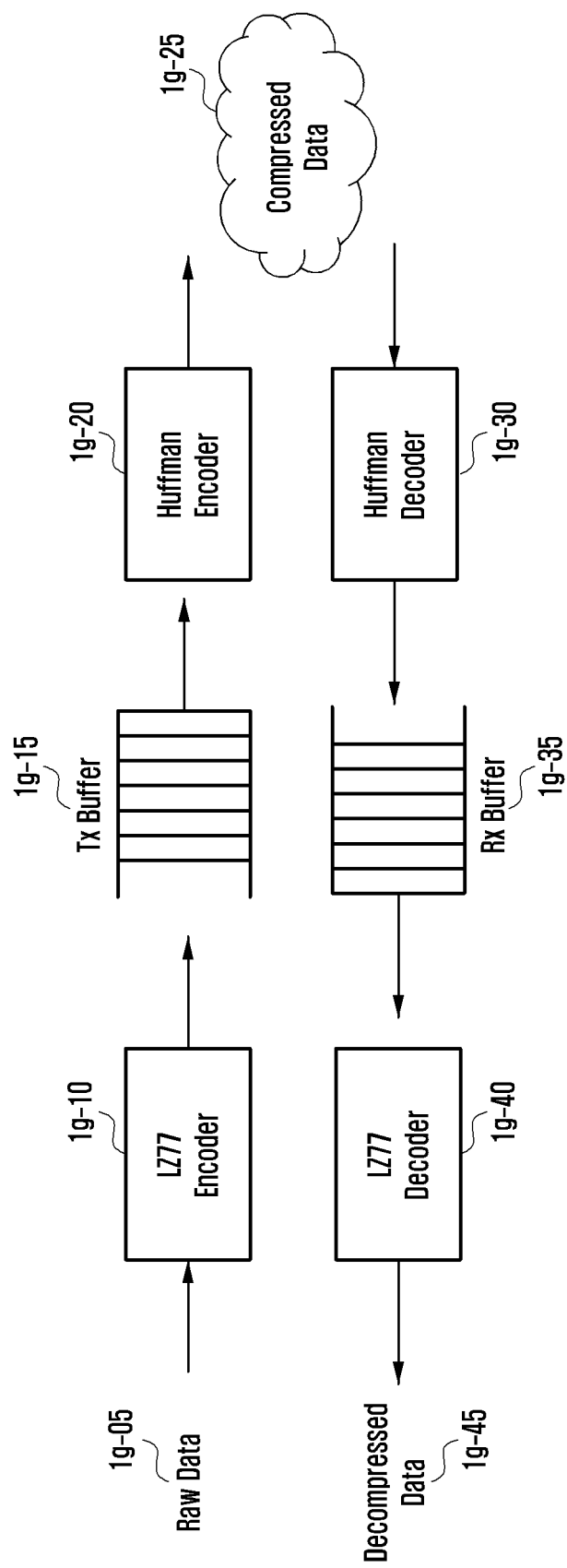
FIG. 1G is a diagram illustrating a detailed method of an uplink data compression method according to the (1-1)th embodiment of the disclosure.

FIG. 1G is a diagram illustrating a detailed method of an uplink data compression method which is the (1-1)th embodiment of the disclosure.

FIG. 1G is a diagram illustrating a DEFLATE-based uplink data compression algorithm, and a DEFLATE-based uplink data compression algorithm is a lossless compression algorithm. The DEFLATE-based uplink data compression algorithm basically combines a LZ77 algorithm and Huffman coding to compress uplink data. The LZ77 algorithm performs an operation of scanning an overlapping arrangement of data, wherein the scanning of the overlapping arrangement is performed in a sliding window through the sliding window; and if the overlapping arrangement is discovered, expresses the overlapping arrangement by using the position thereof in the sliding window and the length of the overlapped amount, so as to perform data compression. The sliding window is also called a buffer in an uplink data compression (UDC) method, and may be configured to have 8 kilobytes or 32 kilobytes. That is, the sliding window or a buffer may record 8192 or 32768 characters, scan overlapping arrangements, and express same by using the length and position thereof so as to perform compression. Therefore, since the LZ-77 algorithm employs a sliding window scheme, that is, since previously coded pieces of data are updated in a buffer, and immediately subsequent pieces of data are coded again, consecutive pieces of data have a correlation therebetween. Therefore, only if previously coded pieces of data are decoded normally, it is possible to normally decode subsequent pieces of data. In the above description, codes (expression such as position and length) expressed and compressed by position and length through the LZ77 algorithm are compressed through Huffman coding once more. The Huffman coding scans overlapping codes again and compresses the codes once more by using a short mark for a code overlapped many times and using a long mark for a code less overlapped. The Huffman coding corresponds to prefix coding, and an optimal coding scheme having a characteristic (uniquely decodable) in which all the codes are clearly distinguished from each other.

As described above, a transmission node may encode raw data 1g-05 by applying a LZ77 algorithm to same (1g-10), update a buffer (1g-15), and generate checksum bits for contents (or data) of the buffer to configure the bits in a UDC header. The checksum bits are used to allow a reception node to determine whether the state of the buffer is valid. Codes encoded through the LZ77 algorithm may be compressed through Huffman coding once more and then be transmitted as uplink data (1g-25). The reception node performs a decompression process on the received compressed data contrary to the transmission node. That is, the reception node performs Huffman decoding (1g-30), updates a buffer (1g-35), and identifies whether the updated buffer is valid, through the checksum bits of the UDC header. If it is determined that there are no errors in the checksum bits, the reception node may perform decoding through a LZ77 algorithm (1g-40) to decompress the data and reconstruct the raw data, and transfer the reconstructed data to an upper layer (1g-45).

As described above, the LZ77 algorithm employs a sliding window scheme, that is, previously coded pieces of data are updated in a buffer, and immediately subsequent pieces of data are coded again. Therefore, consecutive pieces of data have a correlation therebetween. Therefore, only if previously coded pieces of data are decoded normally, it is possible to normally decode subsequent pieces of data. Therefore, a reception PDCP layer device identifies PDCP sequence numbers of a PDCP header and identifies (identifies an indicator indicating whether data compression has been performed or not) a UDC header, and performs a data decompression procedure on pieces of data to which a data compression procedure has been applied, according to an ascending order based on the PDCP sequence numbers.

Figure 1H:
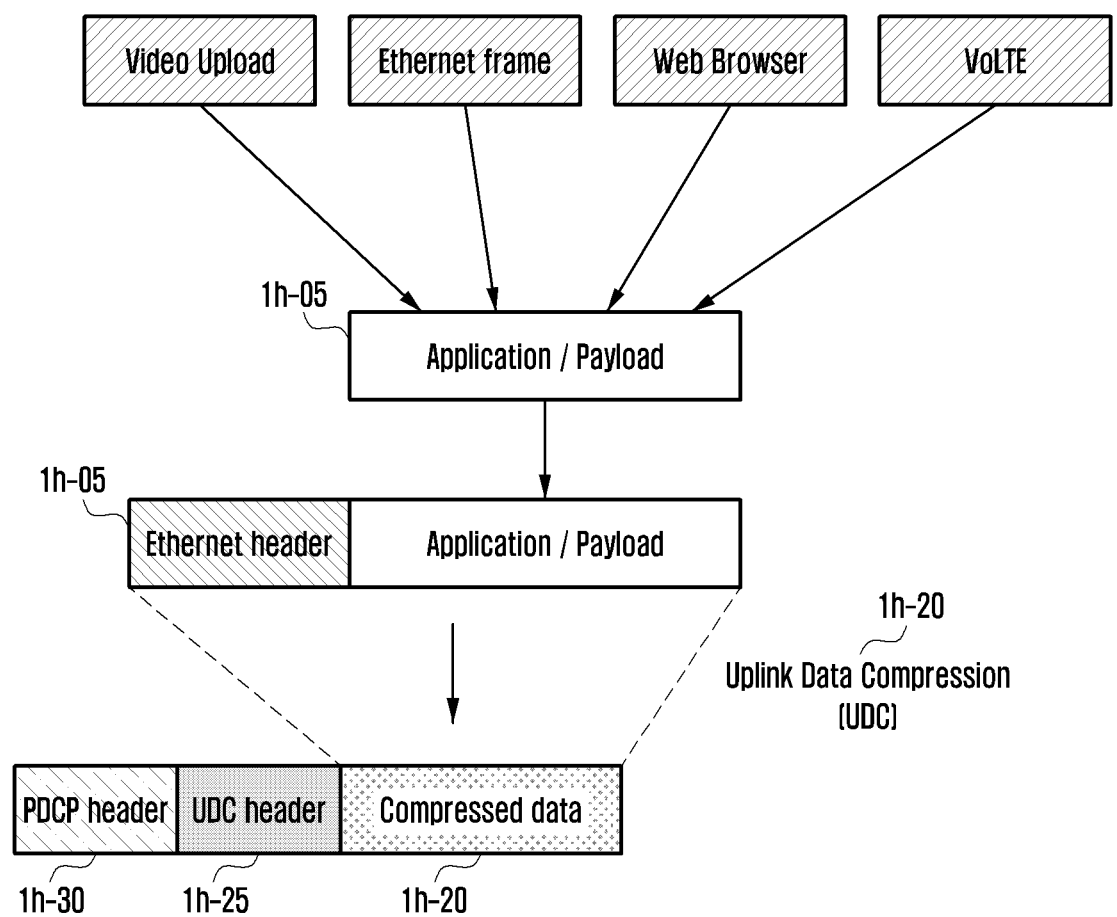
FIG. 1H is a diagram illustrating a method for extending and applying an uplink data compression method according to the (1-1)th embodiment of the disclosure to Ethernet headers.

FIG. 1H is a diagram illustrating a method for extending and applying an uplink data compression method, which is the (1-1)th embodiment of the disclosure, to Ethernet headers.

In FIG. 1H, downlink data or uplink data 1f-05 may be generated as data corresponding to services, such as video transmission, photo transmission, Web search, VoLTE, and Ethernet data (e.g., an Ethernet frame). Pieces of data generated in an application layer device may be processed through Ethernet, or a TCP/IP or a UDP corresponding to a network data transmission layer, may configure individual headers (a TCP/IP header, an Ethernet header, or an upper layer header) (1h-05), and may be transferred to a PDCP layer. When the header and data (e.g., a PDCP SDU) is received from an upper layer, the SDAP layer device or PDCP layer may perform the following procedure.

If a downlink or uplink data compression method is configured to be used in the PDCP layer, by an RRC message used as in operation 1e-10, 1e-40, or 1e-75 described with reference to FIG. 1E, a transmission node may: perform an uplink data compression method, which is the first embodiment of the disclosure, on a PDCP SDU as in the case of 1h-20, so as to compress uplink data (or downlink data in a case of a base station); configure a UDC header (a header 1h-25 for compressed uplink data) corresponding to the compression; and if an integrity protection is configured, perform the integrity protection, perform ciphering, and configure a PDCP header 1h-30, so as to configure a PDCP PDU. In the above description, a PDCP layer device includes a UDC compression/decompression device, determines whether or not to perform a UDC procedure on each data, according to the configuration of the RRC message, and uses the UDC compression/decompression device. At the transmission node, a transmission PDCP layer device performs data compression by using a UDC compression device, and at the reception node, a reception PDCP layer device performs data decompression by using a UDC decompression device.

The procedure in FIG. 1F described above may also be applied to compression of downlink data, as well as compression of uplink data by a terminal. In addition, the above description about uplink data may also be applied to downlink data in the same way.

In the above description, the reception PDCP layer device identifies PDCP sequence numbers of a PDCP header and identifies (identifies an indicator indicating whether data compression has been performed or not) a UDC header, and performs a data decompression procedure on pieces of data to which a data compression procedure has been applied, according to an ascending order based on the PDCP sequence numbers.

Figure 1I:
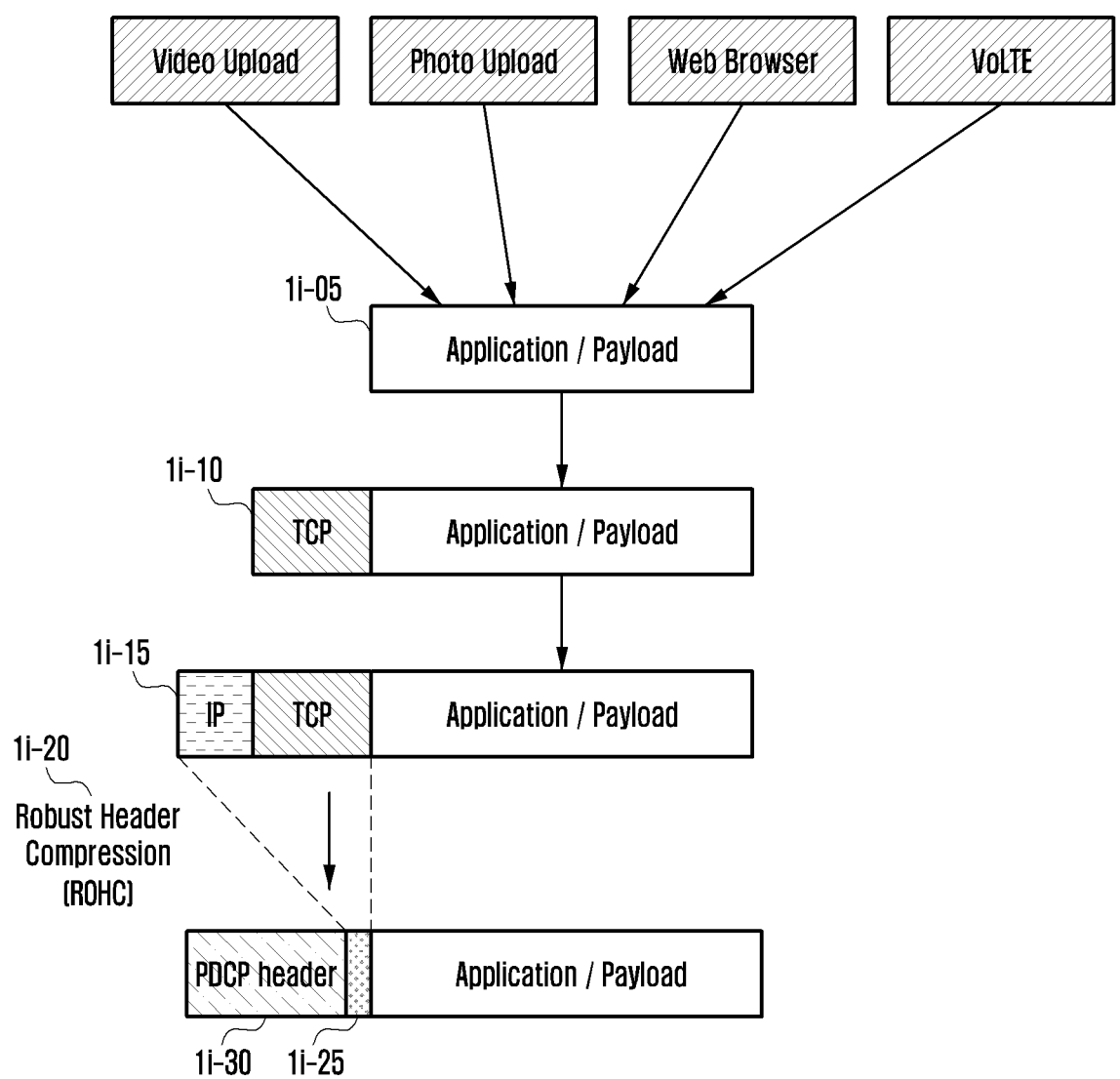
FIG. 1I is a diagram illustrating a procedure of performing a robust header compression (ROHC) header compression according to the (1-2)th embodiment of the disclosure, and a data configuration therefor.

FIG. 1I is a diagram illustrating a procedure of performing a robust header compression (ROHC) header compression, which is the (1-2)th embodiment of the disclosure, and a data configuration therefor.

In FIG. 1I, uplink data 1$i$-05 may be generated as data corresponding to services, such as video transmission, photo transmission, Web search, and VoLTE. Pieces of data generated in an application layer device may be processed through a TCP/IP or a UDP corresponding to a network data transmission layer, may configure individual headers 1$i$-10 and 1$i$-15, and may be transferred to a PDCP layer. When data (a PDCP SDU) is received from an upper layer, the PDCP layer may perform the following procedure.

If a header compression (ROHC) is configured to be used in an SDAP layer device or a PDCP layer, by an RRC message used as in operation 1$e$-10, 1$e$-40, or 1$e$-75 in FIG. 1E, a transmission node may: perform a header compression (ROHC) method on data (e.g., PDCP SDU) as in the case of 1$i$-20, to compress the headers 1$i$-10 and 1$i$-15 of the received upper layer data; generate a compressed header 1$i$-25; and if an integrity verification is configured, perform an integrity protection, perform ciphering, and configure a PDCP header 1$i$-30, so as to configure a PDCP PDU. In the above description, a PDCP layer device includes a header compression/decompression device, determines whether or not to perform a header compression on each data, according to the configuration of the RRC message, and uses the header compression/decompression device. At the transmission node, a transmission PDCP layer device performs data compression by using a header compression device, and at the reception node, a reception PDCP layer device performs header decompression by using a header decompression device.

The procedure in FIG. 1I described above may also be applied to header compression of downlink data, as well as compression of an uplink header by a terminal. In addition, the above description about uplink data may also be applied to downlink data in the same way.

In the above (1-2)th embodiment, in a method for performing a header compression, fields indicating static information are omitted, and only changed pieces of information are indicated, so that the size of a header is reduced. Therefore, at the first time (i.e., at the time of initial transmission), entire header information and configuration information for a compression (e.g., an identifier for each traffic (or service) for ROHC, a sequence number for each traffic (or service), and compression rate-related information) may be included and then transmitted. At the time of transmission after initial transmission, a header is configured to include only fields corresponding to changed information and omit fields (e.g., a transmission address or a reception address) corresponding to information which is not changed compared to the entire information which has been initially transmitted. Therefore, the size of the header can be reduced.

Figure 1J:
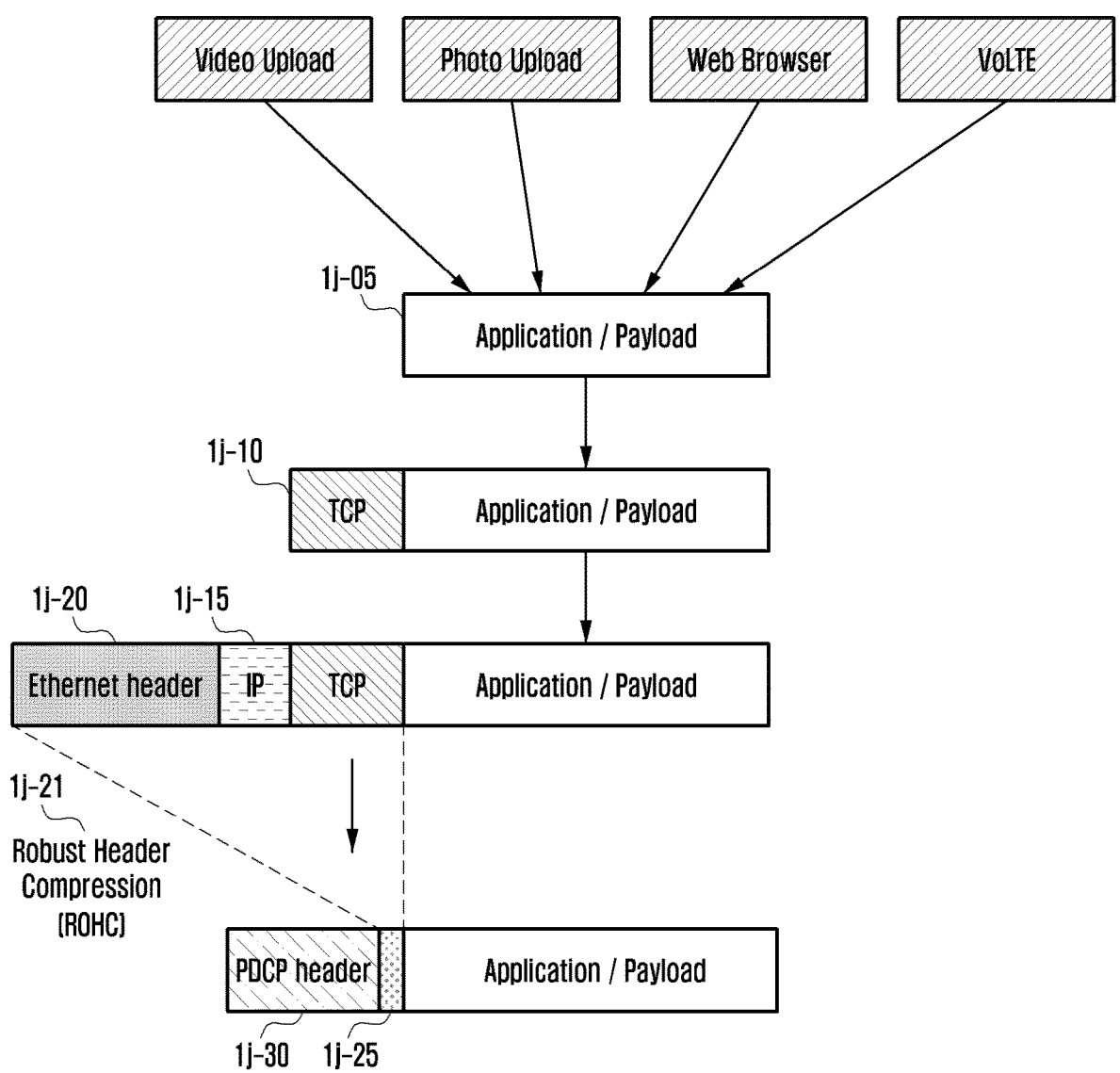
FIG. 1J is a diagram illustrating a method for extending and applying a robust header compression (ROHC) header compression method according to the (1-2)th embodiment of the disclosure to Ethernet headers.

FIG. 1J is a diagram illustrating a method for extending and applying a robust header compression (ROHC) header compression method, which is the (1-2)th embodiment of the disclosure, to Ethernet headers.

In FIG. 1J, upper layer data 1$j$-05 may be generated as data corresponding to services, such as video transmission, photo transmission, Web search, and VoLTE. Pieces of data generated in an application layer device may be processed through a TCP/IP or a UDP corresponding to a network data transmission layer, or processed through an Ethernet protocol, may configure individual headers 1$j$-10, 1$j$-15, and 1$j$-20 (an upper layer header or an Ethernet header), and may be transferred to a PDCP layer. When data (a PDCP SDU) is received from an upper layer, the PDCP layer may perform the following procedure.

If a header compression (ROHC) is configured to be used in an SDAP layer device or a PDCP layer, by an RRC message used as in operation 1$e$-10, 1$e$-40, or 1$e$-75 in FIG. 1E, a transmission node may: perform a header compression (ROHC) method on a PDCP SDU as in the case of 1$j$-21, to compress the headers 1$j$-10, 1$j$-15, and 1$j$-20 of the received upper layer data; generate a compressed header 1$j$-25; and if an integrity verification is configured, perform an integrity protection, perform ciphering, and configure a PDCP header 1$j$-30, so as to configure a PDCP PDU. In the above description, a PDCP layer device includes a header compression/decompression device, determines whether or not to perform a header compression on each data, according to the configuration of the RRC message, and uses the header compression/decompression device. At the transmission node, a transmission PDCP layer device performs data compression by using a header compression device, and at the reception node, a reception PDCP layer device performs header decompression by using a header decompression device.

The procedure in FIG. 1J described above may also be applied to header compression of downlink data, as well as compression of an uplink header by a terminal. In addition, the above description about uplink data may also be applied to downlink data in the same way.

In the second embodiment proposed in the disclosure, in a method for performing a header compression on an Ethernet header, fields indicating static information are omitted, and only changed pieces of information are indicated, so that the size of the header is reduced. Therefore, at the first time (i.e., at the time of initial transmission), entire header information and configuration information for a compression (e.g., an identifier for each traffic (or service) for ROHC, a sequence number for each traffic (or service), and compression rate-related information) may be included and then transmitted. At the time of transmission after initial transmission, a header is configured to include only fields corresponding to changed information and to omit or not transmit fields (e.g., a transmission address field or reception address field (MAC address), a preamble field, a start of frame delimiter (SFD), a frame checksum (FCS), or an Ethernet type field) corresponding to information which is not changed compared to the entire information which has been initially transmitted. Therefore, the size of the header can be reduced.

Figure 1K:
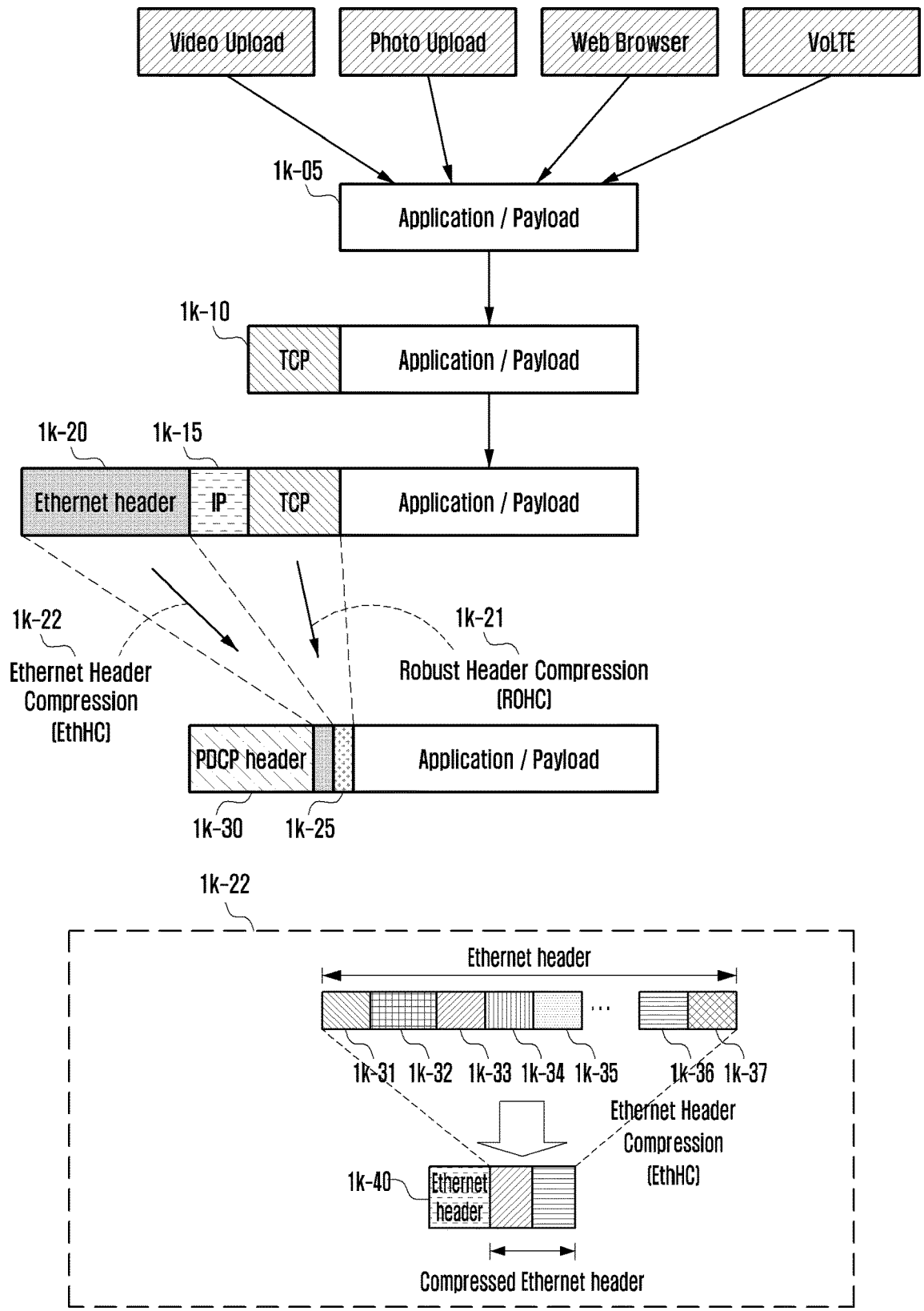
FIG. 1K is a diagram illustrating an Ethernet header compression (EthHC) header compression method according to the (1-3)th embodiment of the disclosure.

FIG. 1K is a diagram illustrating an Ethernet header compression (EthHC) header compression method, which is the (1-3)th embodiment of the disclosure.

In FIG. 1K, upper layer data 1$k$-05 may be generated as data corresponding to services, such as video transmission, photo transmission, Web search, and VoLTE. Pieces of data generated in an application layer device may be processed through a TCP/IP or a UDP corresponding to a network data transmission layer, or processed through an Ethernet protocol, may configure individual headers 1$k$-10, 1$k$-15, and 1$k$-20 (an upper layer header or an Ethernet header), and may be transferred to a PDCP layer. When data (a PDCP SDU) is received from an upper layer, the PDCP layer may perform the following procedure.

If a header compression (ROHC) or an Ethernet header compression procedure is configured to be used in an SDAP layer device or a PDCP layer, by an RRC message used as in operation 1e-10, 1e-40, or 1e-75 in FIG. 1E, a transmission node may perform an Ethernet header compression procedure on the Ethernet header 1k-20 in the SDAP layer device or the PDCP layer device as in the case of 1k-22. In addition, the transmission node may: perform a header compression (ROHC) method on the data (e.g., PDCP SDU) in the PDCP layer device as in the case of 1k-21, to compress the headers (e.g., the TCP/IP headers 1k-10 and 1k-15) of the received upper layer data; generate a compressed header 1k-25; and if an integrity verification is configured, perform an integrity protection, perform ciphering, and configure a PDCP header 1k-30, so as to configure a PDCP PDU. In the above description, the SDAP layer device or the PDCP layer device includes a header compression/decompression device, determines whether or not to perform a header compression on each data, according to the configuration of the RRC message, and uses the header compression/decompression device. At the transmission node, a transmission SDAP layer device or PDCP layer device compresses an Ethernet header or an upper layer header (e.g., a TCP/IP header) by using a header compression device, and at the reception node, a reception SDAP layer device or PDCP layer device performs a header decompression on an Ethernet header or an upper layer header (e.g., a TCP/IP header) by using a header decompression device.

The procedure in FIG. 1K described above may also be applied to header compression of downlink data, as well as compression of an uplink header by a terminal. In addition, the above description about uplink data may also be applied to downlink data in the same way.

In the (1-3)th embodiment proposed in the disclosure, in a method for performing an Ethernet header compression on an Ethernet header by a transmission node, fields indicating static information are omitted, and only changed pieces of information are indicated, so that the size of the header is reduced. Therefore, at the first time (i.e., at the time of initial transmission), entire header information and configuration information for a compression (e.g., an identifier (type) for each traffic (or service) for an Ethernet protocol, a sequence number for each traffic (or service), and compression rate-related information) may be included and then transmitted. At the time of transmission after initial transmission, a header is configured to include only fields corresponding to changed information and to omit or not transmit fields (e.g., a transmission address field or reception address field (MAC address), a preamble field, a start of frame delimiter (SFD), a frame checksum (FCS), or an Ethernet type field) corresponding to information which is not changed compared to the entire information which has been initially transmitted. Therefore, the size of the header can be reduced.

How an Ethernet header is compressed (1k-22) in the (1-3)th embodiment specifically is proposed below.

In the Ethernet header compression protocol 1k-22, when data is received from an upper layer device, the SDAP layer device or the PDCP layer device may identify an Ethernet header, compress the Ethernet header by using a protocol to be used to compress the Ethernet header, and define and use a new header 1k-40 in front of the compressed Ethernet header.

As proposed above, in the method for compressing an Ethernet header, the transmission node: omits a value of an Ethernet header field, the value of which is not changed, or the value of which has not been changed compared to an Ethernet header previously transmitted, or which is not required to be transmitted, among multiple header fields 1k-31, 1k-32, 1k-33, 1k-34, 1k-35, 1k-36, and 1k-37 in the Ethernet header; and selectively transmits only necessary fields or valid fields. Therefore, if the first field 1k-31, the second field 1k-32, the fourth field 1k-34, the fifth field 1k-35, and the seventh field 1k-37 among multiple fields (e.g., the first field 1k-31, the second field 1k-32, the third field 1k-33, the fourth field 1k-34, the fifth field 1k-35, the sixth field 1k-36, and the seventh field 1k-37) included in the Ethernet header are omissible, are not required to be transmitted, or have the same values as field values of the Ethernet header previously transmitted, the transmission node transmits only the third field 1k-33 and the sixth field 1k-36.

However, a reception side is required to identify fields which have been compressed, have been omitted, or have not been transmitted, so as to decompress the compressed Ethernet header. Therefore, when an Ethernet header is compressed at a transmission side, the transmission side may define a new header (e.g., an EthHC header), attach same in front of the compressed Ethernet header, and transmit the Ethernet header. The transmission node may define a new first field in the new EthHC header to indicate which field has been compressed, has been omitted, or has not been transmitted among multiple fields of the Ethernet header. The new field may indicate whether a particular field has been compressed (or has been omitted, or has not been transmitted) or has not been compressed (or is included or has been transmitted), by using each bit according to a bitmap type. Moreover, since the transmission node can indicate which field in the Ethernet header has been compressed (or has been omitted) or has not been compressed (or is included) by using the first field, the reception node may calculate the size of the received compressed Ethernet header by using the first field. That is, the reception node may identify the size of the Ethernet header by subtracting the size of omitted header fields from the size of the original Ethernet header.

In addition, the first field may have a mapping for indicating whether each of all the fields of an Ethernet header has been compressed or not (or has been omitted or not). However, the first field may have a mapping for indicating whether each of limited compressible (or omissible) fields among the fields of the Ethernet header has been compressed or not (or has been omitted or not). Therefore, the overhead of the new EthHC header can be reduced.

In addition, in order that the EthHC header can precisely indicate the size of the compressed Ethernet header (e.g., for convenience of implementation), the transmission node may indicate the size or length of the compressed Ethernet header by using a second field. In addition, in a case where the size of the Ethernet header may have multiple types, the transmission node may indicate a type of the size by using the second field. Alternatively, the transmission node may define a new third field indicating whether an Ethernet header compression has been performed or not, in the EthHC header.

Moreover, in relation to the configuration of Ethernet header fields according to the type of an Ethernet header as described above, which type the Ethernet header is of, or which header fields configure the Ethernet header may be configured for each bearer by an RRC message as illustrated with reference to FIG. 1E.

Another Ethernet header compression method may be used based on the new EthHC header. For example, in a case where the transmission node sequentially compresses Ethernet headers, when an Ethernet header is compressed, if the Ethernet header includes header fields, the values of which have not been changed compared to fields of a previously transmitted Ethernet header, the transmission node may compress (i.e., omit) the fields, and configure the first field to be matched accordingly. If the Ethernet header includes Ethernet header fields, the values of which are different from the field values of the previously transmitted Ethernet header, the transmission node may not compress (i.e., may include) the fields; and configure the first field to be matched accordingly, so as to complete the compression of the Ethernet header. The above sequential compression may imply determining an ascending order based on PDCP sequence numbers or COUNT values. The previous Ethernet header may indicate an Ethernet header corresponding to data having one less value of a PDCP sequence number or a COUNT value. When the compressed Ethernet header is received, the reception node may identify the first field. Since the fields compressed (omitted) in the Ethernet header have the same values as those of the previously received Ethernet header, the reception node may reconstruct the fields to be matched accordingly, and newly update the non-compressed (included) fields. Each of the transmission node and the reception node may have a separate buffer for compressing an Ethernet header, and may update the buffer every time the node compresses an Ethernet header, and update the buffer every time the node decompresses an Ethernet header. When the compressed Ethernet header is reconstructed, the reception node may remove the new EthHC header and transfer the reconstructed data to an upper layer. In addition, the transmission node may transmit entire Ethernet header information when transmitting an Ethernet header at the first time. That is, at the first time, the transmission node may transmit an Ethernet header without compression in order to allow the reception node to recognize the entire Ethernet header information.

Figure 1L:
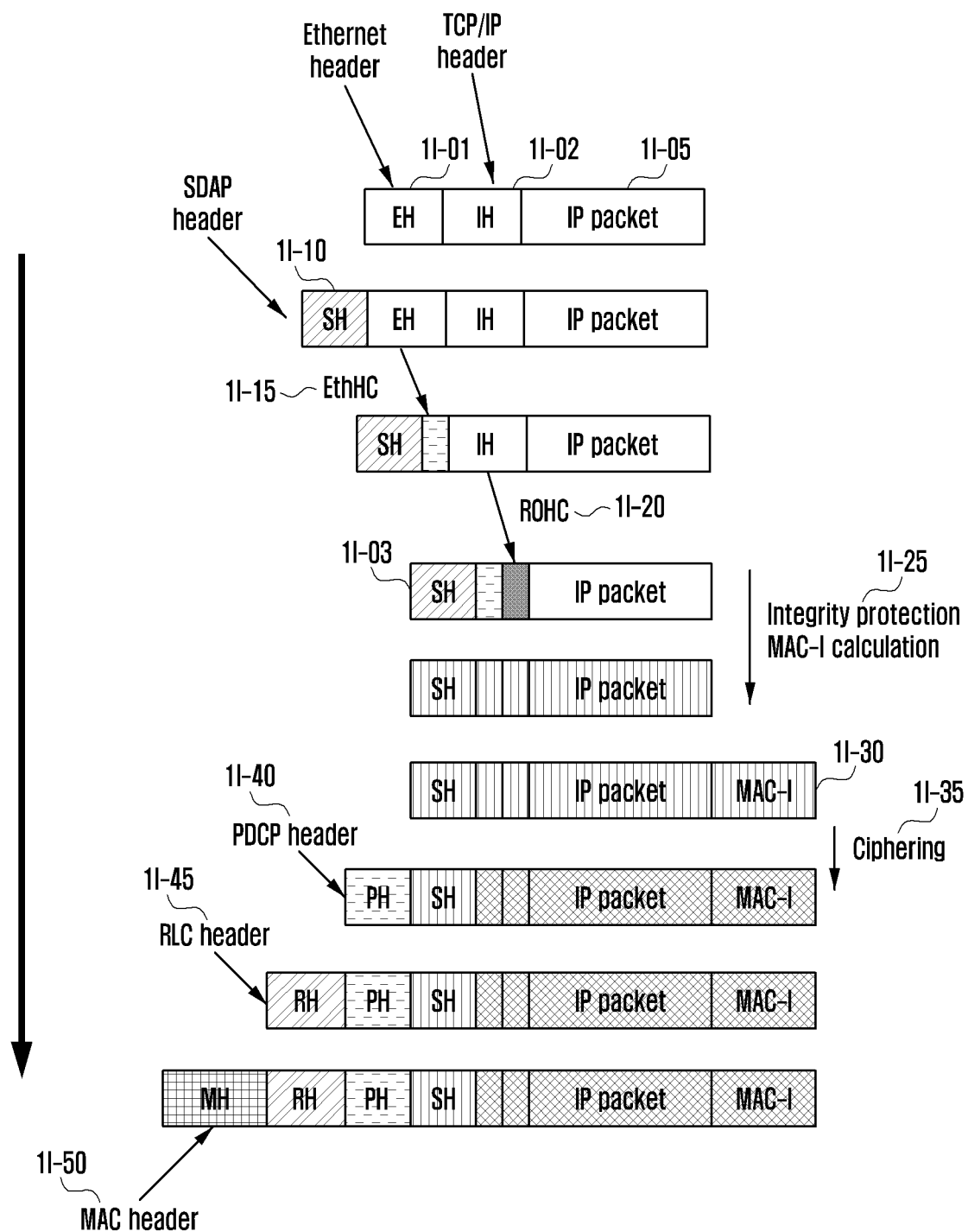
FIG. 1L is a diagram illustrating a procedure of compressing and processing an Ethernet header of data including the Ethernet header according to an embodiment of the disclosure.

FIG. 1L is a diagram illustrating a procedure of compressing and processing an Ethernet header of data including the Ethernet header according to an embodiment of the disclosure.

In FIG. 1L, when data 1*l*-05 which has been processed with an Ethernet protocol or an upper layer protocol, and includes an Ethernet header and an upper layer header (e.g., a TCP/IP header) is received, data processing is performed as below.

If it is configured to perform an Ethernet header compression procedure by an RRC message in FIG. 1E, a transmission node (a terminal or a base station) may perform the Ethernet header compression procedure in an SDAP layer device or a PDCP layer device, thereby performing a header compression on an Ethernet header 1*l*-01. When the Ethernet header compression procedure is performed, a header compression is not performed on an SDAP header. The SDAP header includes QoS information. Therefore, only if the SDAP header is not compressed, in a case where an upper layer (SDAP and PDCP) and a lower layer (RLC, MAC, and PHY) are separated from each other like a central unit (CU)-distributed unit (DU) split structure in implementation of a base station, a lower layer device may identify the QoS information of the SDAP header and apply the information to scheduling.

If both an Ethernet header compression procedure and an ROHC header compression procedure are configured by an RRC message in FIG. 1E, a transmission node (a terminal or a base station) may perform the Ethernet header compression procedure in an SDAP layer device or a PDCP layer device, and may perform the ROHC header compression procedure in the PDCP layer device. In a case where both an Ethernet header compression procedure and an ROHC header compression procedure are configured as described above, data processing methods as below are possible. That is, it is possible to process data by one method among the following data processing methods.

1. The first method: first, the transmission node performs an Ethernet header compression procedure on the Ethernet header 1*l*-01 of data received from an upper layer, in an SDAP layer device. Thereafter, in a case where an SDAP header is configured by an RRC message, the transmission node generates an SDAP header 1*l*-10, attaches the SDAP header in front of the compressed Ethernet header and the data, and transfers the headers and data to a lower PDCP layer device. In the Ethernet header compression procedure, an Ethernet header compression procedure 1*l*-15 is performed with regard to only the Ethernet header 1*l*-01, that is predetermined foremost bytes (e.g., 18 bytes) of data (e.g., an SDAP SDU) received from an upper layer device, and is not performed with regard to the SDAP header 1*l*-10. When an ROHC header compression procedure is performed, in a case where an SDAP header is configured in data received from the upper layer, the PDCP layer device having received the data (PDCP SDU) may perform an ROHC header compression procedure 1*l*-20 only on an upper layer header 1*l*-02 (e.g., a TCP/IP header or a UDP header) rather than the SDAP header 1*l*-10 and the compressed Ethernet header, to perform the header compression procedure on the TCP/IP header 1*l*-02. In addition, if an integrity protection and verification procedure is configured, the PDCP layer device performs an integrity protection on all of the SDAP header 1*l*-10, the compressed Ethernet header, and the compressed TCP/IP header (1*l*-25), calculates an MAC-I, and attaches the MAC-I to the back of the data (1*l*-30), and performs a ciphering procedure on the remaining part except for the SDAP header.

2. The second method: first, the transmission node performs an Ethernet header compression procedure on the Ethernet header 1*l*-01 of data received from an upper layer, in a PDCP layer device. Specifically, in a case where an SDAP header is configured by an RRC message, in the Ethernet header compression procedure, an Ethernet header compression procedure 1*l*-15 is performed with regard to only the Ethernet header 1*l*-01, that is, predetermined foremost bytes (e.g., 18 bytes) of a part remaining after excluding the SDAP header from data (e.g., a PDCP SDU) received from an upper layer device, and is not performed with regard to the SDAP header 1*l*-10 or an upper layer header rather than the Ethernet header. When an ROHC header compression procedure is performed on the data on which the Ethernet compression procedure has been proceeded, the PDCP layer device may perform an ROHC header compression procedure 1*l*-20 only on an upper layer header 1*l*-02 (e.g., a TCP/IP header or a UDP header) rather than the SDAP header 1*l*-10 and the compressed Ethernet header or the Ethernet header, to perform the header compression procedure on the TCP/IP header 1*l*-02. In addition, if an integrity protection and verification procedure is configured, the PDCP layer device performs an integrity protection on all of the SDAP header 1*l*-10, the compressed Ethernet header, and the compressed TCP/IP header (1*l*-25), calculates an MAC-I, and attaches the MAC-I to the back of the data (1*l*-30), and performs a ciphering procedure on the remaining part except for the SDAP header.

3. The third method: first, the transmission node performs a ROHC header compression procedure on an upper layer device header 1*l*-02 of data received from an upper layer, in a PDCP layer device. Specifically, in a case where an SDAP header is configured by an RRC message, in the ROHC header compression procedure, an ROHC header compression procedure 1*l*-15 is performed with regard to only an upper layer device header (e.g., a TCP/IP header or a UDP header), that is, predetermined foremost bytes (e.g., 18 bytes) of a part remaining after excluding the SDAP header and the Ethernet header from data (e.g., a PDCP SDU) received from an upper layer device, and is not performed with regard to the SDAP header 1*l*-10 and the Ethernet header 1*l*-01. When an Ethernet header compression procedure is performed on the data on which the ROHC compression procedure has been proceeded, the PDCP layer device may perform an Ethernet header compression procedure 1*l*-15 only on the Ethernet header 1*l*-01 rather than the SDAP header 1*l*-10 and the compressed upper layer header or the upper layer header (e.g., a TCP/IP header or a UDP header), to perform the header compression procedure on the Ethernet header 1*l*-01. In addition, if an integrity protection and verification procedure is configured, the PDCP layer device performs an integrity protection on all of the SDAP header 1*l*-10, the compressed Ethernet header, and the compressed TCP/IP header (1*l*-25), calculates an MAC-I, and attaches the MAC-I to the back of the data (1*l*-30), and performs a ciphering procedure on the remaining part except for the SDAP header.

The transmission node may process data received from an upper layer device, by the first, second, or third method described above, and may configure an RLC header and an MAC header to transmit the data through lower layers to the reception node.

Figure 1M:
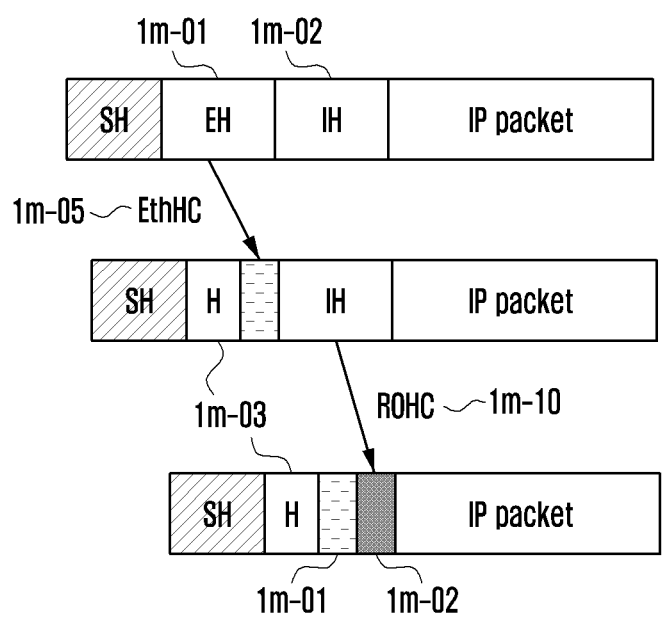
FIG. 1M is a diagram for proposing a separate header for compression of an Ethernet header according to an embodiment of the disclosure.

FIG. 1M is a diagram for proposing a separate header for compression of an Ethernet header according to an embodiment of the disclosure.

As described with reference to FIG. 1L, in a case where a transmission node processes and transmits data by the first, second, or third method at the transmission node, there may occur a problem when a reception node receives the data and processes same as in the case of 1*l*-03. The reason for the problem is that a reception node PDCP layer device or SDAP layer device is unable to distinguish between a compressed Ethernet header and a compressed TCP/IP header. That is, when the transmission node compresses an Ethernet header by applying an Ethernet header compression protocol, the size of the compressed Ethernet header is not indicated, and thus the compressed Ethernet header is not distinguished from a TCI/IP header compressed by an ROHC header compression protocol.

Therefore, an embodiment proposes generating and adding a separate header 1*m*-03 as illustrated in FIG. 1M. In the embodiment, the separate header may have a fixed size (e.g., 1 byte or 2 bytes), and may be separately named like an EthHC header. Specifically, a transmission node may perform an Ethernet header compression procedure on an Ethernet header 1*m*-01, and then generate a separate header 1*m*-03 and add the separate header in front of the compressed header. The separate header may include a length field capable of indicating the size of the compressed Ethernet header, may include an indicator field indicating whether an Ethernet header compression procedure has been performed, and may include a checksum field to allow a reception node to identify whether an Ethernet header decompression is successful. The transmission node may perform an ROHC header compression procedure on a TCP/IP header 1*m*-02. Alternatively, the transmission node may: define an indicator field indicating initialization of an Ethernet header compression protocol, and use the indicator field for protocol synchronization between the transmission node and the reception node; define and use a field indicating that the transmission node has initialized an Ethernet header compression protocol; or define and use a field indicating that the transmission node has initialized a buffer of an Ethernet header compression protocol.

Therefore, the reception node may read or exclude an SDAP header first, read the separate header and remove same, and then perform a decoding procedure. Thereafter, the reception node may identify the size of the compressed Ethernet header, perform an Ethernet header decompression procedure to reconstruct the Ethernet header (1*m*-01), then perform an ROHC header decompression procedure on the compressed TCP/IP header 1*m*-02 to reconstruct the TCP/IP header (1*m*-02), and transfer the data together with the reconstructed Ethernet header and TCP/IP header or the SDAP header to an upper layer.

A length field capable of indicating the size of a compressed Ethernet header, an indicator field indicating whether an Ethernet header compression procedure has been performed, a checksum field allowing a reception node to identify whether an Ethernet header decompression is successful, an indicator field indicating initialization of an Ethernet header compression protocol, a field indicating that an Ethernet header compression protocol has been initialized, etc. proposed above may be defined and used in an existing header (e.g., a PDCP header or an SDAP header) rather than the separate header.

If a network restricts both an Ethernet header compression protocol and an ROHC header compression protocol being configured for a terminal by an RRC message, the transmission node is not required to define a separate header or a field indicating length, proposed above. The PDCP layer device or SDAP layer device can read an Ethernet header or a TCP/IP header and identify the size thereof. Therefore, in a case where an Ethernet header compression protocol or an ROHC header compression protocol is configured, the device may compress only the Ethernet header or may perform an ROHC header compression only on the TCP/IP header.

The disclosure proposes to define, as a new PDCP control PDU, a feedback by which a transmission node and a reception node can exchange a response, so that the transmission node and the reception node can successfully perform an Ethernet header compression and decompression procedure. The newly defined PDCP control PDU may be used for feedback for an Ethernet header compression protocol, and may define and use: a field indicating whether a decompression procedure is successful, or indicating PDCP sequence numbers or COUNT values in which a decompression procedure has been successful until the current time point; a field indicating that an Ethernet header decompression failure has occurred; a field indicating a PDCP sequence number or a COUNT value in which an Ethernet header decompression failure has occurred; or a field indicating that an Ethernet header compression protocol be initialized because an Ethernet header decompression failure has occurred. Alternatively, a field indicating initialization of a buffer of an Ethernet header compression protocol may be defined and used.

For example, when a reception node identifies that an Ethernet header decompression failure has occurred, through a checksum field, the reception node may generate a PDCP control PDU defined above, transmit same to a transmission node to indicate that the Ethernet header decompression failure has occurred, and indicate initialization of an Ethernet header compression protocol. The transmission node may initialize the Ethernet header compression protocol, may include an indicator indicating that the Ethernet header compression protocol has been initialized, in data transmitted after the initialization, and may transmit the data to the reception node to be notified of the fact.

Hereinafter, a procedure of a transmission PDCP layer device for each bearer with respect to an Ethernet header protocol when a PDCP re-establishment procedure is triggered is proposed as below.

if it is not instructed to continue to use an Ethernet header compression protocol, initialize the Ethernet header compression protocol for UM data radio bearers (DRBs) or AM DRBs.

the AM DRBs newly perform an Ethernet header compression procedure on pieces of data to be transmitted and retransmitted, newly compress Ethernet headers and also newly perform ROHC header compressions to process the pieces of data, and transmit and retransmit the processed pieces of data.

the UM DRBs newly perform an Ethernet header compression procedure on pieces of data which have not been transmitted yet, newly compress Ethernet headers and also newly perform ROHC header compressions to process the pieces of data, and transmit the processed pieces of data.

Figure 1N:
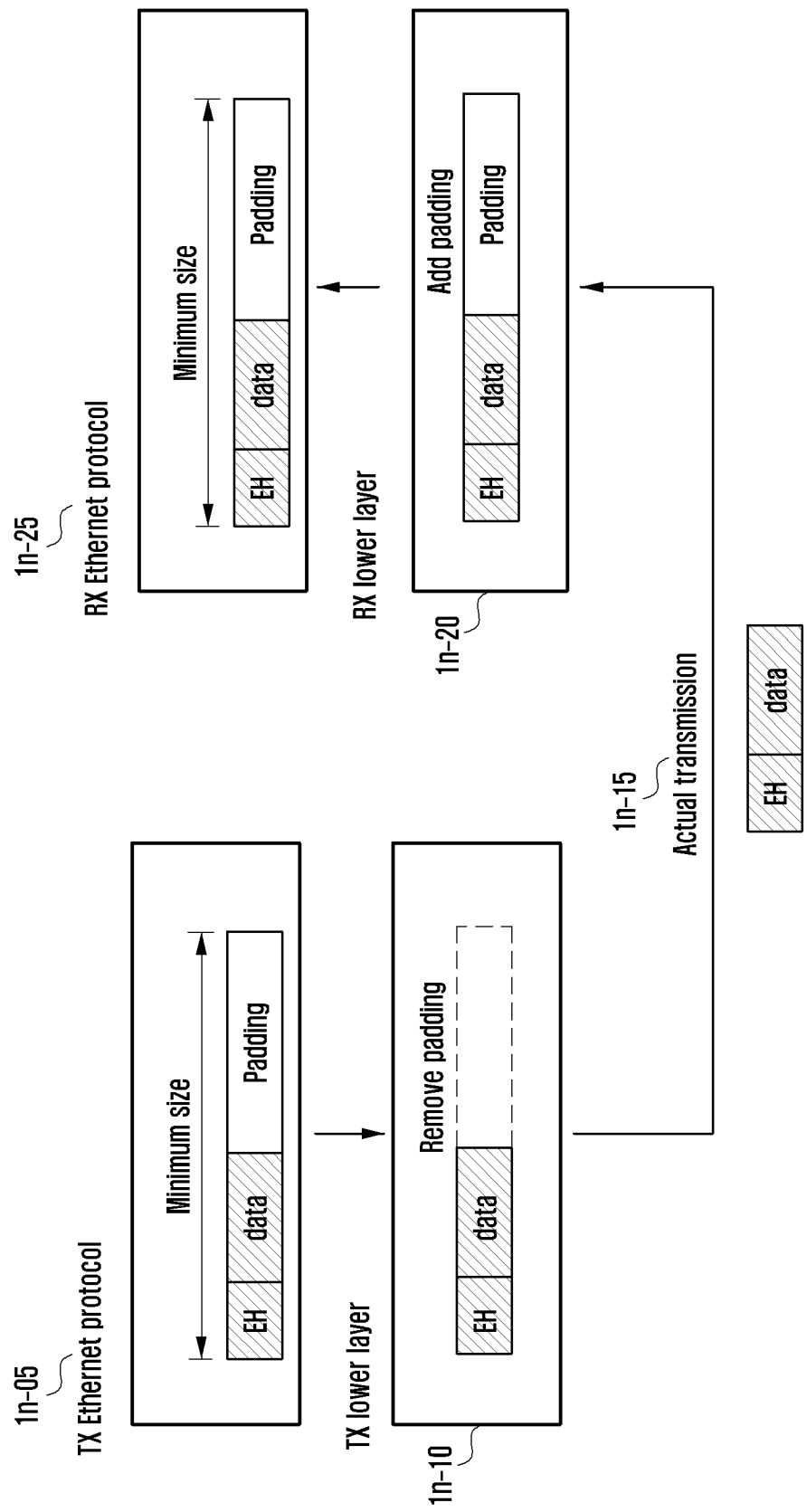
FIG. 1N is a diagram illustrating a method for supporting low transmission latency and high reliability by efficiently using wireless transmission resources in a wireless environment using Ethernet protocols according to an embodiment of the disclosure.
Figure 10:
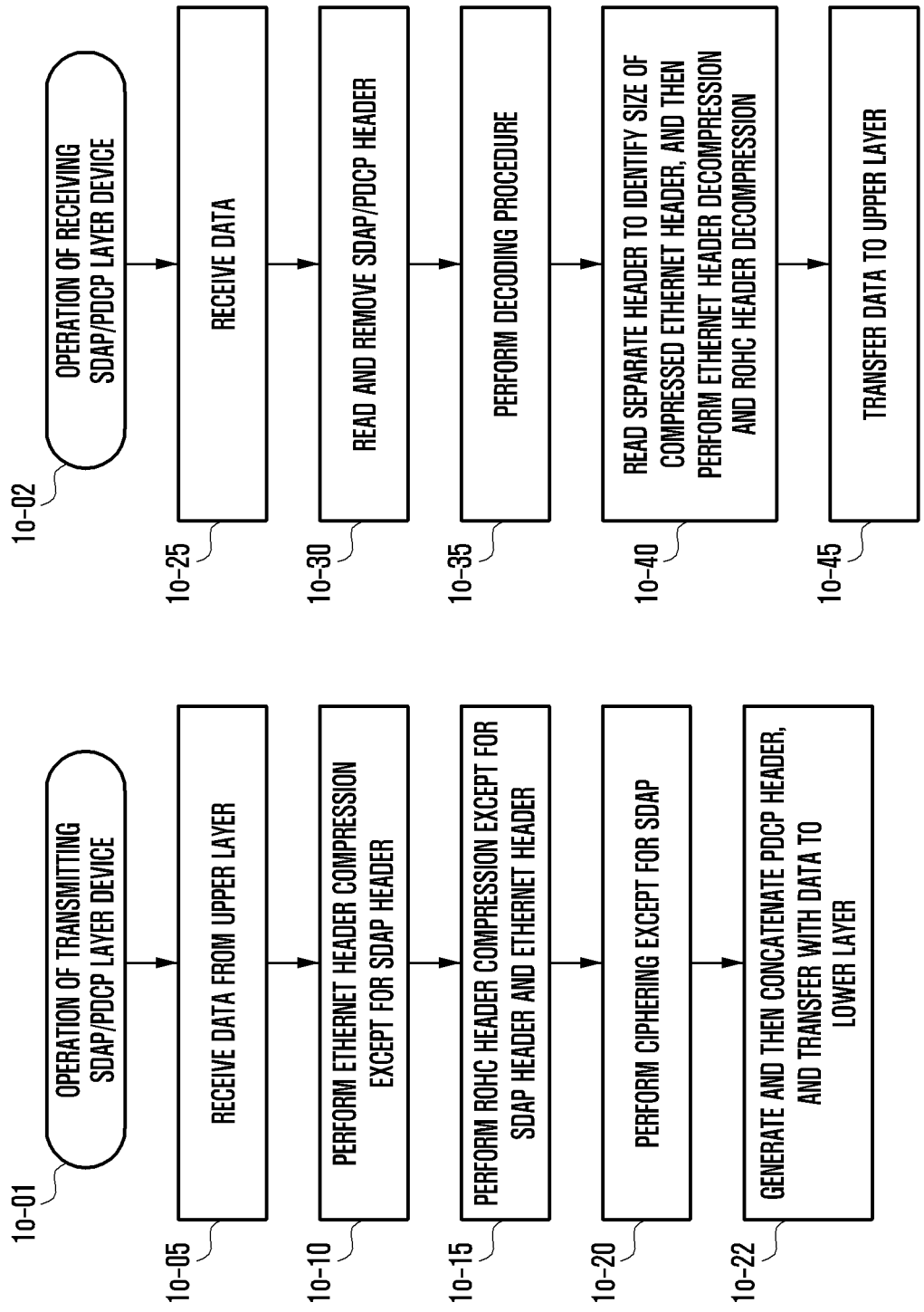

FIG. 1N is a diagram illustrating a method for supporting low transmission latency and high reliability by efficiently using wireless transmission resources in a wireless environment using Ethernet protocols according to an embodiment of the disclosure.

An Ethernet protocol designates a minimum size (e.g., 64 bytes). That is, if the size of data to be transmitted is smaller than a predesignated minimum size (e.g., 64 bytes), the transmission node adds padding to the data to make the minimum size, and then transmits the data. This is because, if the size of data received by an Ethernet protocol at a reception node is smaller than the predesignated minimum size, the reception node regards the data as abnormal data and discard same.

In the above description, when padding is added, a transmission node Ethernet protocol is required to indicate the length of the padding in an Ethernet header. Therefore, the Ethernet header may be identified and the size of the padding may be understood in the reception node Ethernet protocol.

A method proposed in the disclosure to efficiently use transmission resources is as follows.

If the size of data is smaller than a predesignated minimum size as in the case of 1$n$-05, a transmission node Ethernet protocol adds padding to the data to make the minimum size and then transfer the data to a lower layer device. An SDAP layer device or a PDCP layer device 1$n$-10, which is the lower layer device, reads an Ethernet header, removes padding if the padding exists, performs data processing to only actual data, and transmits the processed data.

A PDCP layer device or an SDAP layer device 1$n$-20, which is a reception node lower layer device, reads the Ethernet header, identifies the size of the padding, adds padding to make the minimum size if there is no padding or the size of the data is smaller than the minimum size, and transfers an Ethernet frame to an upper layer Ethernet protocol.

As described above, when actual data is transmitted in a wireless environment, only the actual data except for padding is transmitted. Therefore, transmission resources can efficiently be used so as to support low transmission latency and high reliability.

In FIG. 1N, the transmission node does not actually transmit the padding in the data of the Ethernet frame, omits the padding at the transmission node, indicates how much padding has been omitted, and transmits only the actual data. The reception node identifies the indication to identify how much padding has been omitted, reconstructs and adds the omitted padding, and transfers the padding to an upper layer device. This scheme is identical to the Ethernet header compression method proposed above. That is, fields, among fields of an Ethernet header, which are compressible or omissible, are not actually transmitted, and the transmission node compresses or omits the fields, indicates fields, which have been omitted, through a new header, and transmits only actually valid or important fields. The reception node identifies an indicator of the new header to identify fields, which have been omitted, reconstructs and adds the omitted fields, and transfers the fields to an upper layer device. When the transmission node omits the fields of the Ethernet header in the above description, the transmission node may omit the fields, based on fields of a previously generated Ethernet header, and when the reception node reconstructs the fields of the Ethernet header, the reception node may reconstruct the fields, based on fields of a previously received Ethernet header. As another method, in a case where unnecessary header fields are compressed or omitted without any connection with fields of a previous Ethernet header, the header fields may be reconstructed without any reference.

FIG. 1O is a diagram illustrating operations of transmission and reception SDAP layer devices or PDCP layer devices according to an embodiment of the disclosure.

First, an Ethernet header compression procedure is performed on an Ethernet header of data received from an upper layer (1$o$-1), in a transmission SDAP layer device or PDCP layer device. Specifically, in a case where an SDAP header is configured by an RRC message, the Ethernet header compression procedure of a transmission node is performed with regard to only the Ethernet header, that is, predetermined foremost bytes (e.g., 18 bytes) of a part remaining after excluding an SDAP header from data (e.g., a PDCP SDU, 1$o$-05) received from an upper layer device (1$o$-10), and is not performed with regard to the SDAP header or an upper layer header rather than the Ethernet header. When an ROHC header compression procedure is performed on the data on which the Ethernet compression procedure has been proceeded, the PDCP layer device of the transmission node may perform the ROHC header compression procedure only on an upper layer header (e.g., a TCP/IP header or a UDP header) rather than the SDAP header and the compressed Ethernet header or the Ethernet header, to perform the header compression procedure on the TCP/IP header (1$o$-15). In addition, if an integrity protection and verification procedure is configured, the PDCP layer device performs an integrity protection on all of the SDAP header 1$l$-10, the compressed Ethernet header, and the compressed TCP/IP header, calculates an MAC-I, and attaches the MAC-I to the back of the data, and performs a ciphering procedure on the remaining part except for the SDAP header (1$o$-20). The transmission node generates a PDCP header, then connects same to the data, and transfers the PDCP header together with the data to a lower layer (1$o$-22).

A reception SDAP layer device or PDCP layer device (1$o$-02): first reads or excludes, from received data (1$o$-25), an SDAP header (1$o$-30); performs a decoding procedure (1$o$-35); then reads and removes a separate header, then identifies the size of the compressed Ethernet header, performs an Ethernet header decompression procedure to reconstruct the Ethernet header, and then performs an ROHC header decompression procedure on the compressed TCP/IP header to reconstruct the TCP/IP header (1$o$-40); and transfers the data together with the reconstructed Ethernet header and TCP/IP header or the SDAP header to an upper layer (1o-45).

Figure 1P:
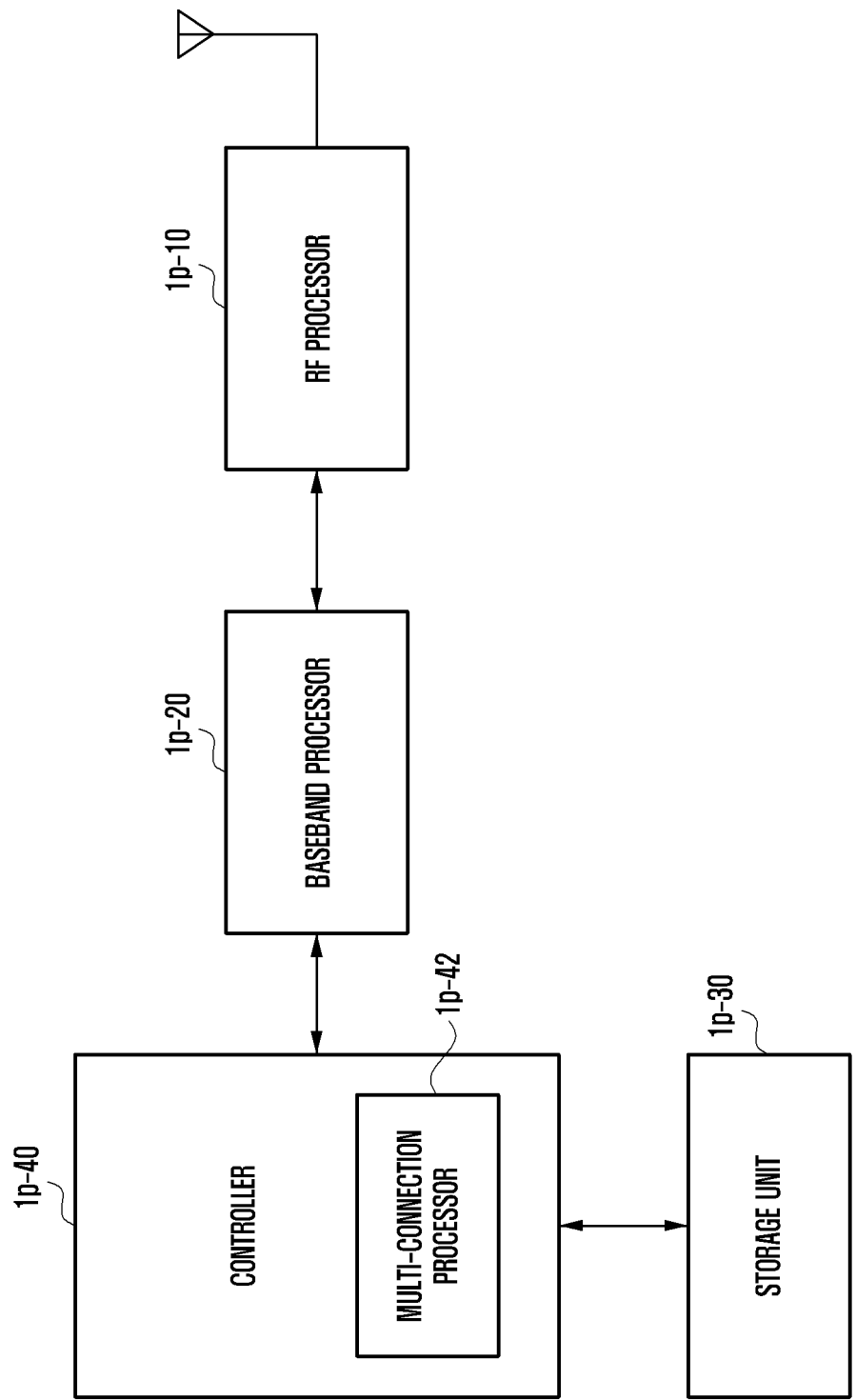
FIG. 1P is a block diagram illustrating a configuration of a terminal to which an embodiment of the disclosure may be applied.

FIG. 1P is a diagram illustrating a structure of a terminal to which an embodiment of the disclosure may be applied.

Referring to the diagram, the terminal includes a radio frequency (RF) processor 1p-10, a baseband processor 1p-20, a storage unit 1p-30, and a controller 1p-40.

The RF processor 1p-10 performs a function, such as signal band change, amplification, etc., for transmitting or receiving a signal through a wireless channel. That is, the RF processor 1p-10 may upconvert a baseband signal provided from the baseband processor 1p-20, into an RF band signal, and then transmit the RF band signal through an antenna, and may downconvert an RF band signal received through the antenna, into a baseband signal. For example, the RF processor 1p-10 may include a transmission filter, a reception filter, an amplifier, a mixer, an oscillator, a digital-to-analog converter (DAC), an analog-to-digital converter (ADC), and the like. In the diagram, only one antenna is illustrated, but the terminal may include a plurality of antennas. In addition, the RF processor 1p-10 may include a plurality of RF chains. Furthermore, the RF processor 1p-10 may perform beamforming. To perform the beamforming, the RF processor 1p-10 may adjust the phase and size of each of signals transmitted or received through a plurality of antennas or antenna elements. In addition, the RF processor may perform MIMO, and may receive several layers when a MIMO operation is performed. The RF processor 1p-10 may properly configure a plurality of antennas or antenna elements according to a control of the controller to perform reception beam sweeping or adjust the direction and the beam width of a reception beam to be in conjunction with a transmission beam.

The baseband processor 1p-20 performs a function of conversion between a baseband signal and a bit stream according to a physical layer protocol of a system. For example, when data is transmitted, the baseband processor 1p-20 generates complex symbols by encoding and modulating a transmission bit stream. In addition, when data is received, the baseband processor 1p-20 reconstructs a reception bit stream by demodulating and decoding a baseband signal provided from the RF processor 1p-10. For example, in a case where an orthogonal frequency division multiplexing (OFDM) scheme is applied, when data is transmitted, the baseband processor 1p-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 1p-20 divides a baseband signal provided from the RF processor 1p-10, by the units of OFDM symbols, reconstructs signals mapped to subcarriers, through fast Fourier transform (FFT) calculation, and then reconstructs a reception bit stream through demodulation and decoding.

The baseband processor 1p-20 and the RF processor 1p-10 transmit and receive a signal as described above. Accordingly, the baseband processor 1p-20 and the RF processor 1p-10 may be called a transmitter, a receiver, a transceiver, or a communication unit. Furthermore, at least one of the baseband processor 1p-20 and the RF processor 1p-10 may include a plurality of communication modules to support a plurality of different wireless access technologies. In addition, at least one of the baseband processor 1p-20 and the RF processor 1p-10 may include different communication modules to process signals in different frequency bands. For example, different wireless access technologies may include LTE network, NR network, etc. In addition, different frequency bands may include a super high frequency (SHF) (e.g., 2.5 GHz and 5 GHz) band, and a millimeter (mm) wave (e.g., 60 GHz) band.

The storage unit 1p-30 stores data such as a basic program, an application program, and configuration information for an operation of the terminal. The storage unit 1p-30 provides stored data in response to a request of the controller 1p-40.

The controller 1p-40 controls overall operations of the terminal. For example, the controller 1p-40 transmits or receives a signal through the baseband processor 1p-20 and the RF processor 1p-10. In addition, the controller 1p-40 records and reads data in and from the storage unit 1p-40. To this end, the controller 1p-40 may include at least one processor. For example, the controller 1p-40 may include a communication processor (CP) performing a control for communication, and an application processor (AP) controlling a higher layer, such as an application program. In addition, the controller 1p-40 may further include a multi-connection processor 1p-42 configured to support multi-connection.

Figure 1Q:
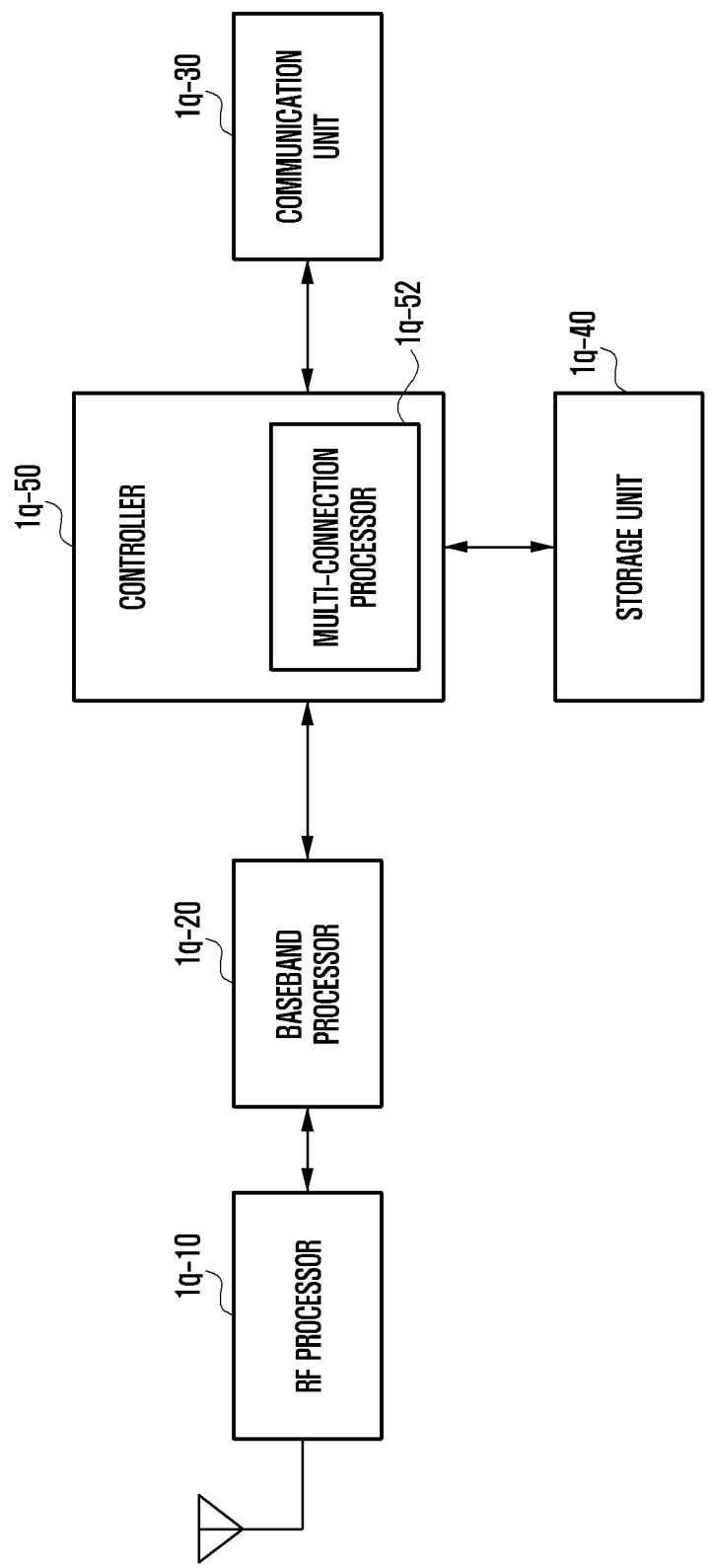
FIG. 1Q is a block diagram illustrating a configuration of a transmission reception point (TRP) in a wireless communication system to which an embodiment of the disclosure may be applied.

FIG. 1Q illustrates a block configuration of a TRP in a wireless communication system to which an embodiment of the disclosure may be applied.

As illustrated in the diagram, the base station includes a RF processor 1q-10, a baseband processor 1q-20, a communication unit 1q-30, a storage unit 1q-40, and a controller 1q-50.

The RF processor 1q-10 performs a function, such as signal band change, amplification, etc., for transmitting or receiving a signal through a wireless channel. That is, the RF processor 1q-10 may upconvert a baseband signal provided from the baseband processor 1q-20, into an RF band signal, and then transmit the RF band signal through an antenna, and may downconvert an RF band signal received through the antenna, into a baseband signal. For example, the RF processor 1q-10 may include a transmission filter, a reception filter, an amplifier, a mixer, an oscillator, a DAC, an ADC, and the like. In the diagram, only one antenna is illustrated, but the first access node may include a plurality of antennas. In addition, the RF processor 1q-10 may include a plurality of RF chains. Furthermore, the RF processor 1q-10 may perform beamforming. To perform the beamforming, the RF processor 1q-10 may adjust the phase and size of each of signals transmitted or received through a plurality of antennas or antenna elements. The RF processor may perform a downlink MIMO operation by transmitting at least one layer.

The baseband processor 1q-20 performs a function of conversion between a baseband signal and a bit stream according to a physical layer protocol of a system. For example, when data is transmitted, the baseband processor 1q-20 generates complex symbols by encoding and modulating a transmission bit stream. In addition, when data is received, the baseband processor 1q-20 reconstructs a reception bit stream by demodulating and decoding a baseband signal provided from the RF processor 1q-10. For example, in a case where an OFDM scheme is applied, when data is transmitted, the baseband processor 1q-20 generates complex symbols by encoding and modulating a transmission bit stream, maps the complex symbols to subcarriers, and then configures OFDM symbols through IFFT calculation and CP insertion. In addition, when data is received, the baseband processor 1q-20 divides a baseband signal provided from the RF processor 1q-10, by the units of OFDM symbols, reconstructs signals mapped to subcarriers, through FFT calculation, and then reconstructs a reception bit stream through demodulation and decoding. The baseband processor 1q-20 and the RF processor 1q-10 transmit and receive a signal as described above. Accordingly, the baseband processor 1q-20 and the RF processor 1q-10 may be called a transmitter, a receiver, a transceiver, a communication unit, or a wireless communication unit.

The communication unit 1q-30 provides an interface for performing communication with other nodes within a network.

The storage unit 1q-40 stores data such as a basic program, an application program, and configuration information for an operation of the base station. Particularly, the storage unit 1q-40 may store information relating to a bearer assigned to a connected terminal, a measurement result reported from a connected terminal, etc. In addition, the storage unit 1q-40 may store information serving as a determination criterion of whether to provide or stop providing multi-connection to a terminal. The storage unit 1q-40 provides stored data in response to a request of the controller 1q-50.

The controller 1q-50 controls overall operations of the main base station. For example, the controller 1q-50 transmits or receives a signal through the baseband processor 1q-20 and the RF processor 1q-10, or through the backhaul communication unit 1q-30. In addition, the controller 1q-50 records and reads data in and from the storage unit 1q-40. To this end, the controller 1q-50 may include at least one processor. In addition, the controller 1q-50 may further include a multi-connection processor 1q-52 configured to support multi-connection.

Embodiment 2

Figure 2A:
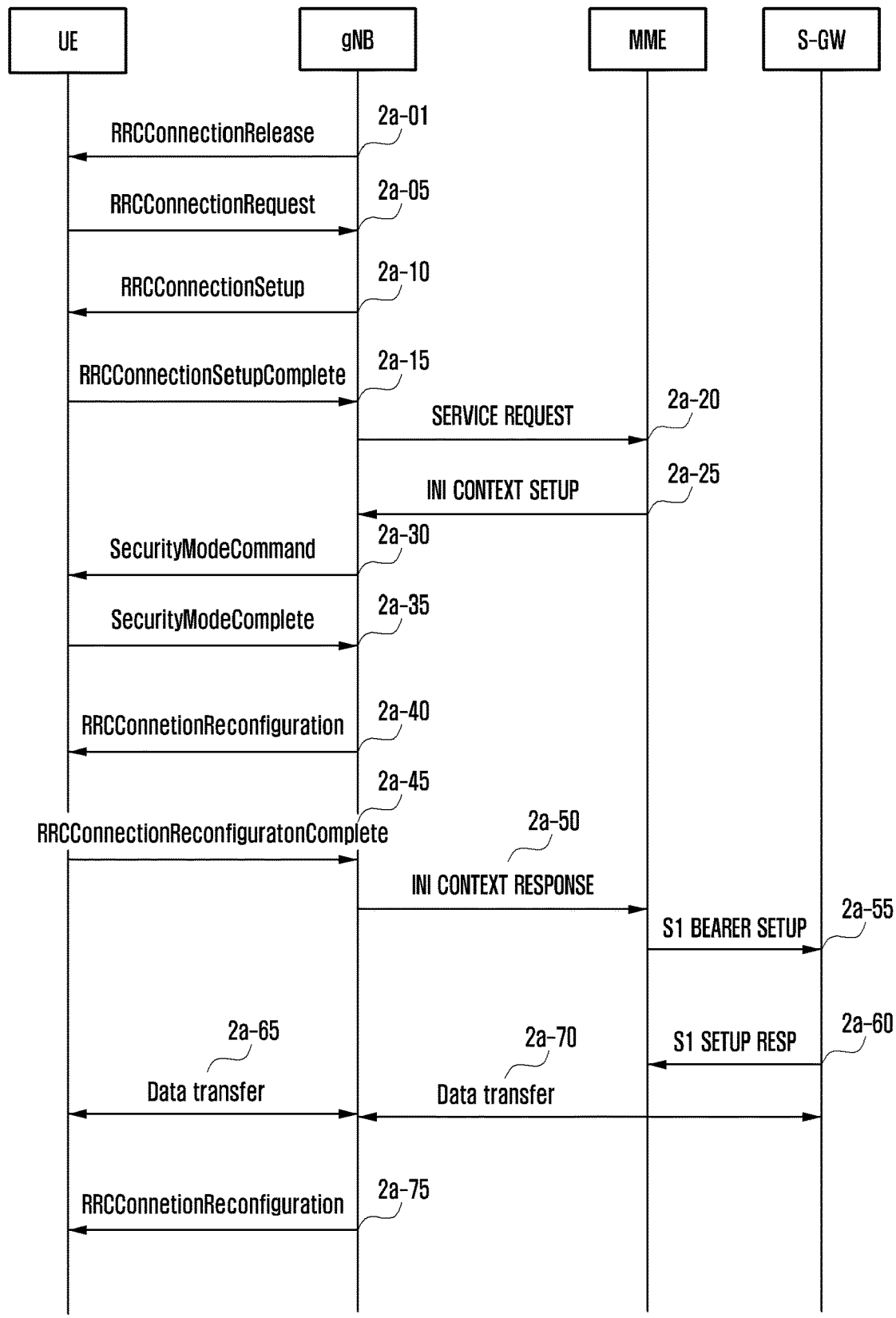
FIG. 2A is a diagram illustrating a procedure in which a base station configures Ethernet header protocol-related configuration information for a terminal when the terminal configures a connection with a network according to an embodiment of the disclosure.

FIG. 2A is a diagram illustrating a procedure in which a base station configures Ethernet header protocol-related configuration information for a terminal when the terminal configures a connection with a network according to an embodiment of the disclosure.

Referring to FIG. 2A, the disclosure provides a description for a procedure in which a terminal switches an RRC idle mode or an RRC inactive mode (or lightly-connected mode) to an RRC connected mode, and configures a connection with a network, and a description for a procedure in which a base station configures Ethernet protocol-related configuration information for the terminal. Specifically, the base station may instruct an SDAP layer device or a PDCP layer device on whether to perform an Ethernet header compression or decompression procedure, may indicate whether the same is to be used only for the uplink, the downlink, or both of them bidirectionally, and may configure Ethernet header protocol-related configuration information only for a terminal having a terminal capability by which the terminal can use an Ethernet protocol, or a terminal having a terminal capability by which the terminal can use an Ethernet header compression and decompression procedure.

When the terminal reports a terminal capability to the base station, the terminal may define a new indicator, and may report whether the terminal can use an Ethernet protocol, or whether the terminal can use an Ethernet header compression and decompression procedure, to the base station by using the indicator. In addition, what type of Ethernet frame or Ethernet header is to be used may be configured for each bearer or logical channel, thereby configuring fields configured in an Ethernet header, the bytes of the Ethernet header, the bits of each of the fields of the Ethernet header, or the configuration of the fields of the Ethernet header. Moreover, if padding is added to an Ethernet frame, whether or not to configure the use of a function preventing transmission of padding in a real wireless link by removing the padding by a transmission node and adding the padding by a reception node may be indicated.

In FIG. 2A, when a terminal transmitting or receiving data in an RRC connected mode does not transmit or receive data due to a predetermined reason or during a predetermined time interval, a base station may transmit an RRCConnectionRelease message to the terminal to allow the terminal to be switched to an RRC idle mode or an RRC inactive mode (operation 2a-01). Thereafter, when data to be transmitted occurs, the terminal (hereinafter, an idle mode UE or an inactive UE), which is not currently connected, may perform an RRC connection establishment process or an RRC Connection Resume procedure with the base station. The terminal may establish a reverse transmission synchronization with the base station through a random access process, and transmit an RRCConnectionRequest message (an RRCResumeRequest message for the Resume procedure) to the base station (operation 2a-05). The message may contain an identifier of the terminal and a cause (establishmentCause) of configuring a connection.

The base station may transmit an RRCConnectionSetup message (an RRCResume message for the Resume procedure) to the terminal so that the terminal configures an RRC connection (operation 2a-10). The message may include information indicating whether or not to use an Ethernet protocol or whether or not to use an Ethernet header compression and decompression procedure, for each logical channel (logicalchannelconfig), each bearer, each PDCP device (PDCP-config), or each SDAP layer device. In addition, more specifically, whether or not to use the Ethernet protocol or whether or not to use the Ethernet header compression and decompression procedure may be indicated only for an IP flow or a QoS flow in each logical channel, each bearer, or each PDCP device (or SDAP device) (information on an IP flow or a QOS flow for which the Ethernet protocol is or is not to be applied, or for which the Ethernet header compression method is or is not to be used may be configured for an SDAP device, so that the SDAP device may instruct a PDCP device on whether or not to apply the Ethernet protocol or whether or not to use the Ethernet header compression method, for each QoS flow. In another method, an SDAP layer device or a PDCP device may identify each QoS flow by itself, and determine whether or not to apply the Ethernet protocol or whether or not to apply the Ethernet header compression method).

Furthermore, as described above, if whether or not to apply the Ethernet protocol, or use of the Ethernet header compression method is indicated, an identifier for a predefined library or dictionary to be used in connection with the Ethernet header compression method (or whether or not to apply the Ethernet protocol), or the size of a buffer to be used therefor may be indicated. In addition, the message may include a command for setting up or releasing execution of the Ethernet header compression method or determination regarding whether or not to apply the Ethernet protocol.

In addition, when the base station configures whether or not to apply the Ethernet protocol or use of the Ethernet header compression method, the base station may always configure an RLC AM bearer (a mode employing an ARQ function and a retransmission function and thus causing no loss) or an RLC UM bearer, and may configure the protocol or method together with a header compression protocol (ROHC) or may not configure them together in some cases. Moreover, the message may indicate whether to use a function of an SDAP layer device or whether to use an SDAP header, for each logical channel (logicalchannelconfig), each bearer, or each PDCP device (PDCP-config), and the message may indicate whether to apply an ROHC (IP packet header compression) for each logical channel (logicalchannelconfig), each bearer, or each PDCP device (PDCP-config), and may use indicators to configure whether to apply the ROHC in the uplink and downlink, respectively.

In addition, whether to use a user data compression method (UDC) in each of the uplink and downlink may be configured for each logical channel, each bearer, or each PDCP device. That is, the method may be configured to be used in the uplink and not to be used in the downlink. On the contrary, the method may be configured not to be used in the uplink and to be used in the downlink. In addition, the method may be configured to be used in both directions.

In addition, the message may configure both an Ethernet header compression procedure and an ROHC header compression procedure. Furthermore, the message may define and indicate an indicator (drbEthHCContinue) indicating that Ethernet header compression protocol-related configuration information or context continue to be used without being initialized in a case of a handover (e.g., a handover in the base station), or when an RRC inactive mode transitions into an RRC connected mode. The terminal having received the indicator may not initialize, and continue to use the Ethernet header compression protocol-related configuration information or context by considering the indicator when the terminal re-establishes an SDAP layer device or a PDCP layer device. Accordingly, the overhead caused by reconfiguration of an Ethernet header compression protocol can be reduced.

In addition, the base station may define a new indicator through the message to indicate initialization of Ethernet header compression protocol-related configuration information or context. In addition, the RRC message may configure whether or not to configure an SDAP protocol or an SDAP header. In addition, the message configures what type of Ethernet frame or Ethernet header is to be used, for each bearer or logical channel, thereby configuring fields configured in an Ethernet header, the bytes of the Ethernet header, the bits of each of the fields of the Ethernet header, or the configuration of the fields of the Ethernet header. Moreover, if padding is added to an Ethernet frame, whether or not to configure the use of a function preventing transmission of padding in a real wireless link by removing the padding by a transmission node and adding the padding by a reception node may be indicated.

In addition, the message contains RRC connection configuration information. An RRC connection is also called a signaling radio bearer (SRB), and is used for transmission and reception of an RRC message that is a control message between the terminal and the base station. The terminal having configured the RRC connection transmits an RRCConnetionSetupComplete message to the base station (operation 2a-15). If the base station does not know the terminal capability of the terminal configuring the current connection or desires to identify the terminal capability, the base station may transmit a message asking about the capability of the terminal. Thereafter, the terminal may transmit a message reporting the capability of the terminal. The message may show whether or not the terminal can use an Ethernet protocol or an Ethernet header compression and decompression procedure, and an indicator indicating the above fact may be included in the message and then be transmitted.

The RRCConnetionSetupComplete message includes a control message, called SERVICE REQUEST, through which the terminal requests the configuration of a bearer for a predetermined service from an MME. The base station transmits the SERVICE REQUEST message contained in the RRCConnetionSetupComplete message to the MME (operation 2a-20), and the MME determines whether to provide the service requested by the terminal. If a result of the determination shows that the MME has decided to provide the service requested by the terminal, the MME transmits an INITIAL CONTEXT SETUP REQUEST message to the base station (operation 2a-25). The message includes information such as quality-of-service (QoS) information to be applied at the time of configuration of a data radio bearer (DRB), and security-related information (e.g., a security key or a security algorithm) to be applied to the DRB. The base station exchanges a SecurityModeCommand message (operation 2a-30) and a SecurityModeComplete message (operation 2a-35) with the terminal in order to configure security with the terminal. When the configuring of the security is completed, the base station transmits an RRCConnectionReconfiguration message to the terminal (2a-40).

The message may include information indicating whether or not to use an Ethernet protocol or whether or not to use an Ethernet header compression and decompression procedure, for each logical channel (logicalchannelconfig), each bearer, each PDCP device (PDCP-config), or each SDAP layer device. In addition, more specifically, the message may indicate whether or not to use the Ethernet protocol or whether or not to use the Ethernet header compression and decompression procedure only for an IP flow or a QoS flow in each logical channel, each bearer, or each PDCP device (or SDAP device) (the message may configure, for an SDAP device, information on an IP flow or a QOS flow for which the Ethernet protocol is or is not to be applied, or for which the Ethernet header compression method is or is not to be used, so that the SDAP device may instruct a PDCP device on whether or not to apply the Ethernet protocol or whether or not to use the Ethernet header compression method, for each QoS flow. In another method, an SDAP layer device or a PDCP device may identify each QoS flow by itself, and determine whether or not to apply the Ethernet protocol or whether or not to apply the Ethernet header compression method).

Furthermore, if whether or not to apply the Ethernet protocol or use of the Ethernet header compression method is indicated through the message, an identifier for a predefined library or dictionary to be used in connection with the Ethernet header compression method (or whether or not to apply the Ethernet protocol), or the size of a buffer to be used therefor may be indicated. In addition, the message may include a command for setting up or releasing execution of the Ethernet header compression method or determination regarding whether or not to apply the Ethernet protocol.

In addition, when whether or not to apply the Ethernet protocol or use of the Ethernet header compression method is configured, an RLC AM bearer (a mode employing an ARQ function and a retransmission function and thus causing no loss) or an RLC UM bearer may always be configured, and the protocol or method may be configured together with a header compression protocol (ROHC) or may not be configured together in some cases. Moreover, the message may indicate whether to use a function of an SDAP layer device or whether to use an SDAP header, for each logical channel (logicalchannelconfig), each bearer, or each PDCP device (PDCP-config), and the message may indicate whether to apply an ROHC (IP packet header compression) for each logical channel (logicalchannelconfig), each bearer, or each PDCP device (PDCP-config), and may use indicators to configure whether to apply the ROHC in the uplink and downlink, respectively.

In addition, whether to use a user data compression method (UDC) in each of the uplink and downlink may be configured for each logical channel, each bearer, or each PDCP device through the message described above. That is, the method may be configured to be used in the uplink and not to be used in the downlink. On the contrary, the method may be configured not to be used in the uplink and to be used in the downlink. In addition, the method may be configured to be used in both directions.

In addition, the message may configure both an Ethernet header compression procedure and an ROHC header compression procedure. Furthermore, the message may define and indicate an indicator (drbEthHCContinue) indicating that Ethernet header compression protocol-related configuration information or context continue to be used without being initialized in a case of a handover (e.g., a handover in the base station), or when an RRC inactive mode transitions into an RRC connected mode. The terminal having received the indicator may not initialize, and continue to use the Ethernet header compression protocol-related configuration information or context by considering the indicator when the terminal re-establishes an SDAP layer device or a PDCP layer device. Accordingly, the overhead caused by reconfiguration of an Ethernet header compression protocol can be reduced.

In addition, the message may define a new indicator to indicate initialization of Ethernet header compression protocol-related configuration information or context. In addition, the RRC message may configure whether or not to configure an SDAP protocol or an SDAP header. In addition, the message configures what type of Ethernet frame or Ethernet header is to be used, for each bearer or logical channel, thereby configuring fields configured in an Ethernet header, the bytes of the Ethernet header, the bits of each of the fields of the Ethernet header, or the configuration of the fields of the Ethernet header. Moreover, if padding is added to an Ethernet frame, whether or not to configure the use of a function preventing transmission of padding in a real wireless link by removing the padding by a transmission node and adding the padding by a reception node may be indicated.

In addition, the message includes configuration information of a DRB through which user data is processed, and the terminal configures the DRB by applying the information and transmits an RRCConnectionReconfigurationComplete message to the base station (operation 2a-45). The base station having completed the configuring of the DRB with the terminal transmits an INITIAL CONTEXT SETUP COMPLETE message to the MME (operation 2a-50), and the MME having received the message exchanges an S1 BEARER SETUP message and an S1 BEARER SETUP RESPONSE message with an S-GW in order to configure a S1 bearer with the S-GW (operation 2a-55 and operation 2a-60). The S1 bearer is a data transmission connection configured between the S-GW and the base station and corresponds to the DRB in one-to-one correspondence. If all the above processes are completed, the terminal transmits or receives data to or from the base station through the S-GW (operation 2a-65 and operation 2a-70). As described above, a general data transmission process generally includes three stages of RRC connection configuration, security configuration, and DRB configuration. In addition, the base station may transmit an RRCConnectionReconfiguration message to newly establish, add, or change a configuration for the terminal due to a predetermined reason (operation 2a-75).

Figure 2B:
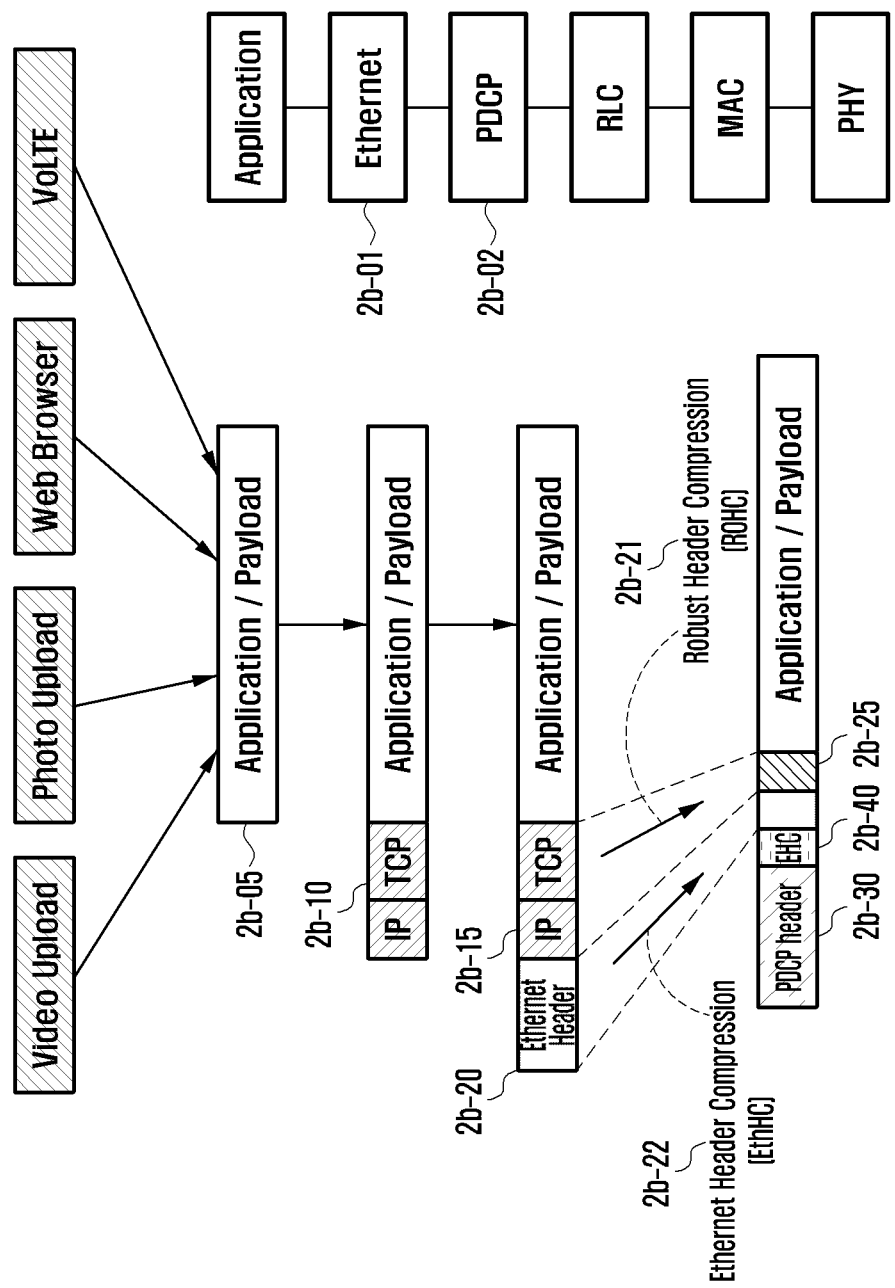
FIG. 2B is a diagram illustrating an Ethernet header compression (EthHC) method according to an embodiment of the disclosure.

FIG. 2B is a diagram illustrating an Ethernet header compression (EthHC) method according to an embodiment of the disclosure.

In FIG. 2B, upper layer data 2b-05 may be generated as data corresponding to services, such as video transmission, photo transmission, Web search, and voice over LTE (VoLTE). Pieces of data generated in an application layer device may be processed through a TCP/IP or a UDP corresponding to a network data transmission layer, or processed through an Ethernet protocol, may configure individual headers 2b-10, 2b-15, and 2b-20 (an upper layer header or an Ethernet header), and may be transferred to a PDCP layer. When data (a PDCP SDU) is received from an upper layer, the PDCP layer may perform the following procedure.

If a header compression (ROHC) or an Ethernet header compression procedure is configured to be used in the PDCP layer, by an RRC message used as in operation 2a-10, 2a-40, or 2a-75 of FIG. 2A, the TCP/IP headers may be compressed according to an ROHC as in the case of 2b-21, and an Ethernet header compression procedure may be performed on the Ethernet header 2b-20 in a PDCP layer device as in the case of 2b-22. The transmission node may configure a separate Ethernet header compression (EHC) header 2b-40 having a field for indicating whether the Ethernet header has been compressed, or a field for indicating fields of the Ethernet header, which have been compressed (omitted) or have not been compressed (not omitted), and locate the header in front of the compressed header. If an integrity verification is configured, the transmission node may: perform an integrity protection on a PDCP header, the EHC header, the compressed headers, and the data; perform a ciphering procedure on the EHC header, the compressed headers, and the data, or the compressed headers and the data except for the EHC header; and configure the PDCP header 2b-30, so as to configure a PDCP PDU. In the above description, a PDCP layer device includes a header compression/decompression device, determines whether or not to perform a header compression on each data, according to the configuration of the RRC message described above, and uses the header compression/decompression device. At the transmission node, a transmission PDCP layer device compresses an Ethernet header or an upper layer header (e.g., a TCP/IP header) by using a header compression device, and at the reception node, a reception PDCP layer device performs a header decompression on an Ethernet header or an upper layer header (e.g., a TCP/IP header) by using a header decompression device.

The procedure in FIG. 2B described above may also be applied to header compression of downlink data, as well as compression of an uplink header by a terminal. In addition, the above description about uplink data may also be applied to downlink data in the same way.

A method for performing an Ethernet header compression on an Ethernet header, proposed in the disclosure, may imply a method for omitting fields indicating static information, and indicating only changed pieces of information, so that the size of the header is reduced. Therefore, at the first time (i.e., at the time of initial transmission), entire header information and configuration information for a compression (e.g., an identifier (type) for each traffic (or service) for an Ethernet protocol, a sequence number for each traffic (or service), and compression rate-related information) may be included in the header and then transmitted. In an embodiment of the disclosure, at the time of transmission after initial transmission, a header is configured to include only fields corresponding to changed information and to omit or not transmit fields (e.g., a transmission address field or reception address field (MAC address), a preamble field, a start of frame delimiter (SFD), a frame checksum (FCS), or an Ethernet type field) corresponding to information which is not changed compared to the entire information which has been initially transmitted. Therefore, the size of the header can be reduced. As another method, in an embodiment of the disclosure, the transmission node may: distinguish between compressible fields and incompressible fields; if values of the compressible fields have not been changed in comparison with field values of a firstly transmitted whole header, compress (or omit) and transmit only the compressible fields; and always transmit the incompressible fields without compressing (or omitting). In addition, the transmission node of an embodiment of the disclosure may transmit a whole header again if there is any one field, among compressible fields, which has been changed in comparison with field values of a previously transmitted whole header. The reception PDCP layer device may always transmit a feedback indicating that a whole header has been received well, to the transmission PDCP layer device every time the reception PDCP layer device receives the whole header.

In FIG. 2B, a PDCP layer device or SDAP layer device of the reception node may: receive a compressed Ethernet frame 2b-25 from a lower layer device; and in a case where an Ethernet header compression procedure is configured, identify each of the field values of an Ethernet header of an Ethernet frame having a whole header which has firstly been received and has not been compressed, and store the identified field values in a buffer 2b-30 for a reception Ethernet decompression.

Figure 2C:
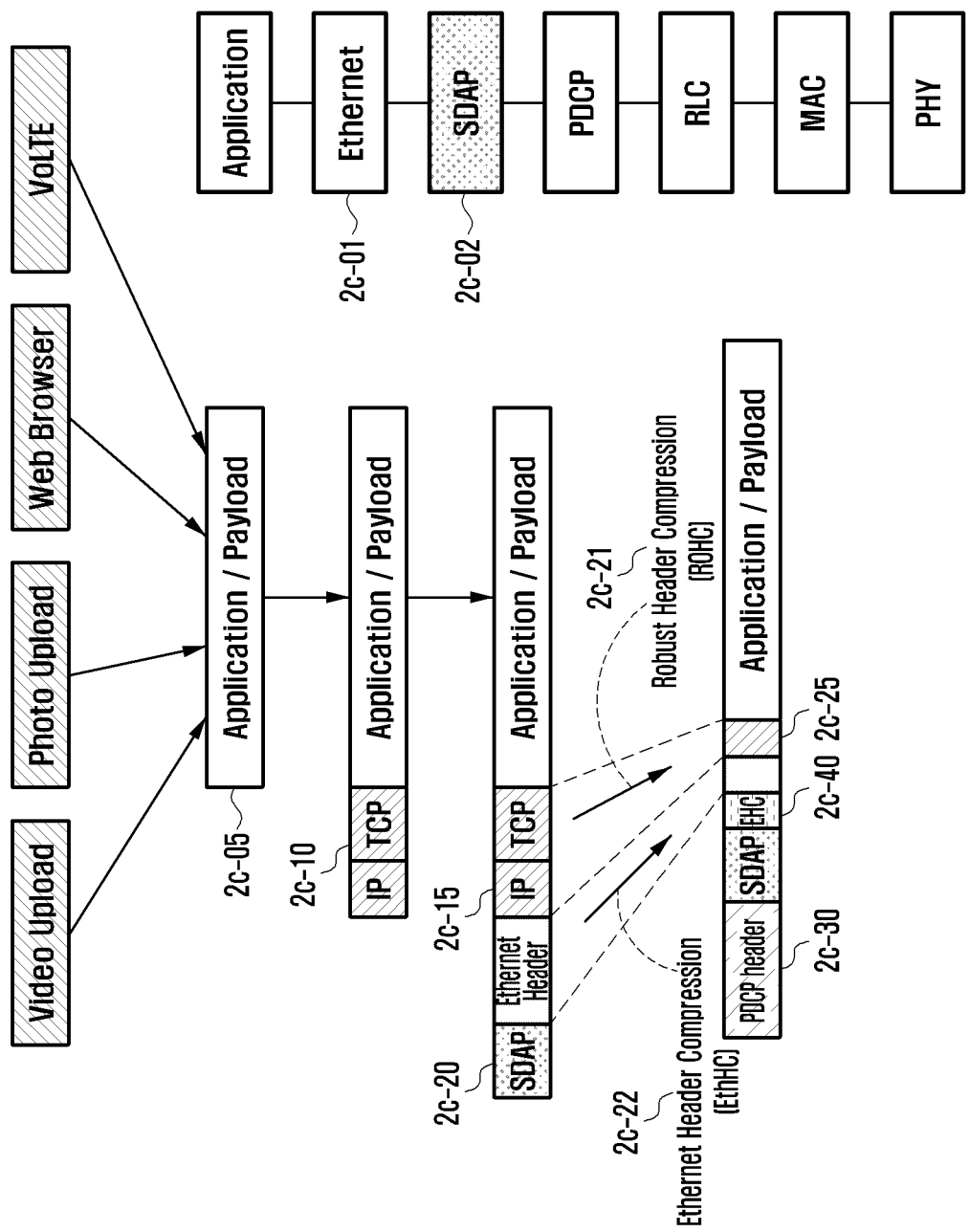
FIG. 2C is a diagram illustrating an Ethernet header compression method proposed for a case where a service data adaptation protocol (SDAP) header or layer device is configured, according to an embodiment of the disclosure.

FIG. 2C is a diagram illustrating an Ethernet header compression method proposed for a case where an SDAP header or layer device is configured, according to an embodiment of the disclosure.

In FIG. 2C, upper layer data 2c-05 may be generated as data corresponding to services, such as video transmission, photo transmission, Web search, and VoLTE. Pieces of data generated in an application layer device may be processed through a TCP/IP or a UDP corresponding to a network data transmission layer, or processed through an Ethernet protocol, may be processed in an SDAP layer device, may configure individual headers 2c-10, 2c-15, and 2c-20 (an upper layer header, an Ethernet header, or an SDAP header), and may be transferred to a PDCP layer. When data (a PDCP SDU) is received from an upper layer, the PDCP layer may perform the following procedure.

If a header compression (ROHC) or an Ethernet header compression procedure is configured to be used in the PDCP layer, by an RRC message used as in operation 2a-10, 2a-40, or 2a-75 of FIG. 2A, the TCP/IP headers may be compressed according to an ROHC as in the case of 2c-21, and an Ethernet header compression procedure may be performed on the Ethernet header 2c-20 rather than the SDAP header in a PDCP layer device as in the case of 2c-22. The transmission node may configure a separate Ethernet header compression (EHC) header 2c-40 having a field for indicating whether the Ethernet header has been compressed, or a field for indicating fields of the Ethernet header, which have been compressed (omitted) or have not been compressed (not omitted), and locate the header in front of the compressed header. If an integrity verification is configured, the transmission node may: perform an integrity protection on the SDAP header, a PDCP header, the EHC header, the compressed headers, and the data; perform a ciphering procedure on the EHC header, the compressed headers, and the data except for the SDAP header, or the compressed headers and the data except for the SDAP header and the EHC header; and configure the PDCP header 2c-30, so as to configure a PDCP PDU.

The PDCP layer device includes a header compression/decompression device, determines whether or not to perform a header compression on each data, according to the configuration of the RRC message described above, and uses the header compression/decompression device. At the transmission node, a transmission PDCP layer device compresses an Ethernet header or an upper layer header (e.g., a TCP/IP header) by using a header compression device, and at the reception node, a reception PDCP layer device performs a header decompression on an Ethernet header or an upper layer header (e.g., a TCP/IP header) by using a header decompression device.

The procedure in FIG. 2C described above may also be applied to header compression of downlink data as well as compression of an uplink header by a terminal. In addition, the above description about uplink data may also be applied to downlink data in the same way.

A method for performing an Ethernet header compression on an Ethernet header, proposed in the disclosure, may imply a method for omitting fields indicating static information, and indicating only changed pieces of information, so that the size of the header is reduced. Therefore, at the first time (i.e., at the time of initial transmission), entire header information and configuration information for a compression (e.g., an identifier (type) for each traffic (or service) for an Ethernet protocol, a sequence number for each traffic (or service), and compression rate-related information) may be included and then transmitted. At the time of transmission after initial transmission, the transmission node of an embodiment of the disclosure may configure a header to include only fields corresponding to changed information and to omit or not transmit fields (e.g., a transmission address field or reception address field (MAC address), a preamble field, a start of frame delimiter (SFD), a frame checksum (FCS), or an Ethernet type field) corresponding to information which is not changed compared to the entire information which has been initially transmitted. Therefore, the size of the header can be reduced.

As another method, the transmission node of an embodiment of the disclosure may: distinguish between compressible fields and incompressible fields; if values of the compressible fields have not been changed in comparison with field values of a firstly transmitted whole header, compress (or omit) and transmit only the compressible fields; and always transmit the incompressible fields without compressing (or omitting). In addition, the transmission node of an embodiment of the disclosure may transmit a whole header again if there is any one field, among compressible fields, which has been changed from field values of a previously transmitted whole header. The reception PDCP layer device may always transmit a feedback indicating that a whole header has been received well to the transmission PDCP layer device every time the reception PDCP layer device receives the whole header.

In addition, an Ethernet header compression method proposed in the disclosure may not be applied to an SDAP header and SDAP control data (e.g., an SDAP control PDU)

of an upper layer device. Therefore, in view of network implementation, QoS information, etc. of non-compressed SDAP control data or a non-compressed SDAP header may be read, and transmission resources may be scheduled fast. In view of terminal implementation, the reception node may read QoS information from SDAP control data or an SDAP header before decompression, and thus the implementation can be simplified. Furthermore, the transmission node may perform the generation of SDAP control data or an SDAP header in parallel to a header or data compression processing procedure or ciphering procedure of the PDCP layer device, and thus the time required for data processing can be reduced.

Figure 2D:
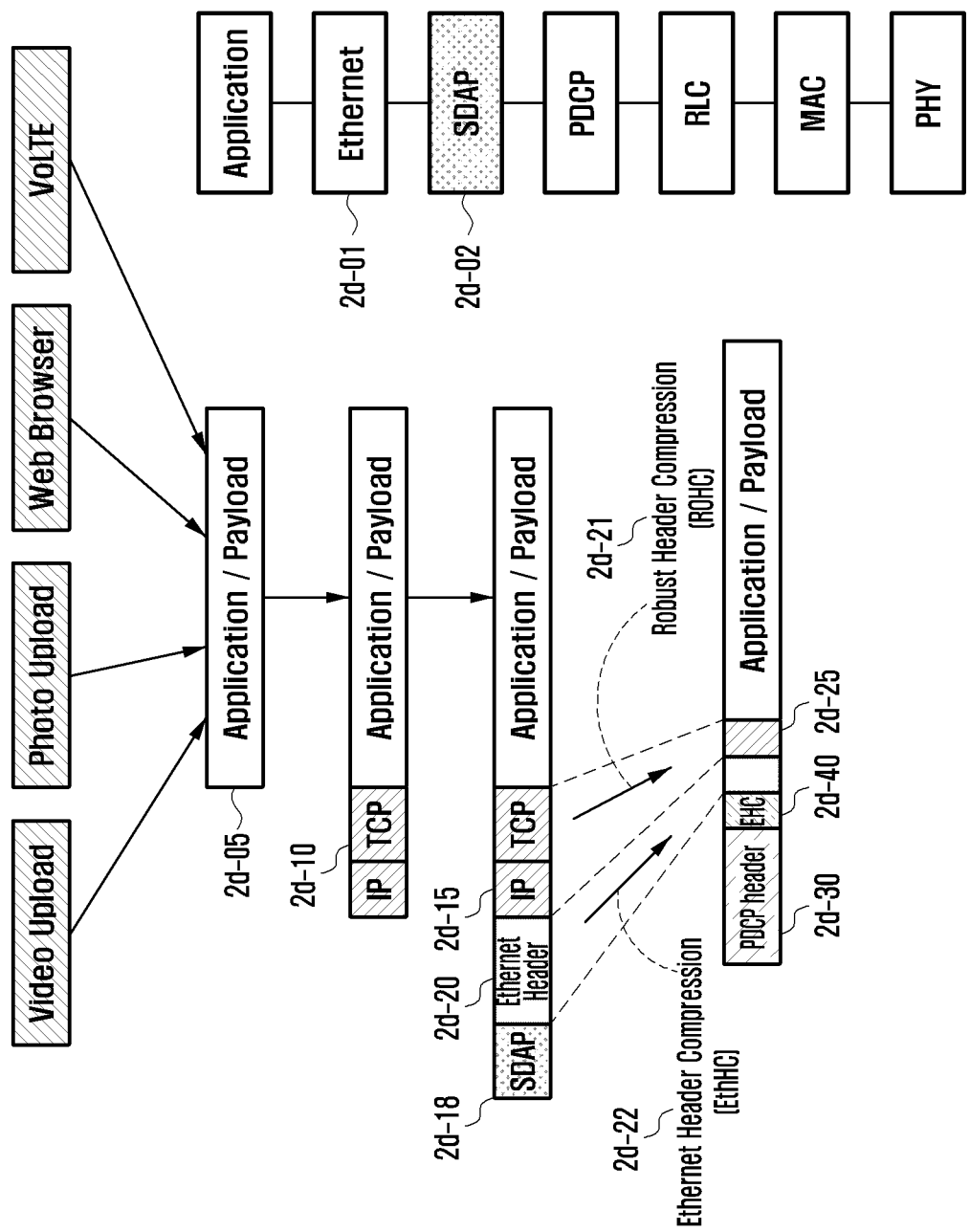
FIG. 2D is a diagram illustrating another Ethernet header compression method proposed for a case where an SDAP header or layer device is configured, according to an embodiment of the disclosure.

FIG. 2D is a diagram illustrating another Ethernet header compression method proposed for a case where an SDAP header or layer device is configured, according to an embodiment of the disclosure.

In FIG. 2D, upper layer data 2d-05 may be generated as data corresponding to services, such as video transmission, photo transmission, Web search, and VoLTE. Pieces of data generated in an application layer device may be processed through a TCP/IP or a UDP corresponding to a network data transmission layer, or processed through an Ethernet protocol, may be processed in an SDAP layer device, may configure individual headers 2d-10, 2d-15, and 2d-20 (an upper layer header, an Ethernet header, or an SDAP header), and may be transferred to a PDCP layer. When data (a PDCP SDU) is received from an upper layer, the PDCP layer may perform the following procedure.

If a header compression (ROHC) or an Ethernet header compression procedure is configured to be used in the PDCP layer, by an RRC message used as in operation 2a-10, 2a-40, or 2a-75 of FIG. 2A, the TCP/IP headers may be compressed according to an ROHC as in the case of 2d-21, and an Ethernet header compression procedure may be performed on an SDAP header 2d-18 and the Ethernet header 2d-20 in a PDCP layer device as in the case of 2d-22. A separate Ethernet header compression (EHC) header 2d-40 having a field for indicating whether the SDAP header and the Ethernet header have been compressed, or a field for indicating fields of the SDAP header or the Ethernet header, which have been compressed (omitted) or have not been compressed (not omitted), may be configured, and may be located in front of the compressed header.

If an integrity verification is configured, an integrity protection may be performed on a PDCP header, the EHC header, the compressed headers (the compressed SDAP header, the compressed Ethernet header, or the compressed TCP/IP header), and the data; a ciphering procedure may be performed on the EHC header, the compressed headers (the compressed SDAP header, the compressed Ethernet header, or the compressed TCP/IP header), and the data, or the compressed headers (the compressed SDAP header, the compressed Ethernet header, or the compressed TCP/IP header) and the data except for the EHC header; and the PDCP header 2d-30 may be configured, so that a PDCP PDU may be configured.

The PDCP layer device includes a header compression/decompression device, determines whether or not to perform a header compression on each data, according to the configuration of the RRC message described above, and uses the header compression/decompression device. At the transmission node, a transmission PDCP layer device compresses an Ethernet header or an upper layer header (e.g., a TCP/IP header) by using a header compression device, and at the reception node, a reception PDCP layer device performs a header decompression on an Ethernet header or an upper layer header (e.g., a TCP/IP header) by using a header decompression device.

The procedure in FIG. 2D described above may also be applied to header compression of downlink data as well as compression of an uplink header by a terminal. In addition, the above description about uplink data may also be applied to downlink data in the same way.

A method for performing an Ethernet header compression on an Ethernet header, proposed in the disclosure, may imply a method for omitting fields indicating static information, and indicating only changed pieces of information, so that the size of the header is reduced. Therefore, at the first time (i.e., at the time of initial transmission), entire header information and configuration information for a compression (e.g., an identifier (type) for each traffic (or service) for an Ethernet protocol, a sequence number for each traffic (or service), and compression rate-related information) may be included and then transmitted. At the time of transmission after initial transmission, the transmission node of an embodiment of the disclosure may configure a header to include only fields corresponding to changed information and to omit or not transmit fields (e.g., a transmission address field or reception address field (MAC address), a preamble field, a start of frame delimiter (SFD), a frame checksum (FCS), or an Ethernet type field) corresponding to information which is not changed compared to the entire information which has been initially transmitted. Therefore, the size of the header can be reduced.

As another method, the transmission node of an embodiment of the disclosure may: distinguish between compressible fields and incompressible fields; if values of the compressible fields have not been changed in comparison with field values of a firstly transmitted whole header, compress (or omit) and transmit only the compressible fields; and always transmit the incompressible fields without compressing (or omitting). In addition, the transmission node of an embodiment of the disclosure may transmit a whole header again if there is any one field, among compressible fields, which has been changed in comparison with field values of a previously transmitted whole header. The reception PDCP layer device may always transmit a feedback indicating that a whole header has been received well, to the transmission PDCP layer device every time the reception PDCP layer device receives the whole header.

In FIG. 2D, the PDCP layer device or SDAP layer device of the reception node may: receive a compressed Ethernet frame 2d-25 from a lower layer device; and in a case where an Ethernet header compression procedure is configured, identify each of the field values of an Ethernet header of an Ethernet frame having a whole header which has firstly been received and has not been compressed, and store the identified field values in a buffer 2d-30 for a reception Ethernet decompression.

The Ethernet header compression method as described above may be applied to an SDAP header as well as an Ethernet header in the same way, and accordingly, the SDAP header may be compressed. This is because there are a lot of occasions where a data/control (D/C) field, a QoS flow ID (QFI) field, a reflective QoS flow to DRB mapping indication (RQI) field, and a reflective QoS indication (RDI) field, which are configured in an SDAP header (for the uplink or downlink), usually have fixed values. Specifically, the QFI field almost has a fixed value, and the RQI field or the RCI field are not used except for a case where QoS mapping is required to be updated, because a base station indicates the fields in the case. Therefore, in an embodiment of the disclosure, a method for compressing an Ethernet header is applied to an SDAP header, and thus the SDAP header is compressed together with the Ethernet header. As described above, in a case where a compression is also applied to an SDAP header, the SDAP header is encrypted in an embodiment of the disclosure. In an embodiment of the disclosure, the same compression method is provided to an LTE system, and an NR system in which an SDAP header may be configured, and thus convenience of implementation can be achieved.

Moreover, a header compression algorithm proposed in an embodiment of the disclosure is only applied to PDCP user data (i.e., a PDCP data PDU) received from an upper layer, and is not applied to PDCP control data (i.e., a PDCP control PDU) generated by a PDCP layer device.

As proposed in an embodiment of the disclosure, in the Ethernet header compression protocol 2d-22, the PDCP layer device may: identify an Ethernet header when data is received from an upper layer device; compress the Ethernet header by using a protocol to be used to compress the Ethernet header; and define and use a new header 2d-40 in front of the compressed Ethernet header. In an embodiment of the disclosure, ciphering is not performed on the new header 2d-40. This is because, if the new header 2d-40 is not encrypted, terminal implementation can be facilitated in the following manner: assuming that a PDCP layer device performs data processing such as an integrity protection or a ciphering procedure, and that the data is transferred to a lower layer device, an SDAP header, if configured (or PDCP header or new header) can be concatenated all together at once.

As another method, in an embodiment of the disclosure, ciphering is performed on the new header 2d-40.

This is because the new header may be regarded as data generated in the PDCP layer device, and if the new header is data-processed like data, a data processing procedure can be simplified.

In a case where a header compression method proposed in an embodiment of the disclosure is applied, in order to decompress a compressed Ethernet header, the reception side is required to know fields which have been compressed, omitted, or not transmitted. Therefore, when the transmission side compresses an Ethernet header, the transmission side may define a new header (e.g., an EHC header) and add same in front of the compressed Ethernet header to transmit the Ethernet header with the new header. The transmission node may define a new first field in the new EthHC header to indicate which field has been compressed, has been omitted, or has not been transmitted among multiple fields of the Ethernet header (e.g., through a context identifier). As another method, the new field may indicate whether a particular field has been compressed (or has been omitted, or has not been transmitted) or has not been compressed (or is included or has been transmitted), by using each bit according to a bitmap type.

Moreover, since the first field can indicate which field in the Ethernet header has been compressed (or has been omitted) or has not been compressed (or is included), the reception side may calculate the size of the received compressed Ethernet header by using the first field. That is, the reception side may subtract the size of omitted header fields from the size of the original Ethernet header, to identify the size of the received compressed Ethernet header.

In addition, the transmission node may have a mapping for indicating whether each of all the fields of an Ethernet header has been compressed or not (or has been omitted or not), through the first field. However, the transmission node may allow the first field to have a mapping for indicating whether each of limited compressible (or omissible) fields among the fields of the Ethernet header has been compressed or not (or has been omitted or not). Therefore, the overhead of the new EthHC header can be reduced.

Moreover, the new EHC header may include a one-bit indicator defined therein, and the indicator may indicate whether the Ethernet header (or SDAP header) has been compressed or not compressed. The one-bit indicator may be defined and used in a PDCP header.

In addition, in order that the EHC header can precisely indicate the size of the compressed Ethernet header (e.g., for convenience of implementation), the transmission node may indicate the size or length of the compressed Ethernet header by using a second field. In addition, in a case where the size of the Ethernet header may have multiple types, the EHC header may indicate a type of the size by using the second field. Alternatively, a new third field indicating whether an Ethernet header compression has been performed or not may be defined in the EHC header.

As another method, each of identifiers indicating multiple Ethernet header compression methods, respectively, may be defined and used in the EHC header. In addition, each of the identifiers may indicate an Ethernet header type or QoS flow identifier. This is because multiple upper layer headers (e.g., various types of Ethernet headers) having different header structures are configured by different fields, and a method on fields which are to be compressed and fields which are not to be compressed may also be required to be differently applied accordingly. For example, a first identifier indicating the type or contents of a header may indicate application of a first Ethernet header compression method, and a second identifier may indicate application of a second Ethernet header compression method. Therefore, in a case where multiple data streams or QoS flows are mapped to one PDCP layer device, a transmission node of various embodiment of the disclosures may apply new identifiers to apply different header compression methods, and a reception node may distinguish between the identifiers to perform different header decompression methods.

In an embodiment of the disclosure, an Ethernet header compression method may be applied to a general upper layer device header as well as an Ethernet header, and a header compression method may be called an Ethernet header compression method for convenience in the disclosure.

Moreover, in relation to the configuration of Ethernet header fields according to the type of an Ethernet header as described above, which type the Ethernet header is of, or which header fields configure the Ethernet header may be configured for each bearer by an RRC message as illustrated with reference to FIG. 2A. For example, the configuration of Ethernet header fields according to the type of the Ethernet header may configure information for the type (e.g., an Ethernet header type) of an upper layer header which can be configured in an upper layer device of each bearer, and configure identifiers mapped to header types, so that the information and the identifiers can be applied to a header compression or decompression method. That is, an identifier or indicator indicating the type of an Ethernet header may be defined and used in a new header. In addition, a new header may include a checksum field to allow the reception node to identify whether an Ethernet header decompression is successful. Alternatively, a field indicating initialization of a buffer for compression by a transmission PDCP layer device and a buffer for decompression by a reception PDCP layer device may be defined and used. Fields defined in the new header may be defined and used in a PDCP header or an SDAP header.

In addition, a new EHC header may define and use a field requesting a feedback from a reception node PDCP layer device when data is successfully received. That is, a reception node PDCP layer device is not configured to transmit feedback every time a whole header is received, and is configured to transmit feedback only when a transmission node PDCP layer device requests feedback through an indicator. Therefore, overhead can be reduced.

Another Ethernet header compression method may be used based on the new EHC header. For example, in a case where the transmission node sequentially compresses Ethernet headers, when an Ethernet header is compressed, if the Ethernet header includes header fields, the values of which have not been changed compared to fields of a previously transmitted Ethernet header, the transmission node may compress (omit) the fields, and configure the first field to be matched accordingly. If the Ethernet header includes Ethernet header fields, the values of which are different from the field values of the previously transmitted Ethernet header, the transmission node may not compress (include) the fields; and configure the first field to be matched accordingly, so as to complete the compression of the Ethernet header. In the above description, the sequential compression may imply defining an ascending order based on PDCP sequence numbers or COUNT values. The previous Ethernet header may indicate an Ethernet header corresponding to data having one less value of a PDCP sequence number or a COUNT value.

When the compressed Ethernet header is received, the reception node may identify the first field. If the fields compressed (omitted) in the Ethernet header have the same values as those of the previously received Ethernet header, the reception node may reconstruct the fields to be matched accordingly, and newly update the non-compressed (included) fields. Each of the transmission node and the reception node may have a separate buffer for compressing an Ethernet header, and may update the buffer every time the node compresses an Ethernet header, and update the buffer every time the node decompresses an Ethernet header. When the compressed Ethernet header is reconstructed, the reception node may remove the new EthHC header and transfer the reconstructed data to an upper layer. In addition, the transmission node may transmit entire Ethernet header information when transmitting an Ethernet header at the first time. That is, at the first time, the transmission node may transmit an Ethernet header without compression in order to allow the reception node to recognize the entire Ethernet header information.

In the following description of the disclosure, detailed embodiments of the Ethernet header compression method described above are proposed.

Figure 2E:
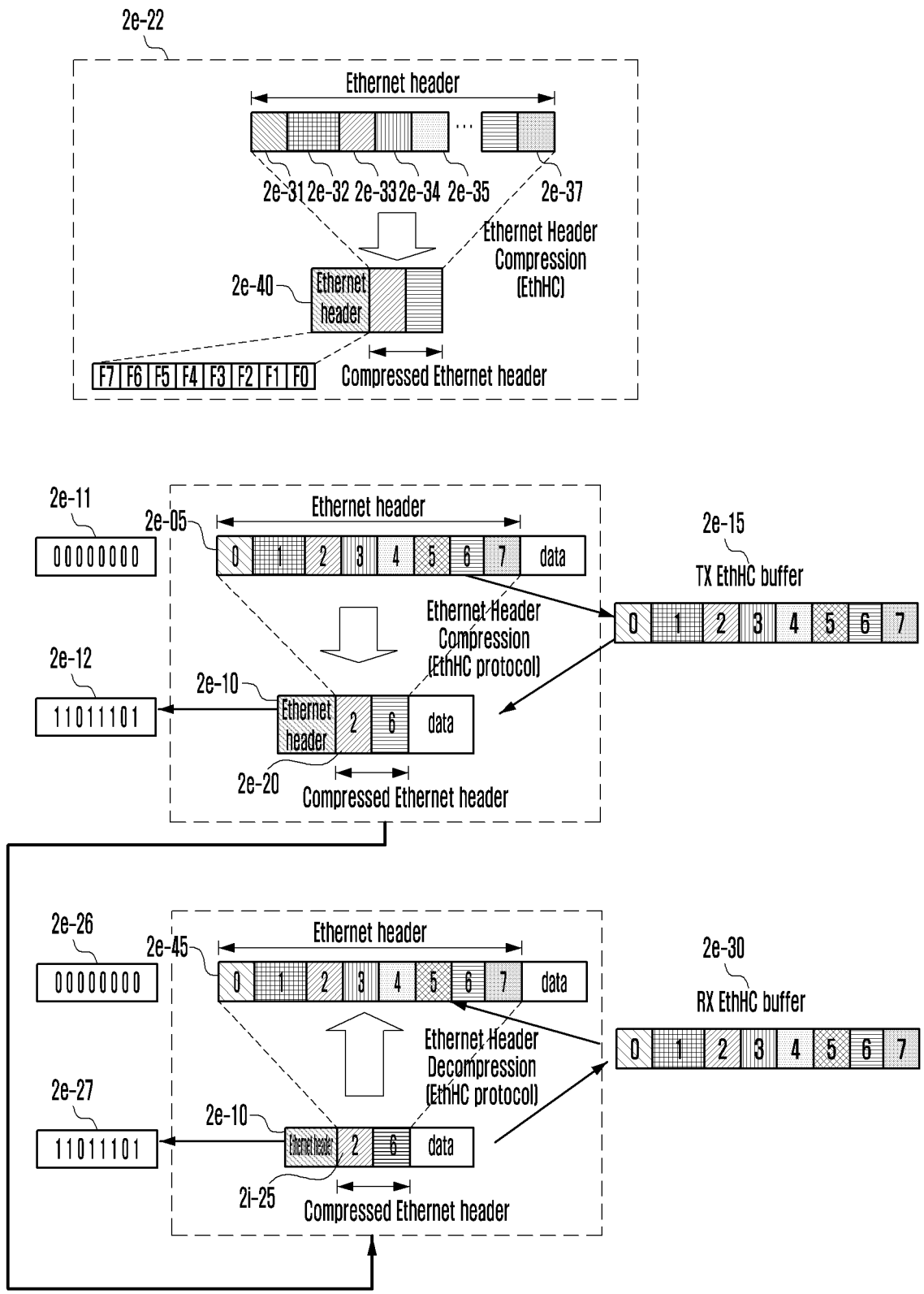
FIG. 2E is a diagram illustrating the detailed (2-1)th embodiment of an Ethernet header compression method according to an embodiment of the disclosure.

FIG. 2E is a diagram illustrating the detailed (2-1)th embodiment of an Ethernet header compression method according to an embodiment of the disclosure.

Referring to FIG. 2E, in a method for compressing an Ethernet header according to the (2-1)th embodiment of the disclosure, a transmission node: omits the value of an Ethernet header field, the value of which is not changed, the value of which has not been changed compared to an Ethernet header previously transmitted, or which is not required to be transmitted, among multiple header fields (e.g., the fields 2e-31, 2e-32, 2e-33, 2e-34, 2e-35, 2e-36, and 2e-37) in the Ethernet header; and selectively transmits only necessary fields, valid fields, or fields, the values of which have been changed. For example, the method for compressing an Ethernet header according to the (2-1)th embodiment of the disclosure may imply a method in which, if the first field 2e-31, the second field 2e-32, the fourth field 2e-34, the fifth field 2e-35, and the seventh field 2e-37 among multiple fields (e.g., the first field 2e-31, the second field 2e-32, the third field 2e-33, the fourth field 2e-34, the fifth field 2e-35, the sixth field 2e-36, and the seventh field 2e-37) included in the Ethernet header are omissible, are not required to be transmitted, or have the same values as field values of a previously transmitted Ethernet header, a transmission node transmits only the third field 2e-33 and the sixth field 2e-36.

In addition, an embodiment of the disclosure proposes a method for separately configuring a new EHC header so that a transmission node can perform compression by applying the above method, and a reception node can perform decompression. In the (2-1)th embodiment of the disclosure, a new EHC header may have a bitmap structure 2e-11 or 2e-12. That is, the bitmap structure may be configured by as many bits as the number of fields included in a header structure which is compressed. The value of 0 or 1 may indicate whether a header field corresponding to each bit has been compressed or not. As another method, the bitmap structure may be configured by as many bits as the number of compressible fields among the fields included in a header structure which is compressed. The value of 0 or 1 may indicate whether a header field corresponding to each bit has been compressed or not.

For example, as illustrated in FIG. 2E, a PDCP layer device of the transmission node may: receive an Ethernet frame 2e-05 from an upper layer device; and in a case where an Ethernet header compression procedure is configured, store each of the field values of an Ethernet header of an Ethernet frame which has firstly been received, in a buffer 2e-15 for a transmission Ethernet compression. The first Ethernet frame may be transmitted while an entire Ethernet header is included therein without an Ethernet header compression. When a feedback indicating that an entire header has been normally received is received from a reception PDCP layer device, an Ethernet compression procedure may start to be applied. Multiple entire headers described above may be transmitted. For example, until a feedback indicating that an entire header has been normally received is received from the reception PDCP layer device, multiple entire headers and pieces of data (first piece of data, second piece of data, and subsequent pieces of data) may be transmitted.

When the Ethernet compression procedure has been started, in a case where the next Ethernet frame is received, field values of an Ethernet header may be compared with the field values stored in the transmission buffer for Ethernet compression, respectively. If there is a field having the same value, the field may be omitted, a bit corresponding to or mapped to the omitted field may be configured to be 1 (or 0), and the omission of the field may be indicated. If field values of an Ethernet header of the second Ethernet frame may be compared with the field values stored in the transmission buffer for Ethernet compression, respectively, and there is a field having a different value, the field may be not omitted, a bit corresponding to or mapped to the non-omitted field may be configured to be 0 (or 1), and the non-omission of the field may be indicated.

If an integrity protection is configured, the integrity protection may be performed, and a ciphering procedure may be performed, a new header 2e-10 may be configured, a PDCP header is configured and concatenated, and then the same may be transferred and transmitted to a lower layer device.

The new header 2e-10 may allow, like a bitmap, each bit to indicate a field of the Ethernet header, which exists (has not been compressed) or does not exist (has been compressed).

Alternatively, the new header 2e-10 may define a new field (e.g., a one-bit indicator) to indicate whether an Ethernet header compression procedure has been performed or not. The new header 2e-10 may use a one-bit indicator to directly indicate a case where an Ethernet header compression has not been performed, so that the reception node is not required to perform processing the new header and a non-compressed upper layer header. In a case where an Ethernet header compression algorithm is configured, the one-bit indicator may be defined to be located in the foremost of a new EHC header always existing, and may also allow the reception node to directly identify whether a compression has been performed.

In addition, a one-bit indicator indicating whether an Ethernet header compression procedure has been performed or not may be defined and used in an SDAP header or a PDCP header. When the one-bit indicator is defined in an SDAP header and a PDCP header, in a case where an Ethernet header compression procedure has not been performed, the new header 2e-10 for Ethernet header compression itself can be omitted, and thus overhead can be reduced. In addition, for a case where all the values of a bitmap field are configured to be 0 (or 1), a special value indicating a non-compressed whole header may be defined and used (2e-26). Alternatively, initialization of a buffer for compression by a transmission PDCP layer device and a buffer for decompression by a reception PDCP layer device may be indicated.

In FIG. 2E, the PDCP layer device or SDAP layer device of the reception node may: receive a compressed Ethernet frame 2e-25 from a lower layer device; and in a case where an Ethernet header compression procedure is configured, identify each of the field values of an Ethernet header of an Ethernet frame having a whole header which has firstly been received and has not been compressed, and store the identified field values in a buffer 2e-30 for a reception Ethernet decompression. When a whole header (e.g., an SDAP header or an Ethernet header) is successfully received, the PDCP layer device or SDAP layer device of the reception node may transmit a feedback therefor to the transmission PDCP layer device so that the transmission PDCP layer device starts to apply an Ethernet header compression. The first Ethernet frame may be transmitted to an upper layer device without an Ethernet header decompression.

When the next Ethernet frame is received, the PDCP layer device or SDAP layer device of the reception node may decode the next Ethernet frame, may identify a new EHC header to identify whether a header has been compressed or not. If the header has not been compressed, the PDCP layer device or SDAP layer device of the reception node may perform an integrity verification, remove the EHC header, and transmit data to an upper layer. If the new EHC header indicates that an Ethernet header (or an SDAP header) has been compressed, the reception node may identify field values of the new header 2e-10 for Ethernet compression to identify fields omitted (compressed) and fields not omitted (not compressed). The reception node reconstructs the fields indicated as being omitted (compressed), so that the fields have field values stored in the reception buffer 2e-30 for decompression, thereby performing reconstruction (decompression) to the Ethernet header before compressed (2e-45). The values of the fields indicated as being not omitted (not compressed) are new or changed values. Therefore, the reception node stores the new or changed values to correspond to the fields, as field values, in the reception buffer for decompression. The reception node: performs decoding; if an integrity protection is configured, performs an integrity verification; and if there is no error, configures an Ethernet frame together with the reconstructed Ethernet header, and transfers the Ethernet frame to an upper layer device.

The transmission PDCP layer device may: apply an Ethernet header compression method; in the process of the application, if the values of fields of an Ethernet header are changed, indicate that the Ethernet header is not compressed, in a new EHC header; transmit the whole header to initialize the buffer of the reception node; and allow the reception node to configure the values of the whole header in the buffer again. If the non-compressed whole header is received, the reception PDCP layer device may transmit a feedback indicating the successful reception to the transmission PDCP layer device.

In an embodiment of the disclosure, every time a non-compressed whole header is received, the reception PDCP layer device may always transmit a feedback indicating the successful reception to the transmission PDCP layer device. Moreover, in an embodiment of the disclosure, when a non-compressed whole upper layer header is received, the reception PDCP layer device may always transmit a feedback indicating the successful reception to the transmission PDCP layer device, but may not transmit a feedback when a non-compressed upper layer header is received. That is, the reception PDCP layer device may perform different operations according to whether an upper layer compression is performed on received data.

In an embodiment of the disclosure, a separate new EHC header may have a fixed size (e.g., 1 bytes or 2 bytes).

In addition, in an embodiment of the disclosure, compression and decompression may also be performed by applying the above method to a length field of an Ethernet header. As another method, the length field of an Ethernet header may be always transmitted without being compressed.

As another method, the length field of an Ethernet header may be always compressed and thus be not transmitted, and the reception PDCP layer device may: decompress the remaining fields except the length field; then add the length of the length field (because the length of the length field is known as a fixed value) to the decompressed remaining fields to calculate the length of an Ethernet frame; and then reconstruct and add a length value in the length field of the Ethernet head. Through this operation, an indication to the length field of a new EHC header may be omitted. Even if the value of the length field is different for each data, the transmission PDCP layer device may always omit (compress) the length field and transmit data, and the reception PDCP layer device may calculate the value of the length field and derive the value as described above, so as to always reconstruct the value of the length field of an Ethernet header.

In addition, the new EHC header may define and use a field requesting a feedback from the reception node PDCP layer device when data is successfully received. That is, a reception node PDCP layer device is not configured to transmit feedback every time a whole header is received, and is configured to transmit feedback only when a transmission node PDCP layer device requests feedback through an indicator. Therefore, overhead can be reduced.

Each of identifiers indicating multiple Ethernet header compression methods, respectively, may be defined and used together with a bitmap field in the new EHC header. In addition, each of the identifiers may indicate an Ethernet header type or QoS flow identifier. This is because multiple upper layer headers (e.g., various types of Ethernet headers) having different header structures are configured by different fields, and a method on fields which are to be compressed and fields which are not to be compressed may also be required to be differently applied accordingly, and a bitmap field corresponding to upper layer header type fields may also be required to be applied accordingly. Therefore, for example, a first identifier indicating the type or contents of a header may indicate application of a first bitmap field or bitmap mapping, and a second identifier may indicate application of a second bitmap field or bitmap mapping.

Therefore, in a case where multiple data streams or QoS flows are mapped to one PDCP layer device, the new identifiers are applied, so that different header compression methods may be applied, and the reception node may distinguish between the identifiers to perform different header decompression methods. In this case, in order to apply different header compression and decompression methods to data streams having different upper layer header structures, upper layer header field values may be stored in the buffer of the transmission PDCP layer device or the buffer of the reception PDCP layer device independently for each of the upper layer header structures.

Figure 2F:
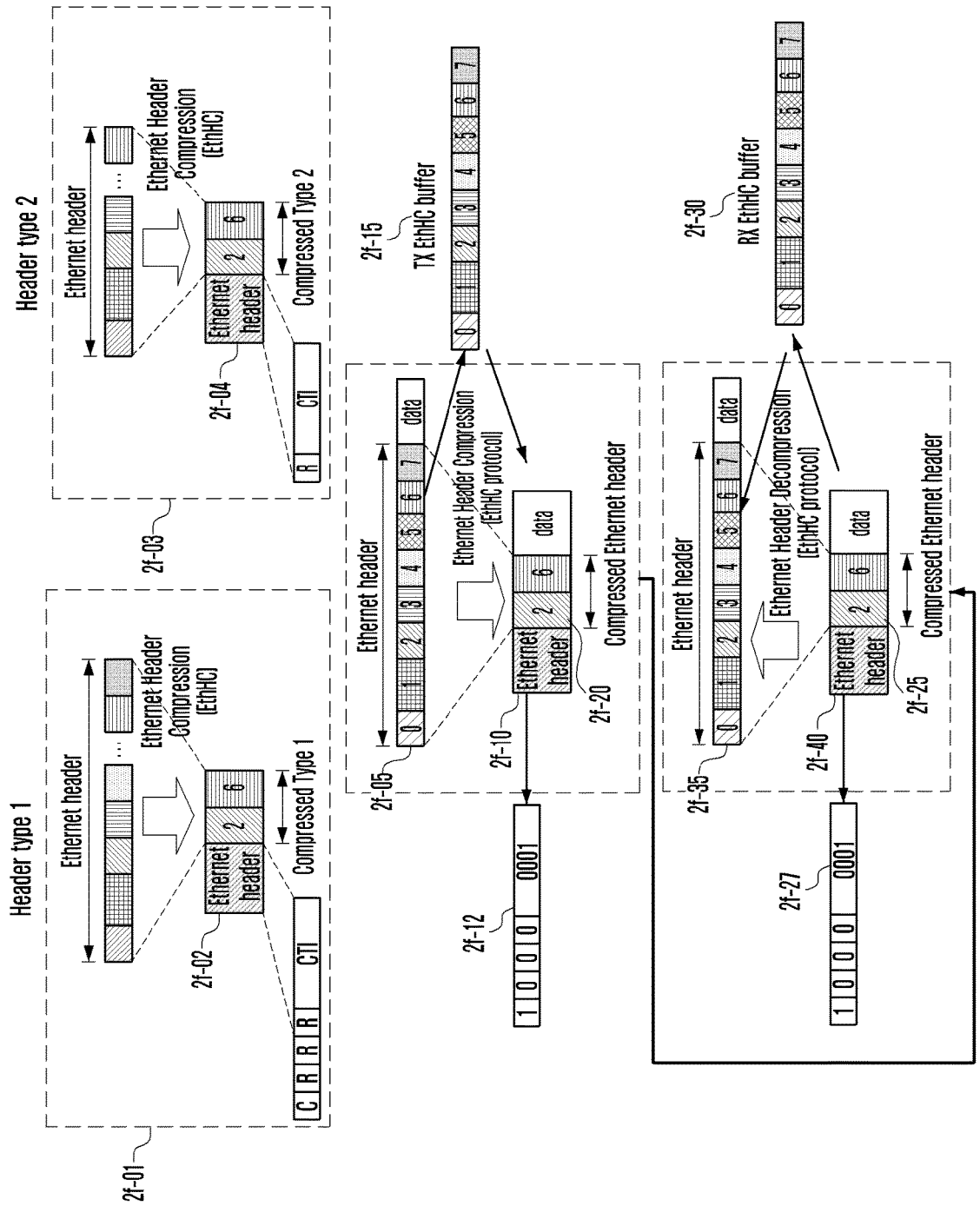
FIG. 2F is a diagram illustrating the detailed (2-2)th embodiment of an Ethernet header compression method according to an embodiment of the disclosure.

FIG. 2F is a diagram illustrating the detailed (2-2)th embodiment of an Ethernet header compression method according to an embodiment of the disclosure.

Referring to FIG. 2F, a method for applying different header compression and decompression methods to data streams or QoS flows having different upper layer device header structures, respectively, in a case where multiple data streams or QoS flows are mapped to one bearer or one PDCP layer device is illustrated in the (2-2)th embodiment of the disclosure.

In the (2-2)th embodiment of the disclosure, unique fixed header compression and decompression methods may be used for different upper layer device header structures (e.g., Ethernet header structures or SDAP header structures), respectively. For example, fields which are compressible (omissible) and fields which are incompressible (not able to be omitted) may be defined in a first upper layer header structure 2*f*-01. In addition, fields which are compressible (omissible) and fields which are incompressible (not able to be omitted) may be defined in a second upper layer header structure 2*f*-03. An identifier, that is, a compressed type identifier (CTI) field 2*f*-02 or 2*f*-04 indicating different upper layer header structures may be configured in a new EHC header, and may indicate what type of upper layer device header structure has been compressed and how the structure has been compressed, to a reception PDCP layer device.

For example, a transmission PDCP layer device may: store upper layer header field values 2*f*-05 of data having a first upper layer header structure, received from an upper layer, in a transmission buffer 2*f*-15; when transmitting the data first, transmit the data including a whole header which has not been compressed; and if a feedback indicating that whole header information has successfully been received is received from the reception PDCP layer device, apply a header compression method. That is, if all the field values of compressible fields, among the upper layer header field values of subsequently received data, are the same as those stored in the transmission buffer, the transmission PDCP layer device may: compress all the compressible fields; configure incompressible fields without change; and configure and transmit an identifier indicating the first upper layer header structure, and an indicator compressed type identifier (CTI) field 2*f*-12 indicating that a compression has been performed, in a new EHC header 2*f*-10.

If the fact that an upper layer header has not been compressed is indicated in the new EHC header 2*f*-40, the reception PDCP layer device may: regard the upper layer header as a whole upper layer header (if the field values of one or more fields among compressible fields are changed, the transmission PDCP layer device may not compress the upper layer header and transmit the whole upper layer header to instruct the reception PDCP layer device to update the field values stored in the buffer thereof); update field values stored in a buffer 2*f*-30 of the reception PDCP layer device to the field values of the received whole upper layer header; and transmit a feedback indicating a successful reception to the transmission PDCP layer device.

If the new EHC header 2*f*-40 of data received by the reception PDCP layer device indicates that an upper layer header has been compressed, the reception PDCP layer device may: identify an identifier 2*f*-27 indicating the type of the upper layer header included in the new EHC header; and reconstruct fields defined to be compressible in an upper layer header structure indicated by the identifier, based on the field values stored in the reception buffer (2*f*-35). For example, the identifier indicating the type of the upper layer header may indicate the first upper layer header structure (e.g., fields compressible or decompressible in the first upper layer header structure) and indicate the second first upper layer header structure (e.g., fields compressible or decompressible in the second upper layer header structure).

In the above (2-2)th embodiment of the disclosure, every time a non-compressed whole header is received, the reception PDCP layer device may always transmit a feedback indicating the successful reception to the transmission PDCP layer device. Moreover, in the disclosure, when a non-compressed whole upper layer header is received, the reception PDCP layer device may always transmit a feedback indicating the successful reception to the transmission PDCP layer device, but may not transmit a feedback when a non-compressed upper layer header is received. The reception PDCP layer device may perform different operations according to whether an upper layer compression is performed on received data.

In the (2-2)th embodiment of the disclosure, in order to apply different header compression and decompression methods to data streams having different upper layer header structures, upper layer header field values may be stored in the buffer of the transmission PDCP layer device or the buffer of the reception PDCP layer device independently for each of the upper layer header structures.

Each of identifiers indicating multiple Ethernet header compression methods, respectively, and an indicator field indicating that a compression has been performed may be defined and used in a new EHC header described above. In addition, each of the identifiers may indicate an Ethernet header type or QoS flow identifier. This is because multiple upper layer headers (e.g., various types of Ethernet headers) having different header structures are configured by different fields, and a method on fields which are to be compressed and fields which are not to be compressed may also be required to be differently applied accordingly. Therefore, for example, a first identifier indicating the type or contents of a header may indicate application of a first Ethernet header compression method, and a second identifier may indicate application of a second Ethernet header compression method. Therefore, in a case where multiple data streams or QoS flows are mapped to one PDCP layer device, the new identifiers are applied, so that different header compression methods may be applied, and the reception node may distinguish between the identifiers to perform different header decompression methods.

In an embodiment of the disclosure, when a feedback indicating an entire header has successfully been received is received from the reception PDCP layer device, the transmission PDCP layer device may start to apply an Ethernet header compression procedure, and multiple entire headers described above may be transmitted. For example, until a feedback indicating that an entire header has been normally received is received from the reception PDCP layer device, the transmission PDCP layer device may transmit multiple entire headers and pieces of data (first piece of data, second piece of data, and subsequent pieces of data) may be transmitted.

In an embodiment of the disclosure, the new header 2c-10 may define a new field (e.g., a one-bit indicator) to indicate whether an Ethernet header compression procedure has been performed or not. In an embodiment of the disclosure, the transmission node may use a one-bit indicator to directly indicate a case where an Ethernet header compression has not been performed, so as to allow the reception node not to process the new header and a non-compressed upper layer header. In a case where an Ethernet header compression algorithm is configured, the one-bit indicator may be defined to be located in the foremost of a new EHC header always existing, and thus may also allow the reception node to immediately identify whether a compression has been performed.

In addition, the transmission node may define and use a one-bit indicator indicating whether an Ethernet header compression procedure has been performed or not, in an SDAP header or a PDCP header. If the one-bit indicator is defined in an SDAP header and a PDCP header, in a case where an Ethernet header compression procedure has not been performed, the new header 2c-10 for Ethernet header compression itself can be omitted, and thus overhead can be reduced. In addition, a case where all the values of a bitmap field are configured to be 0 (or 1) may be defined and used as a special value indicating a non-compressed whole header. Alternatively, initialization of the buffer for compression by the transmission PDCP layer device and the buffer for decompression by the reception PDCP layer device may be indicated.

In FIG. 2C, the PDCP layer device or SDAP layer device of the reception node may: receive the compressed Ethernet frame 2c-25 from a lower layer device; and in a case where an Ethernet header compression procedure is configured, identify each of the field values of an Ethernet header of an Ethernet frame having a whole header which has firstly been received and has not been compressed, and store the identified field values in the buffer 2c-30 for a reception Ethernet decompression. When a whole header (e.g., an SDAP header or an Ethernet header) is successfully received, the PDCP layer device or SDAP layer device of the reception node may transmit a feedback therefor to the transmission PDCP layer device so that the transmission PDCP layer device starts to apply an Ethernet header compression. The first Ethernet frame may be transmitted to an upper layer device without an Ethernet header decompression. When the next Ethernet frame is received, the PDCP layer device or SDAP layer device of the reception node may: decode the next Ethernet frame; identify a new EHC header to identify whether a header has been compressed or not; and if the header has not been compressed, perform an integrity verification, remove the EHC header, and transmit the data to an upper layer.

In a case where the new EHC header indicates that an Ethernet header (or an SDAP header) has been compressed, the PDCP layer device or SDAP layer device of the reception node may identify the fields values of the new header 2c-10 for Ethernet compression to identify omitted (compressed) fields and non-omitted (non-compressed) fields, and the reception node may reconstruct the fields indicated as being omitted (compressed), to have the field values stored in the reception buffer for decompression to reconstruct the Ethernet header before the compression has been performed (decompress the Ethernet header). The values of the fields indicated as being not omitted (not compressed) are new or changed values. Therefore, the reception node stores the new or changed values to correspond to the fields, as field values, in the reception buffer for decompression. The reception node: performs decoding; if an integrity protection is configured, performs an integrity verification; and if there is no error, configures an Ethernet frame together with the reconstructed Ethernet header, and transfers the Ethernet frame to an upper layer device.

In an embodiment of the disclosure, the transmission PDCP layer device may: apply an Ethernet header compression method; in the process of the application, if the values of fields of an Ethernet header are changed, indicate that the Ethernet header is not compressed, in a new EHC header; and transmit the whole header to initialize the buffer of the reception node, so as to allow the reception node to configure the values of the whole header in the buffer again. If the non-compressed whole header is received, the reception PDCP layer device may transmit a feedback indicating the successful reception to the transmission PDCP layer device.

In an embodiment of the disclosure, every time a non-compressed whole header is received, the reception PDCP layer device may always transmit a feedback indicating the successful reception to the transmission PDCP layer device. Moreover, in an embodiment of the disclosure, when a non-compressed whole upper layer header is received, the reception PDCP layer device may always transmit a feedback indicating the successful reception to the transmission PDCP layer device, but may not transmit a feedback when a non-compressed upper layer header is received. That is, the reception PDCP layer device may perform different operations according to whether an upper layer compression is performed on received data.

The separate new EHC header described above may have a fixed size (e.g., 1 bytes or 2 bytes).

In addition, in an embodiment of the disclosure, compression and decompression may also be performed by applying the above method to a length field of an Ethernet header. As another method, the length field of an Ethernet header may be always transmitted without being compressed.

As another method, the transmission node may always compress the length field of an Ethernet header, and thus the length field is not transmitted to the reception node, and a method in which the reception PDCP layer device: decompresses the remaining fields except the length field; then adds the length of the length field (because the length of the length field is known as a fixed value) to the decompressed remaining fields to calculate the length of an Ethernet frame; and then reconstructs and adds a length value in the length field of the Ethernet head, may be used. In this case, an indication to the length field of a new EHC header may be omitted. Even if the value of the length field is different for each data, the transmission PDCP layer device may always omit (compress) the length field and transmit data, and the reception PDCP layer device may calculate the value of the length field and derive the value as described above, so as to always reconstruct the value of the length field of an Ethernet header.

In addition, the new EHC header may define and use a field requesting a feedback from the reception node PDCP layer device when data is successfully received. That is, a reception node PDCP layer device is not configured to transmit feedback every time a whole header is received, and is configured to transmit feedback only when a transmission node PDCP layer device requests feedback through an indicator. Therefore, overhead can be reduced.

In an Ethernet header compression method proposed in the disclosure, the (2-1)th embodiment of the disclosure is applied, whereby the transmission PDCP layer device may transmit a compression method, an identifier indicating a header type or a data flow type, and data having a non-compressed Ethernet header together with a bitmap field. Through data transmission of the transmission PDCP layer device, the reception PDCP layer device may identify a header compression method applied according to the type of an Ethernet header of each data, from a bitmap field. In addition, the reception PDCP layer device may store the field values of an Ethernet header which is not compressed, and may use the stored field values when reconstructing the field values of each of subsequently compressed Ethernet headers. The bitmap field may be used as a field indicating a header compression method, by using the identifier indicated together with the bitmap field. For example, the bitmap field may indicate a field to be compressed or a field not to be compressed by a compression method of the indicated identifier.

A whole header transmitted by the transmission PDCP layer device in the disclosure may indicate a header including: an EHC header including a bitmap field and an identifier indicating a compression method, a header type, or a data flow type, or an indicator indicating whether compression has been performed; and an Ethernet header which is not compressed. For example, the whole header may indicate an Ethernet header compression method and an identifier for a corresponding data flow by using a bitmap field before the Ethernet header compression method is applied. In addition, the whole header may indicate an initial whole header transmitted by the transmission PDCP layer device to indicate non-compressed Ethernet header field values to the reception PDCP layer device. When the reception PDCP layer device receives the above whole header, the reception PDCP layer device may use the above bitmap field to identify the Ethernet header compression method, the identifier for the corresponding data flow, and the non-compressed Ethernet header field values. Through this operation, the reception PDCP layer device may perform a decompression procedure on subsequently received compressed Ethernet headers.

In the disclosure, the transmission PDCP layer device may transmit pieces of data having multiple whole headers to the reception PDCP layer device, then immediately apply an Ethernet header compression procedure on pieces of data, and transmit the same data. In this case, the transmission PDCP layer device is not required to identify a feedback from the reception node, and thus can quickly start a header compression procedure. As another method, if the transmission PDCP layer device transmits pieces of data having one or multiple whole headers, and then receives a feedback indicating that the whole header has successfully been received, from the reception PDCP layer device, the transmission PDCP layer device may apply an Ethernet header compression method on pieces of data after the reception of the feedback. In this case, the rate of errors in the decompression by the reception node, which may occur when the whole headers are lost, can be reduced.

As described above, in a case where an identifier and a header compression method for a data flow are synchronized and applied by a whole header between the transmission PDCP layer device and the reception PDCP layer device, as described in the (2-2)th embodiment of the disclosure, a new EHC header including an identifier for a data flow, an identifier indicating a header compression method, or an indicator indicating whether a header is compressed, and an Ethernet header compressed through the application of an Ethernet header compression method may be transmitted together with data. Moreover, new EHC header information and an Ethernet header decompression method of the reception node is applied, whereby a compressed Ethernet header may be decompressed. Therefore, in a case where a method illustrated in the (2-2)th embodiment of the disclosure is applied, even when multiple data flows are mapped to one bearer, different header compression and decompression methods may be applied for the data flows, respectively. Therefore, the ease of implementation can be increased.

The embodiments proposed in the disclosure may be applied together and thus the convenience of the implementation thereof can be improved. For example, at the initial stage of a header compression method, the (2-1)th embodiment of the disclosure may be applied so as to identify a data flow or a type, or define a header compression method and synchronize the transmission PDCP layer device and the reception PDCP layer device. Thereafter, the (2-2)th embodiment of the disclosure may be applied so as to apply a header compression procedure. Furthermore, the (2-1)th embodiment may be applied again in the process of data transmission/reception, so as to update the transmission PDCP layer device and the reception PDCP layer device to use a new identifier or a header compression method.

The (2-1)th embodiment and the (2-2)th embodiment of the disclosure provide a method for dynamically indicating an identifier or a header compression method by the transmission PDCP layer device by using user layer data (e.g., a whole header).

Hereinafter, an embodiment in which an identifier indicating a header compression method together with an identifier for each Ethernet header structure or each data flow is configured by using an RRC message is proposed. In addition, methods for applying different compression methods for each Ethernet header structure or each data flow in the transmission PDCP layer device and the reception PDCP layer device are proposed.

The detailed (2-3)th embodiment of an Ethernet header compression method, proposed in the disclosure is as follows.

The header compression and decompression method proposed in the (2-2)th embodiment may be applied to the (2-3)th embodiment of the disclosure in the same way. However, in a case where a base station maps only one data stream or QoS flow to one bearer or one PDCP layer device by using an RRC message, it may not be required to distinguish between data streams or QoS flows having different upper layer device header structures. That is, identifiers indicating different upper layer header structures or different upper layer compression methods are not required to be configured in a new EHC header. This is because one upper layer header structure or one header compression method is to be configured in one PDCP layer device.

Therefore, in the (2-3)th embodiment of the disclosure, only a field indicating whether an upper layer header has been compressed or not, is defined and configured in a new EHC header or a PDCP header, and thus the method proposed in the above (2-2)th embodiment may be applied as it is. Therefore, the transmission PDCP layer device may compress an upper layer device header, and the reception PDCP layer device may decompress the upper layer device header.

The disclosure proposes a detailed structure of a feedback which can be used in embodiments of an upper layer header (Ethernet header) compression method proposed above in the disclosure.

Figure 2G:
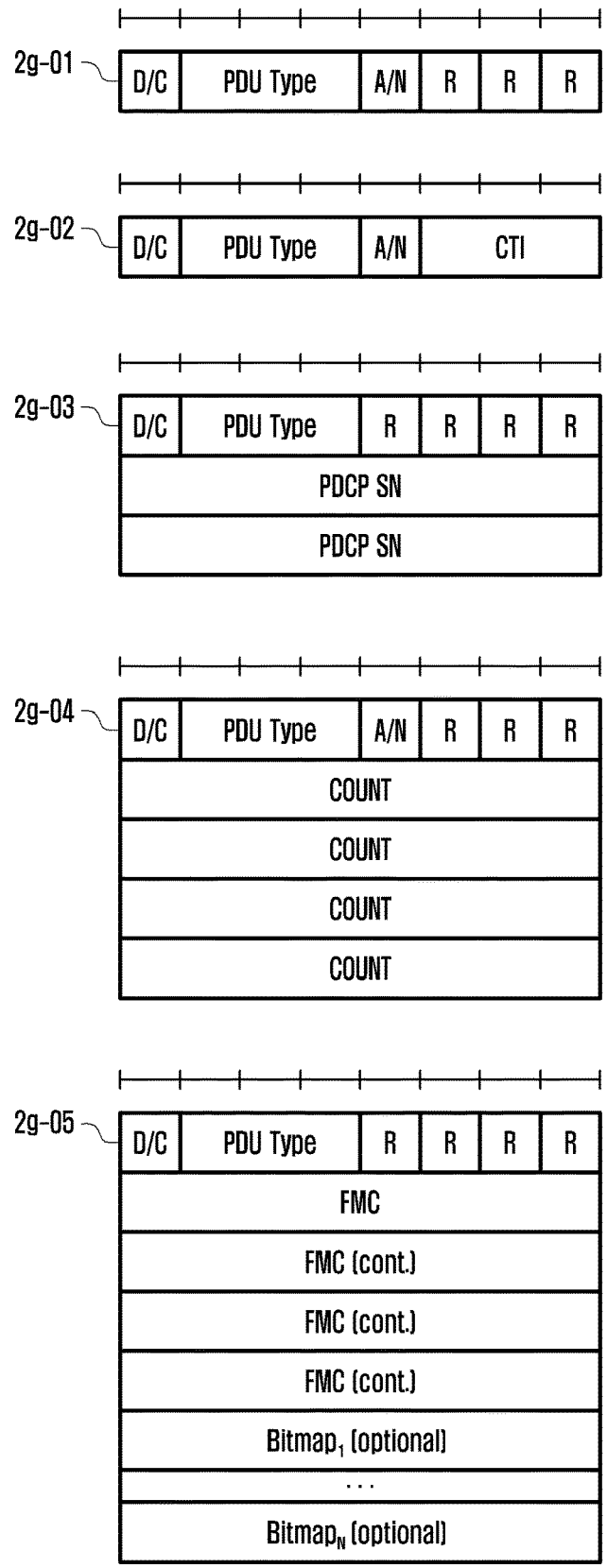
FIG. 2G is a diagram illustrating embodiments of a feedback structure which can be used in an upper layer header compression method according to an embodiment of the disclosure.

FIG. 2G is a diagram illustrating embodiments of a feedback structure which can be used in an upper layer header compression method according to an embodiment of the disclosure.

Referring to FIG. 2G, an operation of determining new PDU type field values in a first feedback structure 2g-01 to define new PDCP control data (a PDCP control PDU) is proposed. The new PDCP control data may be triggered and configured every time a whole upper layer header of received data is received without being compressed (or when a feedback is indicated by the transmission PDCP layer device) in a case where an upper layer compression and decompression method (or protocol) is configured for a reception PDCP layer device, and the triggered and configured new PDCP control data may be transmitted to the transmission PDCP layer device. The new PDCP control data may define and indicate an indicator indicating that a whole upper layer header which has been transmitted without being compressed by the transmission PDCP layer device has successfully been received or has failed to be received.

As another method, the new PDCP control data itself may indicate that a whole upper layer header which has been transmitted without being compressed by the transmission PDCP layer device has successfully been received. The transmission PDCP layer device may determine a time point of the application of a compression method of an upper layer device, through a feedback described above.

In addition, the new PDCP control data may be used to transfer a feedback to a transmission node Ethernet compression protocol when an Ethernet decompression failure has occurred (e.g., a checksum error has occurred). That is, the newly defined PDCP control data may indicate that an Ethernet decompression failure has occurred (e.g., a checksum error has occurred), and may also indicate that a transmission buffer for Ethernet header compression of the transmission node is required to be initialized.

In FIG. 2G, an operation of determining new PDU type field values in a second feedback structure 2g-02 to define new PDCP control data (a PDCP control PDU) is proposed. The new PDCP control data may be triggered and configured every time a whole upper layer header of received data is received without being compressed (or when a feedback is indicated by a transmission PDCP layer device) in a case where an upper layer compression and decompression method (or protocol) is configured for a reception PDCP layer device and the triggered and configured new PDCP control data may be transmitted to the transmission PDCP layer device. The new PDCP control data may define and indicate an indicator indicating that a whole upper layer header which has been transmitted without being compressed by the transmission PDCP layer device has successfully been received or has failed to be received. As another method, the new PDCP control data itself may indicate that a whole upper layer header which has been transmitted without being compressed by the transmission PDCP layer device has successfully been received.

In addition, a new field (e.g., a CTI) indicating the type of an upper layer header or the type of an upper layer header compression method may be defined and indicated, and an indicator indicating that a whole upper layer header which has been transmitted without being compressed by the transmission PDCP layer device has successfully been received or has failed to be received may be defined and indicated through the new PDCP control data with respect to an upper layer header or an upper layer header compression method. As another method, the new PDCP control data itself may indicate that a whole upper layer header which has been transmitted without being compressed by the transmission PDCP layer device has successfully been received, with respect to an upper layer header or an upper layer header compression method indicated by a new CTI field.

The transmission PDCP layer device may determine a time point of the application of a compression method of an upper layer device through a feedback described above.

In addition, the new PDCP control data may be used to transfer a feedback to a transmission node Ethernet compression protocol when an Ethernet decompression failure has occurred (e.g., a checksum error has occurred). That is, the newly defined PDCP control data may indicate that an Ethernet decompression failure has occurred (e.g., a checksum error has occurred) with respect to an upper layer header or an upper layer header compression method, and may also indicate that a transmission buffer for Ethernet header compression of the transmission node is required to be initialized.

In FIG. 2G, an operation of determining new PDU type field values in a third feedback structure 2g-03 to define new PDCP control data (a PDCP control PDU) is proposed. The new PDCP control data may be triggered and configured every time a whole upper layer header of received data is received without being compressed (or when a feedback is indicated by a transmission PDCP layer device) in a case where an upper layer compression and decompression method (or protocol) is configured for a reception PDCP layer device, and the triggered and configured new PDCP control data may be transmitted to the transmission PDCP layer device. The new PDCP control data may define and indicate an indicator indicating that a whole upper layer header which has been transmitted without being compressed by the transmission PDCP layer device has successfully been received or has failed to be received. As another method, the new PDCP control data itself may indicate that a whole upper layer header which has been transmitted without being compressed by the transmission PDCP layer device has successfully been received.

A new field (PDCP SN) indicating a PDCP sequence number may be defined and indicated in the PDCP control data, so as to define and indicate an indicator indicating that a whole upper layer header which has been transmitted without being compressed by the transmission PDCP layer device has successfully been received or has failed to be received, with respect to a PDCP sequence number. As another method, the new PDCP control data itself may indicate that a whole upper layer header which has been transmitted without being compressed by the transmission PDCP layer device has successfully been received, with respect to data indicated by a new PDCP sequence number field.

The transmission PDCP layer device may determine a time point of the application of a compression method of an upper layer device through a feedback described above.

In addition, the new PDCP control data may be used to transfer a feedback to a transmission node Ethernet compression protocol when an Ethernet decompression failure has occurred (e.g., a checksum error has occurred). That is, the newly defined PDCP control data may indicate that an Ethernet decompression failure has occurred (e.g., a checksum error has occurred) with respect to data having a PDCP sequence number, and may also indicate that a transmission buffer for Ethernet header compression of the transmission node is required to be initialized.

In FIG. 2G, an operation of determining new PDU type field values in a fourth feedback structure 2g-04 to define new PDCP control data (a PDCP control PDU) is proposed. The new PDCP control data may be triggered and configured every time a whole upper layer header of received data is received without being compressed (or when a feedback is indicated by a transmission PDCP layer device) in a case where an upper layer compression and decompression method (or protocol) is configured for a reception PDCP layer device and the triggered and configured new PDCP control data may be transmitted to the transmission PDCP layer device. The new PDCP control data may define and indicate an indicator indicating that a whole upper layer header which has been transmitted without being compressed by the transmission PDCP layer device has successfully been received or has failed to be received. As another method, the new PDCP control data itself may indicate that a whole upper layer header which has been transmitted without being compressed by the transmission PDCP layer device has successfully been received.

A new field (COUNT) indicating a COUNT value may be defined and indicated in the PDCP control data, so as to define and indicate an indicator indicating that a whole upper layer header which has been transmitted without being compressed by the transmission PDCP layer device has successfully been received or has failed to be received, with respect to a COUNT value through the new PDCP control data. As another method, the new PDCP control data itself may indicate that a whole upper layer header which has been transmitted without being compressed by the transmission value device has successfully been received, with respect to data indicated by a new COUNT value field.

The transmission PDCP layer device may determine a time point of the application of a compression method of an upper layer device through a feedback described above.

In addition, the new PDCP control data may be used to transfer a feedback to a transmission node Ethernet compression protocol when an Ethernet decompression failure has occurred (e.g., a checksum error has occurred). That is, the newly defined PDCP control data may indicate that an Ethernet decompression failure has occurred (e.g., a checksum error has occurred) with respect to a COUNT value, and may also indicate that a transmission buffer for Ethernet header compression of the transmission node is required to be initialized.

In FIG. 2G, an operation of using a PDCP status report among pieces of PDCP control data (PDCP control PDUs) through a fifth feedback structure 2g-05 as a feedback is proposed. The PDCP status report may be triggered and configured every time a whole upper layer header of received data is received without being compressed (or when a feedback is indicated by a transmission PDCP layer device) in a case where an upper layer compression and decompression method (or protocol) is configured for a reception PDCP layer device and the triggered and configured PDCP status report may be transmitted to the transmission PDCP layer device. The PDCP status report may define and indicate an indicator indicating that a whole upper layer header which has been transmitted without being compressed by the transmission PDCP layer device has successfully been received or has failed to be received.

In addition, the fact that a whole upper layer header which has been transmitted without being compressed by the transmission PDCP layer device has successfully been received or has failed to be received with respect to a COUNT value may be indicated through the PDCP status report. That is, a first missing COUNT value (FMC) field may indicate the first COUNT value which has failed to be transferred to an upper layer by the reception PDCP layer device yet, and bitmap fields after the field may map one bit to each of COUNT values larger than the first COUNT value, to indicate whether the value of 0 or 1 has successfully been received.

In addition, the PDCP status report may be used to transfer a feedback to a transmission node Ethernet compression protocol when an Ethernet decompression failure has occurred (e.g., a checksum error has occurred). That is, the newly defined PDCP control data may indicate that an Ethernet decompression failure has occurred (e.g., a checksum error has occurred) with respect to a COUNT value, and may also indicate that a transmission buffer for Ethernet header compression of the transmission node is required to be initialized. That is, the FMC field may indicate the first COUNT value which has failed to be transferred to an upper layer by the reception PDCP layer device yet, and bitmap fields after the field may indicate each of COUNT values larger than the first COUNT value by using one bit.

In the disclosure, in relation to a sixth feedback structure (not illustrated), an operation of defining a new field in a PDCP header or a new EHC header of data transmitted by the reception PDCP layer device to the transmission PDCP layer device and using the field as a feedback is proposed. The new field of a PDCP header or a new EHC header may be configured every time a whole upper layer header of received data is received without being compressed (or when a feedback is indicated by a transmission PDCP layer device) in a case where an upper layer compression and decompression method (or protocol) is configured for a reception PDCP layer device and the configured new field may be transmitted to the transmission PDCP layer device. The new field may indicate that a whole upper layer header which has been transmitted without being compressed by the transmission PDCP layer device has successfully been received or has failed to be received.

Hereinafter, proposed is the operation of a transmission PDCP layer device and the operation of a reception PDCP layer device when an upper layer compression and decompression method (an Ethernet header compression method) or an ROHC (a compression and decompression method for an upper layer such as TCP/IP or UDP) proposed above is configured.

The operation of a transmission PDCP layer device of a terminal or a base station, proposed in an embodiment of the disclosure, is as follows.

When the transmission PDCP layer device processes data, the transmission PDCP layer device may use a first COUNT variable maintaining a COUNT value to be assigned to data to be subsequently transmitted, and the first COUNT variable may be called TX_NEXT.

The operation of the transmission PDCP layer device, proposed in an embodiment of the disclosure, is as follows.

when data (e.g., a PDCP PDU) is received from an upper layer, the transmission PDCP layer device operates a PDCP data discard timer, and discards the data when the timer is expired.

the transmission PDCP layer device assigns a COUNT value corresponding to TX_NEXT to the data received from the upper layer. TX_NEXT may be configured to be 0 as the initial value, and maintains a COUNT value for data (PDCP SDU) to be subsequently transmitted.

if a header compression protocol (ROHC) has been configured for the transmission PDCP layer device, a header compression may be performed on data.

if an upper layer header compression protocol (an Ethernet header compression method, EthHC) has been configured for the transmission PDCP layer device, if data received from the upper layer is data which is firstly received after the Ethernet header compression method is configured, if any one of the field values of compressible fields among the fields of an Ethernet header of data received from the upper layer is different from field values stored in a buffer of the transmission PDCP layer device (or is different from the field values of an Ethernet header previously transmitted), or if a feedback indicating that data having a previously transmitted and non-compressed whole upper layer header (Ethernet header) has successfully been received, has not been received from the reception PDCP layer device yet, the transmission PDCP layer device does not perform an Ethernet header compression until a feedback indicating that a non-compressed whole upper layer header (Ethernet header) has successfully been received, is received from the reception PDCP layer device.

if a feedback indicating that data having a previously transmitted and non-compressed whole upper layer header (Ethernet header) has successfully been received, has been received from the reception PDCP layer device, the transmission PDCP layer device compresses data received from the upper layer by applying an Ethernet header compression method.

if an integrity protection has been configured for the transmission PDCP layer device, a PDCP header may be generated, and the integrity protection may be performed on the data and the PDCP header by using a security key and the COUNT value of TX_NEXT assigned to the data.

a ciphering procedure may be performed on the data by using the security key and the COUNT value of the TX_NEXT assigned to the data. As many lower LSBs as the length of a PDCP sequence number in the COUNT value of the TX_NEXT variable may be configured as a PDCP sequence number.

The transmission PDCP layer device increases the COUNT value of the TX_NEXT variable by 1, concatenates the processed data to the PDCP header and transfers the data to a lower layer.

In another method of the disclosure, in a case where the reception PDCP layer device has received a whole header transmitted by the transmission PDCP layer device, an operation of generating and transmitting a feedback by the reception PDCP layer device, or a time point at which and a method in which the transmission PDCP layer device applies a header compression procedure may differently be performed according to the mode of RLC layer devices to which the transmission and reception PDCP layer devices are connected. For example, in a case of the transmission and reception PDCP layer devices connected to RLC layer devices operated in an RLC AM mode, there is no data loss. Therefore, the transmission PDCP layer device may transmit one whole header. If one whole header is received, the reception PDCP layer device may configure and transmit a feedback corresponding to the reception to the transmission PDCP layer device. When the transmission PDCP layer device has received a feedback for the first time, the transmission PDCP layer device may transmit subsequent pieces of data by applying a header compression procedure thereto.

As another method, in a case of the transmission and reception PDCP layer devices connected to RLC layer devices operated in an RLC UM mode, there may occur data loss. Therefore, the transmission PDCP layer device may transmit multiple whole headers. Every time multiple whole headers are received, the reception PDCP layer device may configure and transmit a feedback corresponding to the reception to the transmission PDCP layer device. When the transmission PDCP layer device has received a feedback for the first time, the transmission PDCP layer device may apply a header compression procedure on subsequent pieces of data to transmit the data.

As another method, in a case of the transmission and reception PDCP layer devices connected to RLC layer devices operated in an RLC UM mode, there may occur data loss. Therefore, the transmission PDCP layer device may continuously transmit a whole header until a feedback (a feedback indicating that a whole header has successfully been received) is received from the reception PDCP layer device. Every time a whole header is received, the reception PDCP layer device may configure and transmit a feedback corresponding to the reception to the transmission PDCP layer device. When the transmission PDCP layer device has received a feedback for the first time, the transmission PDCP layer device may stop transmitting the whole header, and may apply a header compression procedure on subsequent pieces to transmit the data.

As another method, in a case of the transmission and reception PDCP layer devices connected to RLC layer devices operated in an RLC AM mode, the transmission PDCP layer device may continuously transmit a whole header until a feedback (a feedback indicating that a whole header has successfully been received) is received from the reception PDCP layer device. Every time multiple whole headers are received, the reception PDCP layer device may configure and transmit a feedback corresponding to the reception to the transmission PDCP layer device. When the transmission PDCP layer device has received a feedback for the first time, the transmission PDCP layer device may stop transmitting the whole header, and apply a header compression procedure on pieces of data to transmit the data.

As another method, in a case of the transmission and reception PDCP layer devices connected to RLC layer devices operated in an RLC AM mode, there is no data loss. Therefore, the transmission PDCP layer device may configure and transmit one whole header. The transmission PDCP layer device may apply a header compression procedure on pieces of data from the immediately next data to process and transmit the data. That is, the transmission PDCP layer device may immediately apply a data compression procedure without receiving a feedback (a feedback indicating that a whole header has successfully been received) from the reception PDCP layer device. The above reception PDCP layer device may align received pieces of data according to an ascending order based on a PDCP sequence number or COUNT value. In addition, since there is no data loss in the RLC AM, the reception PDCP layer device may firstly receive and process a whole header, and then identify an identifier value and a header compression method of a data flow. Thereafter, the reception PDCP layer device may apply a header decompression procedure on pieces of data according to an ascending order, to process the pieces of data and then transfer the processed pieces of data to an upper layer device.

As another method, in a case of the transmission and reception PDCP layer devices connected to RLC layer devices operated in an RLC UM mode, there may occur data loss. Therefore, the transmission PDCP layer device may transmit multiple whole headers, and apply a header compression procedure on pieces of data from the immediately next piece of data to process and transmit the data. That is, the transmission PDCP layer device may immediately apply a data compression procedure without receiving a feedback (a feedback indicating that a whole header has successfully been received) from the reception PDCP layer device.

The above reception PDCP layer device may align received pieces of data according to an ascending order based on a PDCP sequence number or COUNT value. Even if data loss has occurred in the RLC UM, the reception PDCP layer device may assume that there is a high possibility that at least one whole header can be received among multiple whole headers, may first receive and process a whole header, and may identify an identifier value and a header compression method of a data flow. Thereafter, the reception PDCP layer device may apply a header decompression procedure on pieces of data according to an ascending order, to process the pieces of data and then transfer the processed pieces of data to an upper layer device.

In addition, a new timer value may be configured for a reception PDCP layer device connected to an RLC layer device operated in the RLC UM or AM, by an RRC message. If a whole header is received, the reception PDCP layer device may transmit a feedback and start the timer. The reception PDCP layer device performs an operation of, until the timer is expired, preventing additional feedback transmission even when a whole header is received. Therefore, unnecessary feedback generation can be prevented.

In addition, in a case where a feedback is received for the first time, a transmission PDCP layer device connected to an RLC layer device operated in the RLC UM or AM may consider that a whole header has successfully been received by the reception PDCP layer device, and may apply a header compression procedure on subsequent pieces of data to transmit the data. The transmission PDCP layer device may neglect additionally received feedbacks during a predetermined time interval (e.g., from the start of a new timer to the expiration of the timer when a value for the new timer is configured by an RRC message, and a feedback is received for the first time). The feedback structures proposed in FIG. 2G of the disclosure may be applied as the structure of the above feedback.

As described above, an Ethernet header compression algorithm proposed in the disclosure may be operated without a feedback as described in the disclosure. That is, a transmission PDCP layer device may transmit multiple pieces of data each having a whole header which is not compressed by an Ethernet header compression algorithm and includes configuration information or context of the Ethernet header compression algorithm. After multiple pieces of data are transmitted, the transmission PDCP layer device may immediately apply the Ethernet header compression algorithm on the next pieces of data, so as to transmit data including a compressed Ethernet header. In an embodiment, a whole header may indicate a new EHC header including configuration information of an Ethernet header compression algorithm in a non-compressed upper layer header or a PDCP layer device. In an embodiment, when the transmission PDCP layer device transmits pieces of data having multiple whole headers, new EHC headers included in the whole headers may indicate the same information, or each of the pieces of data may include different pieces of upper layer data.

In addition, in an embodiment, in a case where the transmission PDCP layer device starts to apply an Ethernet header compression method, or starts to change the Ethernet header compression method, a base station may configure the number of multiple pieces of data each including a whole header, which the transmission PDCP layer device is to transmit. For example, as illustrated in FIG. 2A, the base station may configure the number of multiple pieces of data each including a whole header, which are to be transmitted, for each bearer by using an RRC message (e.g., an RRCSetup, RRCResume, or RRCReconfiguration message).

In an embodiment of the disclosure, methods by which an Ethernet header compression algorithm can be operated without the above feedback when the Ethernet header compression algorithm is configured for a PDCP layer device are proposed as follows.

Method 1: In a case where a transmission PDCP layer device starts to apply an Ethernet header compression method for each bearer, or starts to change the Ethernet header compression method, a base station may configure the number of multiple pieces of data each including a whole header, which are transmitted by the transmission PDCP layer device, to be a first number. For example, as illustrated in FIG. 2A, the base station may configure the number for each bearer by using an RRC message (e.g., an RRCSetup, RRCResume, or RRCReconfiguration message).

That is, in a case where the transmission PDCP layer device is to apply an Ethernet header compression method, or is to change the Ethernet header compression method, the transmission PDCP layer device may transmit the RRC message-configuring first number of multiple pieces of data each including a whole header including configuration information or context of the Ethernet header compression algorithm, so as to configure an Ethernet header compression method. After the first number of multiple pieces of data is transmitted, the transmission PDCP layer device may immediately apply the Ethernet header compression algorithm on the next pieces of data, so as to transmit the pieces of data each including a compressed Ethernet header.

In an embodiment, how many multiple pieces of data each including the above whole header are to be transmitted, may be determined in light of implementation. In an embodiment, multiple QoS flows (or multiple different Ethernet header types) may be mapped to one bearer. Therefore, in a case where a transmission PDCP layer device starts to apply an Ethernet header compression method for each bearer or each QoS flow of one bearer, or starts to change the Ethernet header compression method, a base station may configure the number of multiple pieces of data each including a whole header, which are transmitted by the transmission PDCP layer device, to be a second number for each instance.

In an embodiment, in a case where a transmission PDCP layer device starts to apply an Ethernet header compression method for each bearer, or starts to change the Ethernet header compression method, a base station may configure the number of multiple pieces of data each including a whole header, which are transmitted by the transmission PDCP layer device, to be a first number. Since multiple QoS flows (or multiple QoS flows to which multiple context identifiers (indicating Ethernet header compression methods) are mapped, respectively, or multiple different Ethernet header types) may be mapped to one bearer, each transmission PDCP layer device may transmit the first number of pieces of data each including a whole header corresponding to each context identifier (or each Ethernet header compression method) or each QoS flow for each instance. After each transmission PDCP layer device transmits the first number of the pieces of data including the whole headers for each instance, each transmission PDCP layer device may start to compress Ethernet headers by applying an Ethernet header compression method corresponding to each context identifier on the next pieces of data corresponding to each context identifier or each QoS flow (or each Ethernet header type). Alternatively, each transmission PDCP layer device may compress Ethernet headers and transfer the pieces of data to a lower layer to transmit the same.

In an embodiment, the transmission PDCP layer device may assign different context identifiers to different QoS flows (or Ethernet header types), and configure and apply different Ethernet header compression methods. In an embodiment, the above method 1 may be applied to a bearer corresponding to a PDCP layer device connected to the RLC UM, or a bearer corresponding to a PDCP layer device connected to the RLC AM.

Method 2: In method 2, different methods are applied to a bearer corresponding to a PDCP layer device connected to the RLC UM, and a bearer corresponding to a PDCP layer device connected to the RLC AM, respectively. In an embodiment, in a case where a transmission PDCP layer device starts to apply an Ethernet header compression method for each bearer, or starts to change the Ethernet header compression method, a base station may configure the number of multiple pieces of data each including a whole header, which are transmitted by the transmission PDCP layer device, to be a first number.

For example, as illustrated in FIG. 2A, the base station may configure the number for each bearer by using an RRC message (e.g., an RRCSetup, RRCResume, or RRCReconfiguration message). That is, in a case where the transmission PDCP layer device is to apply an Ethernet header compression method, or is to change the Ethernet header compression method, the transmission PDCP layer device may transmit the RRC message-configuring first number of multiple pieces of data each including a whole header including configuration information or context of the Ethernet header compression algorithm, so as to configure an Ethernet header compression method. After the first number of pieces of data is transmitted, the transmission PDCP layer device may immediately apply the Ethernet header compression algorithm on the next pieces of data, so as to transmit the pieces of data each including a compressed Ethernet header.

In an embodiment, how many multiple pieces of data each including the above whole header are to be transmitted, may be determined in light of implementation. In an embodiment, multiple QoS flows may be mapped to one bearer. Therefore, in a case where a transmission PDCP layer device starts to apply an Ethernet header compression method for each bearer or each QoS flow of one bearer, or starts to change the Ethernet header compression method, a base station may configure the number of multiple pieces of data each including a whole header, which are transmitted by the transmission PDCP layer device, to be a second number for each instance.

In an embodiment, in a case where a transmission PDCP layer device starts to apply an Ethernet header compression method for each bearer, or starts to change the Ethernet header compression method, a base station may configure the number of multiple pieces of data each including a whole header, which are transmitted by the transmission PDCP layer device, to be a first number. Since multiple QoS flows (or multiple QoS flows to which multiple context identifiers (indicating Ethernet header compression methods, or multiple Ethernet header types) are mapped, respectively) may be mapped to one bearer, each transmission PDCP layer device may transmit the first number of pieces of data each including a whole header corresponding to each context identifier (or each Ethernet header compression method) or each QoS flow for each instance. After each transmission PDCP layer device transmits the first number of pieces of data including the whole headers for each instance, each transmission PDCP layer device may start to compress Ethernet headers by applying an Ethernet header compression method corresponding to each context identifier on the next pieces of data corresponding to each context identifier or each QoS flow (or each Ethernet header type). Alternatively, each transmission PDCP layer device may compress Ethernet headers and transfer the pieces of data to a lower layer to transmit the same.

In an embodiment, the transmission PDCP layer device may assign different context identifiers to different QoS flows, and configure and apply different Ethernet header compression methods. In an embodiment, the above method 2 may be applied to a bearer corresponding to a PDCP layer device connected to the RLC UM, as it is. However, when method 2 is applied to a bearer corresponding to a PDCP layer device connected to the RLC AM, the first number or the second number may be always configured to be 1. This is because, since there is no data loss in the RLC AM mode, and a reception PDCP layer device always sequences pieces of data and then performs a header decompression procedure, it is enough that a transmission PDCP layer device transmits only one whole header, and the transmission PDCP layer device is not required to unnecessarily transmit multiple whole headers.

Therefore, a transmission PDCP layer device connected to the RLC AM mode may configure and transmit one piece of data including a whole header corresponding to each context identifier (or each Ethernet header compression method) or each QoS flow, and then apply an Ethernet header compression method corresponding to each context identifier on the next pieces of data corresponding to each context identifier or each QoS flow, to start to compress Ethernet headers. Alternatively, the transmission PDCP layer device may compress Ethernet headers and transfer the pieces of data to a lower layer to transmit the same.

Method 3: In method 3, different methods are applied to a bearer corresponding to a PDCP layer device connected to the RLC UM, and a bearer corresponding to a PDCP layer device connected to the RLC AM, respectively. In an embodiment, in a case where a transmission PDCP layer device starts to apply an Ethernet header compression method for each of only bearers connected to the RLC UM, or starts to change the Ethernet header compression method, a base station may configure the number of multiple pieces of data each including a whole header, which are transmitted by the transmission PDCP layer device, to be a first number.

For example, as illustrated in FIG. 2A, the base station may configure the number for each of only bearers connected to the RLC UM by using an RRC message (e.g., an RRCSetup, RRCResume, or RRCReconfiguration message). That is, in a case where the transmission PDCP layer device connected to the RLC UM is to apply an Ethernet header compression method, or is to change the Ethernet header compression method, the transmission PDCP layer device may transmit the RRC-configuring first number of multiple pieces of data each including a whole header including configuration information or context of the Ethernet header compression algorithm, so as to configure an Ethernet header compression method. After the first number of pieces of data is transmitted, the transmission PDCP layer device connected to the RLC UM may immediately apply the Ethernet header compression algorithm on the next pieces of data, so as to transmit the pieces of data each including a compressed Ethernet header.

In an embodiment, how many multiple pieces of data each including the above whole header are to be transmitted, may be determined in light of implementation. In an embodiment, multiple QoS flows (or multiple Ethernet header types) may be mapped to one bearer. Therefore, in a case where a transmission PDCP layer device starts to apply an Ethernet header compression method for each of only bearers connected to the RLC UM or each QoS flow (or each Ethernet header type) of one of the bearers, or starts to change the Ethernet header compression method, a base station may configure the number of multiple pieces of data each including a whole header, which are transmitted by the transmission PDCP layer device, to be a second number for each instance.

In an embodiment, in a case where a transmission PDCP layer device starts to apply an Ethernet header compression method for each of only bearers connected to the RLC UM, or starts to change the Ethernet header compression method, a base station may configure the number of multiple pieces of data each including a whole header, which are transmitted by the transmission PDCP layer device, to be a first number. Since multiple QoS flows (or multiple QoS flows to which multiple context identifiers (each indicating an Ethernet header compression method, or an Ethernet header type) are mapped, respectively) may be mapped to one bearer, each transmission PDCP layer device connected to the RLC UM may transmit the first number of pieces of data including a whole header corresponding to each context identifier (or each Ethernet header compression method) or each QoS flow (or each Ethernet header type) for each instance. After each transmission PDCP layer device connected to the RLC UM transmits the first number of pieces of data including the whole headers for each instance, each transmission PDCP layer device connected to the RLC UM may start to compress Ethernet headers by applying an Ethernet header compression method corresponding to each context identifier on the next pieces of data corresponding to each context identifier or each QoS flow. Alternatively, each transmission PDCP layer device connected to the RLC UM may compress Ethernet headers and transfer the pieces of data to a lower layer to transmit the same.

In an embodiment, the transmission PDCP layer device may assign different context identifiers to different QoS flows, and configure and apply different Ethernet header compression methods. However, in a case where an Ethernet header compression algorithm is configured in the above method 3, when the Ethernet header compression algorithm is applied, a PDCP layer device (or bearer) connected to the RLC AM may configure and transmit one piece of data including a whole header corresponding to each context identifier (or each Ethernet header compression method) or each QoS flow (or each Ethernet header type), and then apply an Ethernet header compression method corresponding to each context identifier on the next pieces of data corresponding to each context identifier or each QoS flow (or each Ethernet header type), to start to compress Ethernet headers. Alternatively, a PDCP layer device (or bearer) connected to the RLC AM may compress the Ethernet headers and transfer the pieces of data to a lower layer to transmit the same. This is because, since there is no data loss in the RLC AM mode, and a reception PDCP layer device always sequences pieces of data and then performs a header decompression procedure, it is enough that a transmission PDCP layer device transmits only one whole header, and the transmission PDCP layer device is not required to unnecessarily transmit multiple whole headers.

Therefore, the first number or the second number may not be configured by an RRC message as described above for a transmission PDCP layer device or a bearer connected to the RLC AM.

In addition, in an embodiment of the disclosure, when the transmission PDCP layer device applies an Ethernet header compression method, Ethernet header compression method-related configuration information relating to fields which are to be compressed or are compressible for each context identifier (or each QoS flow or each Ethernet header type) may be shared and synchronized between the transmission PDCP layer device and the reception PDCP layer device.

An embodiment proposes a method in which, in a case where an Ethernet header compression method is configured for each context identifier, when the transmission PDCP layer device applies the Ethernet header compression method, the transmission PDCP layer device includes Ethernet header compression method-related configuration information (e.g., a context identifier or a bitmap field) in a whole header described above, and transmits the whole header including the information together with data when the data is transmitted.

However, in another embodiment, referring to the RRC message illustrated in FIG. 2A, Ethernet header compression method-related configuration information which can be applied for each bearer or each PDCP layer device and relates to fields which are to be compressed or are compressible for each context identifier (or each QoS flow or each Ethernet header type) may be previously configured by an RRC message. According to the Ethernet header compression method-related configuration information, the transmission PDCP layer device may apply an Ethernet header compression procedure for each context. In addition, when the transmission PDCP layer device starts to apply an Ethernet header compression method, or change the Ethernet header compression method, each of multiple whole headers included in data transmitted by the transmission PDCP layer device may not include Ethernet header compression method-related configuration information such as a bitmap field, and may include a context identifier or a non-compressed Ethernet header. In addition, method 1, 2, or 3 may be applied to obtain the number of whole headers to be transmitted.

In an embodiment, Ethernet header compression method-related configuration information relating to fields which are to be compressed or are compressible for each context identifier (or each QoS flow or each Ethernet header type)

may be previously configured by an RRC message. Therefore, the transmission PDCP layer device may not include the Ethernet header compression method-related configuration information in a whole header and can thus reduce overhead.

An embodiment of the disclosure proposes a specific procedure of compressing padding of an Ethernet frame by a transmission node and reconstructing the compressed padding by a reception node.

According to an embodiment, an Ethernet protocol may be designed to discard data (e.g., an Ethernet frame) having a size smaller than a predetermined first size (e.g., the size is 64 bytes, may be previously determined, or may be configured by an RRC message as illustrated in FIG. 2A) at the reception node. Therefore, if the size of an Ethernet frame is smaller than the predetermined first size, the transmission node may add padding to transmit data matched to the first size.

Therefore, if the transmission PDCP layer device receives data from an upper layer device (e.g., an Ethernet protocol layer device) and transmits the received data as it is, when small data is serviced, the transmission PDCP layer device is required to continuously include and transmit padding in transmission resources, and thus the waste of transmission resources can be incurred. The waste of transmission resources may cause data transmission latency.

Therefore, in an embodiment of the disclosure, in a case where an Ethernet header compression method is configured for each bearer, a transmission PDCP layer device may identify the size of data received from an upper layer device. If the size of the identified data (e.g., an Ethernet frame) is identical or smaller than a second size (e.g., the size is 64 bytes, may be previously determined, or may be configured by an RRC message as illustrated in FIG. 2A), or is identical or larger than the second size, the transmission PDCP layer device may identify padding of the data, remove the padding from the data, and then transmit the data.

In addition, in an embodiment, the reception PDCP layer device for which an Ethernet header compression method is configured may identify the size of data received from a lower layer device (e.g., an RLC layer device). If the size of the identified data (e.g., an Ethernet frame) is identical or smaller than a third size (e.g., the size is 64 bytes, may be previously determined, or may be configured by an RRC message as illustrated in FIG. 2A), the reception PDCP layer device may add padding to the data to configure the size of the data to be matched to the first size (or the third size), and then transfer the data to an upper layer device. Through this operation, the waste of transmission resource can be reduced.

According to an embodiment, one of an Ethernet header compression method or an ROHC header compression method may be configured for a PDCP layer device, or both of them may be configured therefor.

In an embodiment, if the size of data received from an upper layer device by a transmission PDCP layer device for which an Ethernet header compression method is configured is a fourth size, the transmission PDCP layer device may apply the Ethernet header compression method on the received data to reduce the size of the data to be a (5-1)th size. In addition, in a case where both an Ethernet header compression method or an ROHC header compression method are configured, the transmission PDCP layer device may apply the ROHC header compression method on data having the (5-1)th size to reduce the size of the data to be a (6-1)th size.

In an embodiment, if the size of data received from an upper layer device by a transmission PDCP layer device for which an ROHC header compression method is configured is the fourth size, the transmission PDCP layer device may apply the ROHC header compression method on the received data to reduce the size of the data to be a (5-2)th size. In addition, in an embodiment, in a case where both an Ethernet header compression method or an ROHC header compression method are configured, a transmission PDCP layer device may apply the Ethernet header compression method or the ROHC header compression method on data having the (5-2)th size to reduce the size of the data to be a (6-2)th size.

In addition, in an embodiment, a transmission PDCP layer device for which an Ethernet header compression method is configured may identify the size of data received from an upper layer device. If the size of the identified data (e.g., an Ethernet frame) is identical or smaller than a second size (e.g., the size is 64 bytes, may be previously determined, or may be configured by an RRC message as illustrated in FIG. 2A), or is identical or larger than the second size, the transmission PDCP layer device may identify padding of the data. After identifying of the padding, the transmission PDCP layer device may remove the padding from the data and then transmit the data.

In an embodiment, a transmission PDCP layer device may identify the size of data received from an upper layer device, or identify field information of the Ethernet header, so as to determine whether there is padding and perform a padding removal procedure. The padding removal procedure may be performed before an Ethernet header compression procedure or an ROHC header compression procedure. This is because, after an Ethernet header compression procedure or an ROHC header compression procedure is performed, the size of data is smaller than the fourth size which is the original size thereof, and it is thus difficult to precisely remove padding therefrom. In an embodiment, a transmission PDCP layer device may receive data from an upper layer device, store the fourth size, and perform a padding removal procedure after an Ethernet header compression procedure or an ROHC header compression procedure. That is, a padding removal procedure may be implemented in any order.

In an embodiment, a reception PDCP layer device for which an Ethernet header compression method is configured may identify the size of data received from a lower layer device. If the size of the identified data (e.g., an Ethernet frame) is identical or smaller than the third size (e.g., the size is 64 bytes, may be previously determined, or may be configured by an RRC message as illustrated in FIG. 2A), the reception PDCP layer device may determine that padding of the data has been removed, and add or configure padding for the data to be matched to the third size or the first size so as to perform a padding reconstruction procedure. The reception PDCP layer device may transfer the data for which the padding reconstruction procedure has been performed, to an upper layer device. However, when the reception PDCP layer device identifies the size of data received from a lower layer device as described above, an Ethernet header compression method or an ROHC header compression method may have been already configured. If an Ethernet header compression method or an ROHC header compression method has been already configured, the reception PDCP layer device may complete an Ethernet header decompression or an ROHC header decompression, and then identify the size of data received from a lower layer device and perform a padding reconstruction procedure.

This is because the size of data to which an Ethernet header compression method or an ROHC header compression method has been applied is small, and thus after the data is reconstructed to have the original size thereof, the reception PDCP layer device may compare the reconstructed data with the third size or the first size, or may identify Ethernet header field information and apply a padding reconstruction procedure. That is, before the reception PDCP layer device identifies the size of data received from a lower layer device, the reception PDCP layer device may apply a decoding procedure, an integrity protection procedure, or an Ethernet header decompression or ROHC header decompression procedure on the received data, reconstruct the data to have the original size thereof, and then compare the size of the data with the third size or the first size.

The reception PDCP layer device may identify field information of an Ethernet header (or an indicator of a PDCP header, or an indicator of an EHC header) of data (e.g., an Ethernet frame), the size of which is identical or smaller than the third size (e.g., the size is 64 bytes, may be previously determined, or may be configured by an RRC message as illustrated in FIG. 2A). If the result of the information identification shows the removal (or compression) of padding, the reception PDCP layer device may determine that the padding has been removed so as to prevent the waste of transmission resources. After it is determined that padding has been removed, the reception PDCP layer device may add or configure padding for the data to be matched to the third size or the first size, to perform a padding reconstruction procedure, and may transfer the data to which the padding reconstruction procedure has been performed, to an upper layer device.

That is, in an embodiment, a procedure of reconstructing (or decompressing) padding for an Ethernet header by a reception PDCP layer device for which an Ethernet header compression method or an ROHC header compression method is configured may be performed by the reception PDCP layer device by completing an Ethernet header decompression or ROHC header decompression procedure and then identifying the size or header field information of data.

In addition, in an embodiment, in a case where both an Ethernet header compression method and an ROHC header compression method are configured, the reception PDCP layer device may perform a decoding or integrity verification procedure on data received from a lower layer device. After the decoding or integrity verification procedure is performed, the reception PDCP layer device may firstly apply an Ethernet header decompression method, and identify the size of a compressed Ethernet header. After the size of the compressed Ethernet header is identified, the reception PDCP layer device may identify an ROHC-compressed header and perform an ROHC header decompression procedure on the ROHC-compressed header.

In an embodiment, an Ethernet header decompression and an ROHC header decompression may independently be performed. That is, an Ethernet header decompression or ROHC header decompression procedure may be performed in any order. However, the reception PDCP layer device may first identify the size of a compressed Ethernet header after a PDCP header, identify the size of an ROHC-compressed header, and then independently perform an Ethernet header decompression or an ROHC header decompression.

In an embodiment, for convenience of implementation, an indicator indicating that an Ethernet header compression or ROHC header compression has been performed may be defined in a PDCP header or an EHC header, and a transmission PDCP layer device may transmit the indicator. A reception PDCP layer device having received the indicator from the transmission PDCP layer device may identify the indicator and apply an Ethernet header decompression or ROHC header decompression.

The above methods may be required for a case where both an Ethernet header compression method and an ROHC header compression method are configured, because a reception PDCP layer device is unable to know the position of a compressed ROHC header in received data.

In addition, in FIG. 2A of the disclosure, an RRC message may be used so that a transmission PDCP layer device transmits a whole header for each bearer or each PDCP layer device. After the whole header is transmitted, the transmission PDCP layer device may receive a feedback indicating that the whole header has successfully been received, from a reception PDCP layer device. After the feedback is received from the reception PDCP layer device, the transmission PDCP layer device may configure whether to start an Ethernet header compression procedure, or transmit multiple pieces of data each having a whole header and then immediately start the Ethernet header compression procedure, through an indicator.

For example, in a case where an Ethernet header compression method is configured for each bearer or each PDCP layer device configuration information, an RRC message (e.g., an RRCSetup, RRCResume, or RRCReconfiguration message) may indicate whether to use a feedback. In addition, in a case where the transmission of multiple pieces of data each having a whole header is configured, an RRC message may indicate a number of times corresponding to the transmission. In addition, an RRC message may configure different Ethernet header compression configuration information (e.g., whether to perform feedback, whether to transmit multiple whole headers, or the number of times of transmission) for a PDCP layer device for which the RLC UM or the RLC AM is configured.

The operation of a reception PDCP layer device of a terminal or a base station, proposed in the disclosure, is as follows.

The reception PDCP layer device uses PDCP sequence number length (e.g., 12 bits or 18 bits), which is configured through RRC by the base station, and identifies the PDCP sequence number of received data (e.g., a PDCP PDU) and operates a reception window. The reception window may be configured to have a size (e.g., 2^(PDCP SN length-1)) of half the space of the PDCP sequence number, and may be used to distinguish valid data. That is, data received outside the reception window may be determined as invalid data and thus be discarded. The reason for data arriving outside the reception window is that there occurs a case where data arrives very late due to retransmission by an RLC layer device or HARQ retransmission of an MAC layer device in a lower layer device. In addition, the reception PDCP layer device operates a PDCP reordering timer (t-Reordering) together with the reception window.

If a PDCP sequence number gap has occurred, the PDCP reordering timer may be triggered based on PDCP sequence numbers in the reception PDCP layer device, and if data corresponding to the PDCP sequence number gap has not arrived until the PDCP reordering timer is expired, the reception PDCP layer device may transfer pieces of data according to the ascending order of PDCP sequence numbers or COUNT values to an upper layer device, and move the reception window. Therefore, if data corresponding to the PDCP sequence number gap has arrived after the PDCP reordering timer is expired, the data is not located in the reception window, and thus may be discarded.

A specific procedure of the reception PDCP layer device is as follows. The operation of a reception PDCP layer device of a terminal or a base station, proposed in the disclosure, is as follows.

The reception PDCP layer device may maintain and manage three COUNT variables when processing received data. When processing received data, the reception PDCP layer device may use a second COUNT variable maintaining a COUNT value of data (e.g., a PDCP SDU) expected to be received subsequent to the received data, and the second COUNT variable may be called RX_NEXT. When processing received data, the reception PDCP layer device may use a third COUNT variable maintaining a COUNT value of the first data (e.g., a PDCP SDU) which has not been transferred to an upper layer, and the third COUNT variable may be called RX_DELIV.

When processing received data, the reception PDCP layer device may use a fourth COUNT variable maintaining a COUNT value of data (e.g., a PDCP SDU) which has triggered a PDCP reordering timer (t-Reordering), and the fourth COUNT variable may be called RX_REORD. When processing received data, the reception PDCP layer device may use a fifth COUNT variable maintaining a COUNT value of the currently received data (e.g., a PDCP SDU) which has currently been received, and the fifth COUNT value may be called RCVD_COUNT. The PDCP reordering timer uses a timer value or interval configured by an RRC message as illustrated in FIG. 2A in an upper layer (RRC layer). The timer is used to detect a lost PDCP PDU, and only one timer is operated at a time.

In addition, in the operation of the reception PDCP layer device, a terminal may define and use variables as below.

HFN: this variable indicates a hyper frame number (HFN) part of a window status variable.

SN: this variable indicates a sequence number (SN) part of a window status variable.

RCVD_SN: a PDCP sequence number included in a header of a received PDCP PDU.

RCVD_HFN: a HFN value of a PDCP PDU, calculated by the reception PDCP layer device.

The operation of a reception PDCP layer device of a terminal or a base station, proposed in the disclosure, is as follows. When a PDCP PDU is received from a lower layer, the reception PDCP layer device determines a COUNT value of the received PDCP PDU as below.

if received RCVD_SN follows RCVD_SN<=SN (RX_DELIV)−Window_Size, update RCVD_HFN to RCVD_HFN=HFN(RX_DELIV)+1 on the contrary, if RCVD_SN follows RCVD_SN>SN (RX_DELIV)+Window_Size, update RCVD_HFN to RCVD_HFN=HFN(RX_DELIV)−1.

if RCVD_SN does not correspond to both the two cases, update RCVD_HFN to RCVD_HFN=HFN(RX_DELIV).

RCVD_COUNT is determined through RCVD_COUNT=[RCVD_HFN, RCVD_SN].

After the COUNT value of the reception PDCP PDU is determined, the reception PDCP layer device updates window status variables and processes the PDCP PDU as below.

decode the PDCP PDU by using the RCVD_COUNT value, and perform integrity verification on the PDCP PDU.

if the integrity verification has failed, indicate an integrity verification failure to an upper layer, and discard received PDCP Data PDU (data part of PDCP PDU).

if RCVD_COUNT<RX_DELIV, or a PDCP PDU having the RCVD_COUNT value has been previously received (or in a case of a packet which is expired, is out-of-date, or is outside the window, or a case of overlapped packet), discard received PDCP Data PDU (data part of PDCP PDU).

If the received PDCP PCU is not discarded, the reception PDCP layer device is operated as follows.

store a processed PDCP SDU in a reception buffer.

if RCVD_COUNT>=RX_NEXT, update RX_NEXT to RCVD_COUNT+1.

if an out-of-order delivery indicator (outOfOrderDelivery) is configured (the indicator indicates an out-of-order delivery operation), transmit the PDCP SDU to an upper layer.

if RCVD_COUNT is equal to RX_DELIV, (although an Ethernet header compression protocol or ROHC is configured) if a header decompression procedure has not been previously applied, (i.e., data processing has not been performed on an upper layer header yet), if an Ethernet header compression protocol has been configured, and an Ethernet header has been compressed, (an indicator of a new EHC header is identified, and indicates that an Ethernet header has been compressed), perform a decompression on the Ethernet header of the data.

on the contrary, if an Ethernet header compression protocol has been configured, and an Ethernet header has not been compressed (an indicator of a new EHC header is identified, and indicates that an Ethernet header has not been compressed), consider that the Ethernet header of the data is a non-compressed header, and not perform decompression.

because a non-compressed Ethernet header has successfully been received, trigger a feedback, configure the feedback, and transmit the feedback to the transmission PDCP layer device so as to indicate the successful reception to the transmission PDCP layer device.

on the contrary, if an Ethernet header compression protocol is not configured, and an ROHC is configured, decompress an upper layer header (TCP/IP or UDP header) of the data.

transfer pieces of data to an upper layer according to an order based on the COUNT values thereof.

transfer all consecutive PDCP SDUs to the upper layer, starting from the PDCP SDU having the COUNT=RX_DELIV value.

update the RX_DELIV value to a COUNT value which is identical to or larger than the current RX_DELIV, and is the COUNT value of the first PDCP SDU which has not been transferred to the upper layer.

if a t-Reordering timer is being operated, and the RX_DE-
LIV value is equal to or greater than RX_REORD,
stop and reset the t-Reordering timer.
if a t-Reordering timer is not being operated (including a
case wherein the timer is stopped, among the above
conditions), and RX_DELIV is smaller than
RX_NEXT,
update the RX_REORD value to RX_NEXT.
start the t-Reordering timer.

When the t-Reordering timer is expired, the reception PDCP layer device is operated as follows.
(although an Ethernet header compression protocol or ROHC is configured) if a header decompression procedure has not been previously applied, (i.e., data processing has not been performed on an upper layer header yet),
if an Ethernet header compression protocol has been configured, and an Ethernet header has been compressed (an indicator of a new EHC header is identified, and indicates that an Ethernet header has been compressed),
perform a decompression on the Ethernet header of the data.
on the contrary, if an Ethernet header compression protocol has been configured, and an Ethernet header has not been compressed (an indicator of a new EHC header is identified, and indicates that an Ethernet header has not been compressed),
consider that the Ethernet header of the data is a non-compressed header, and not perform decompression.
because a non-compressed Ethernet header has successfully been received, trigger a feedback, configure the feedback, and transmit the feedback to the transmission PDCP layer device so as to indicate the successful reception to the transmission PDCP layer device.
on the contrary, if an Ethernet header compression protocol is not configured, and an ROHC is configured, decompress an upper layer header (TCP/IP or UDP header) of the data.
transfer pieces of data to an upper layer according to an order based on the COUNT values thereof.
transfer all PDCP SDUs having a COUNT value smaller than the RX_REORD value.
transfer all PDCP SDUs having consecutive COUNT values, starting from a PDCP SDU having the RX_RE-ORD value.
update the RX_DELIV value to a COUNT value which is identical to or larger than RX_REORD, and is the COUNT value of the first PDCP SDU which has not been transferred to the upper layer.
if the RX_DELIV value is smaller than the RX_NEXT value,
update the RX_REORD value to the RX_NEXT value.
start the t-Reordering timer.

An embodiment of the disclosure proposes a procedure of a transmission PDCP layer device for each bearer with respect to an Ethernet header protocol when a PDCP re-establishment procedure is triggered, as below.
if it is not instructed to continue to use an Ethernet header compression protocol, initialize the Ethernet header compression protocol for UM data radio bearers (DRBs) or AM DRBs.
the AM DRBs newly perform an Ethernet header compression procedure on pieces of data to be transmitted and retransmitted, newly compress Ethernet headers and also newly perform ROHC header compressions to process the pieces of data, and transmit and retransmit the processed pieces of data.
the UM DRBs newly perform an Ethernet header compression procedure on pieces of data which have not been transmitted yet, newly compress Ethernet headers and also newly perform ROHC header compressions to process the pieces of data, and transmit the processed pieces of data.

Figure 2H:
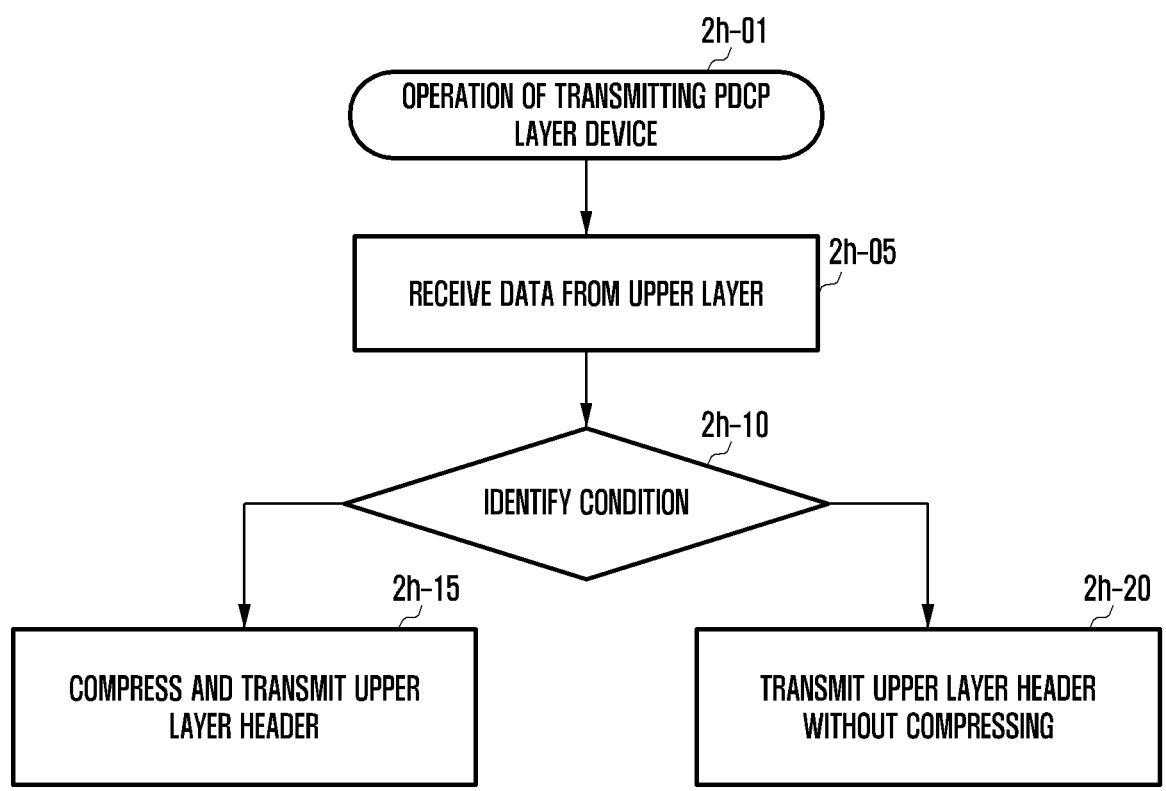
FIG. 2HA and FIG. 2HB are diagrams illustrating the operation of a transmission PDCP layer device or a reception PDCP layer device of a terminal or a base station according to an embodiment of the disclosure.
Figure 2H:
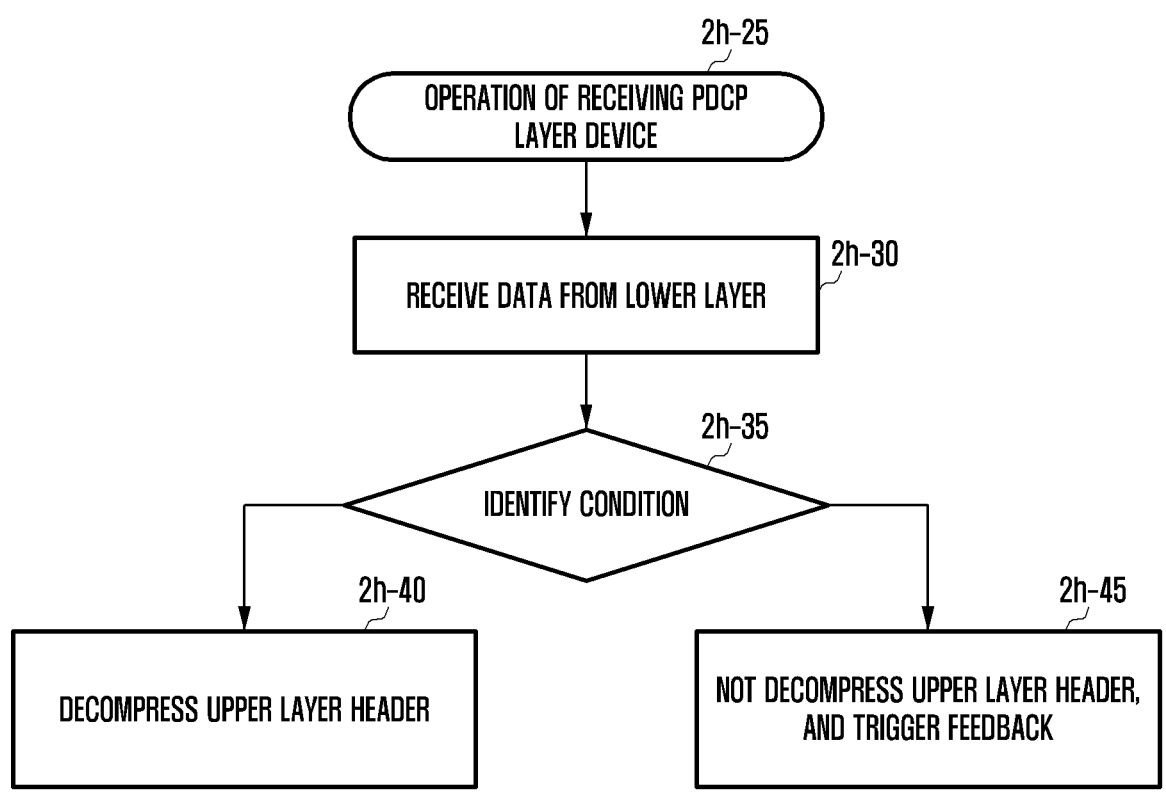

FIG. 2HA and FIG. 2HB are diagrams illustrating the operation of a transmission PDCP layer device or a reception PDCP layer device of a terminal or a base station according to an embodiment of the disclosure.

Referring to FIG. 2HA, in a case where an upper layer header compression protocol (an Ethernet header compression method; EthHC) is configured for a transmission PDCP layer device (2h-01) according to an embodiment of the disclosure, if data received from an upper layer (2h-05) is data which is firstly received after the Ethernet header compression method is configured; if any one of the field values of compressible fields among the fields of an Ethernet header of data received from an upper layer is different from those stored in a buffer of the transmission PDCP layer device (or different from the field values of a previously transmitted Ethernet header); or if a feedback indicating that data having a previously transmitted and non-compressed whole upper layer header (Ethernet header) has successfully been received has not been received from a reception PDCP layer device yet (2h-10), the transmission PDCP layer device may not perform an Ethernet header compression until a feedback indicating that a non-compressed whole upper layer header (Ethernet header) has successfully been received is received from the reception PDCP layer device (2h-20). If a feedback indicating that data having a previously transmitted and non-compressed whole upper layer header (Ethernet header) has successfully been received has been received from the reception PDCP layer device (2h-10), the transmission PDCP layer device may apply the Ethernet header compression method on data received from an upper layer to compress the data (2h-15).

Referring to FIG. 2HB, in a case where an Ethernet header compression protocol is configured for a reception PDCP layer device (2h-25) according to an embodiment of the disclosure, when the reception PDCP layer device has received data from a lower layer (2h-30), and there is a compressed Ethernet header therein (an indicator of a new EHC header is identified, and indicates that an Ethernet header has been compressed) (2h-35), the reception PDCP layer device decompresses the Ethernet header of the data (2h-40). On the contrary, if an Ethernet header compression protocol has been configured, and an Ethernet header has not been compressed (an indicator of a new EHC header is identified, and indicates that an Ethernet header has not been compressed) (2h-35), the reception PDCP layer device may regard the Ethernet header of the data as a non-compressed header, and may not decompress the Ethernet header. The non-compressed Ethernet header has successfully been received, and thus the reception PDCP layer device triggers a feedback, configure the feedback, and transmit the feedback to the transmission PDCP layer device so as to indicate the successful reception to the transmission PDCP layer device (2h-45).

Figure 2I:
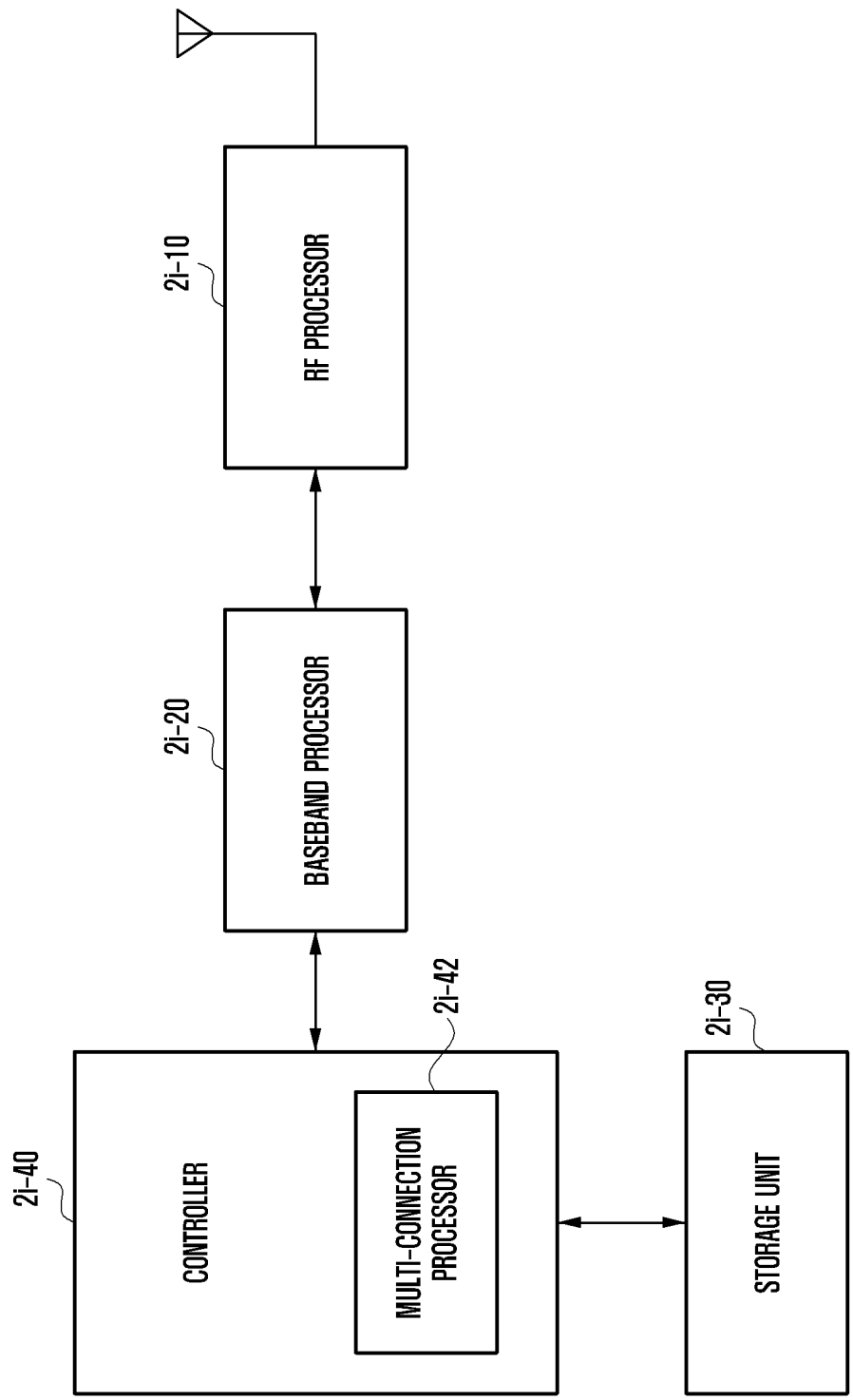
FIG. 2I is a diagram showing a structure of a terminal according to an embodiment of the disclosure.

FIG. 2I illustrates a structure of a terminal according to an embodiment of the disclosure.

Referring to FIG. 2I, the terminal includes a radio frequency (RF) processor 2i-10, a baseband processor 2i-20, a storage unit 2i-30, and a controller 2i-40.

The RF processor 2*i*-10 performs a function, such as signal band change, amplification, etc., for transmitting or receiving a signal through a wireless channel. That is, the RF processor 2*i*-10 upconverts a baseband signal provided from the baseband processor 2*i*-20, into an RF band signal, and then transmits the RF band signal through an antenna, and downconverts an RF band signal received through the antenna, into a baseband signal. For example, the RF processor 2*i*-10 may include a transmission filter, a reception filter, an amplifier, a mixer, an oscillator, a digital-to-analog converter (DAC), an analog-to-digital converter (ADC), and the like. In FIG. 2I, only one antenna is illustrated, but the terminal may include a plurality of antennas. In addition, the RF processor 2*i*-10 may include a plurality of RF chains. Moreover, the RF processor 2*i*-10 may perform beamforming. To perform beamforming, the RF processor 2*i*-10 may adjust the phase and size of each of signals transmitted or received through a plurality of antennas or antenna elements. In addition, the RF processor may perform MIMO, and may receive several layers when a MIMO operation is performed. The RF processor 2*i*-10 may properly configure a plurality of antennas or antenna elements according to a control of the controller to perform reception beam sweeping or adjust the direction and the beam width of a reception beam to be in conjunction with a transmission beam.

The baseband processor 2*i*-20 performs a function of conversion between a baseband signal and a bit stream according to a physical layer protocol of a system. For example, when data is transmitted, the baseband processor 2*i*-20 generates complex symbols by encoding and modulating a transmission bit stream. In addition, when data is received, the baseband processor 2*i*-20 reconstructs a reception bit stream by demodulating and decoding a baseband signal provided from the RF processor 2*i*-10. For example, in a case where an orthogonal frequency division multiplexing (OFDM) scheme is applied, when data is transmitted, the baseband processor 2*i*-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 2*i*-20 divides a baseband signal provided from the RF processor 2*i*-10, by the units of OFDM symbols, reconstructs signals mapped to subcarriers, through fast Fourier transform (FFT) calculation, and then reconstructs a reception bit stream through demodulation and decoding.

The baseband processor 2*i*-20 and the RF processor 2*i*-10 transmit and receive a signal as described above. Accordingly, the baseband processor 2*i*-20 and the RF processor 2*i*-10 may be called a transmitter, a receiver, a transceiver, or a communication unit. Furthermore, at least one of the baseband processor 2*i*-20 and the RF processor 2*i*-10 may include a plurality of communication modules to support a plurality of different wireless access technologies. In addition, at least one of the baseband processor 2*i*-20 and the RF processor 2*i*-10 may include different communication modules to process signals in different frequency bands. For example, different wireless access technologies may include LTE network, NR network, etc. In addition, different frequency bands may include a super high frequency (SHF) (e.g., 2.5 GHz and 5 GHz) band, and a millimeter (mm) wave (e.g., 60 GHz) band.

The storage unit 2*i*-30 stores data such as a basic program, an application program, and configuration information for an operation of the terminal. The storage unit 2*i*-30 provides stored data in response to a request of the controller 2*i*-40.

The controller 2*i*-40 controls overall operations of the terminal. For example, the controller 2*i*-40 transmits or receives a signal through the baseband processor 2*i*-20 and the RF processor 2*i*-10. Furthermore, the controller 2*i*-40 records and reads data in and from the storage unit 2*i*-40. To this end, the controller 2*i*-40 may include at least one processor. For example, the controller 2*i*-40 may include a communication processor (CP) performing a control for communication, and an application processor (AP) controlling a higher layer, such as an application program.

Figure 2J:
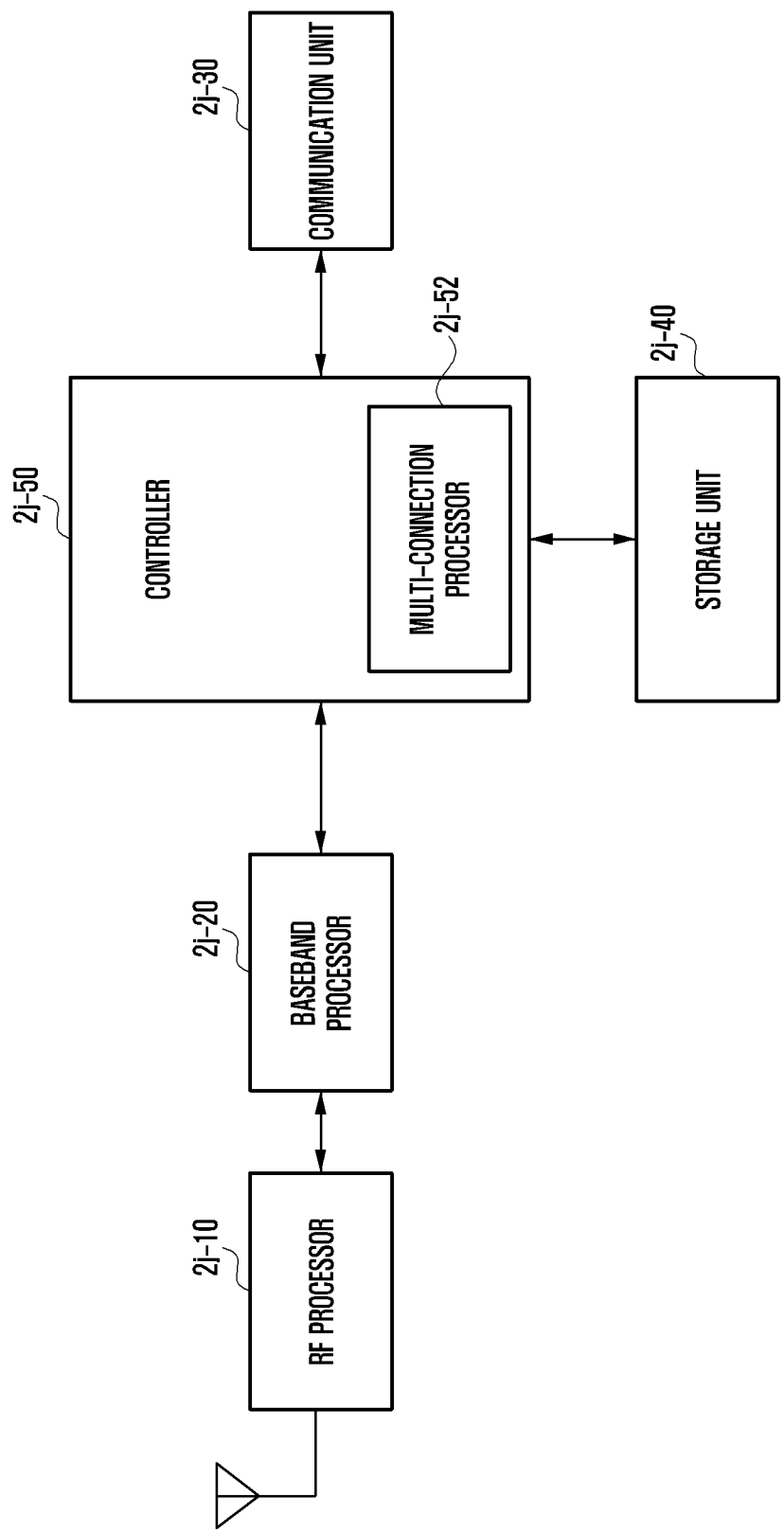
FIG. 2J is a diagram illustrating a block configuration of a TRP in a wireless communication system according to an embodiment of the disclosure.

FIG. 2J illustrates a block configuration of a transmission reception point (TRP) in a wireless communication system according to an embodiment of the disclosure.

Referring to FIG. 2J, in an embodiment of the disclosure, the TRP may imply a base station. The base station includes an RF processor 2*j*-10, a baseband processor 2*j*-20, a backhaul communication unit 2*j*-30, a storage unit 2*j*-40, and a controller 2*j*-50.

The RF processor 2*j*-10 performs a function, such as signal band change, amplification, etc., for transmitting or receiving a signal through a wireless channel. That is, the RF processor 2*j*-10 upconverts a baseband signal provided from the baseband processor 2*j*-20, into an RF band signal, and then transmits the RF band signal through an antenna, and downconverts an RF band signal received through the antenna, into a baseband signal. For example, the RF processor 2*j*-10 may include a transmission filter, a reception filter, an amplifier, a mixer, an oscillator, a digital-to-analog converter (DAC), an analog-to-digital converter (ADC), and the like. In FIG. 2J, only one antenna is illustrated, but the first access node may include a plurality of antennas. In addition, the RF processor 2*j*-10 may include a plurality of RF chains. Moreover, the RF processor 2*j*-10 may perform beamforming. To perform beamforming, the RF processor 2*j*-10 may adjust the phase and size of each of signals transmitted or received through a plurality of antennas or antenna elements. The RF processor may perform a downlink MIMO operation by transmitting at least one layer.

The baseband processor 2*j*-20 performs a function of conversion between a baseband signal and a bit stream according to a physical layer protocol of a system. For example, when data is transmitted, the baseband processor 2*j*-20 generates complex symbols by encoding and modulating a transmission bit stream. In addition, when data is received, the baseband processor 2*j*-20 reconstructs a reception bit stream by demodulating and decoding a baseband signal provided from the RF processor 2*j*-10. For example, in a case where an orthogonal frequency division multiplexing (OFDM) scheme is applied, when data is transmitted, the baseband processor 2*j*-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 2*j*-20 divides a baseband signal provided from the RF processor 2*j*-10, by the units of OFDM symbols, reconstructs signals mapped to subcarriers, through FFT calculation, and then reconstructs a reception bit stream through demodulation and decoding. The baseband processor 2*j*-20 and the RF processor 2*j*-10 transmit and receive a signal as described above. Accordingly, the baseband processor 2*j*-20 and the RF processor 2*j*-10 may be called a transmitter, a receiver, a transceiver, a communication unit, or a wireless communication unit.

The communication unit 2j-30 provides an interface for performing communication with other nodes within a network.

The storage unit 2j-40 stores data such as a basic program, an application program, and configuration information for an operation of the main base station. Particularly, the storage unit 2j-40 may store information relating to a bearer assigned to a connected terminal, a measurement result reported from a connected terminal, etc. In addition, the storage unit 2j-40 may store information serving as a determination criterion of whether to provide or stop providing multi-connection to a terminal. The storage unit 2j-40 provides stored data in response to a request of the controller 2j-50.

The controller 2j-50 controls overall operations of the main base station. For example, the controller 2j-50 transmits or receives a signal through the baseband processor 2j-20 and the RF processor 2j-10, or through the backhaul communication unit 2j-30. Further, the controller 2j-50 records and reads data in and from the storage unit 2j-40. To this end, the controller 2j-50 may include at least one processor.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, the embodiments of the disclosure may be partially combined to operate a base station and a terminal. As an example, the methods proposed in the disclosure may be partially combined to operate a base station and a terminal. Further, although the above embodiments have been described by way of the FDD LTE system, other variants based on the technical idea of the embodiments may be implemented in other systems such as TDD LTE, 5G, or NR systems.

The invention claimed is:

1. A method performed by a transmitting device in a wireless communication system, the method comprising:
   obtaining, by a packet data convergence protocol (PDCP) layer, from an upper layer, a PDCP service data unit (SDU), the PDCP SDU including a payload;
   performing, by the PDCP layer, an ethernet header compression (EHC) on an ethernet header included in the payload, wherein a robust header compression (ROHC) and the EHC are configured for the PDCP layer associated with a data radio bearer (DRB) by a higher layer;
   performing, by the PDCP layer, the ROHC on a transmission control protocol/internet protocol (TCP/IP) header included in the payload;
   generating, by the PDCP layer, a PDCP protocol data unit (PDU), by placing an EHC header in front of a ROHC header, and by placing the ROHC header in front of the payload performed the EHC and the ROHC in the PDCP PDU; and
   delivering, by the PDCP layer to a lower layer, the PDCP PDU.

2. The method of claim 1, wherein the EHC header includes information indicating that the ethernet header has been compressed.

3. The method of claim 1,
   wherein a destination address field, a source address field, and a type field of the ethernet header are removed by the EHC, and
   wherein a preamble field, a start of frame delimiter (SDF) field, and a frame checksum (FCS) field of the ethernet header are not transmitted to a receiving device.

4. The method of claim 1, wherein the EHC is not applied to a service data adaptation protocol (SDAP) header included in the PDCP SDU.

5. A method performed by a receiving device in a wireless communication system, the method comprising:
   obtaining, by a packet data convergence protocol (PDCP) layer, from a lower layer, a PDCP protocol data unit (PDU);
   identifying, by the PDCP layer, an ethernet header compression (EHC) header, a robust header compression (ROHC) header, and a payload included in the PDCP PDU;
   performing, by the PDCP layer, an ethernet header decompression for an ethernet header included in the payload based on the EHC header; and performing, by the PDCP layer, an ethernet header decompression for a compressed transmission control protocol/internet protocol (TCP/IP) header included in the payload, wherein a robust header decompression and the Ethernet header decompression are configured for the PDCP layer associated with a data radio bearer (DRB) by a higher layer, wherein the EHC header is placed in front of the PDU ROHC header, and wherein the ROHC header is placed in front of the payload performed an EHC and an ROHC in the PDCP PDU.

6. The method of claim 5, wherein the EHC header includes information indicating that the ethernet header has been compressed.

7. The method of claim 5, wherein a destination address field, a source address field, and a type field of the ethernet header are removed by an EHC, and wherein a preamble field, a start of frame delimiter (SDF) field, and a frame checksum (FCS) field, of the ethernet header are not received from a transmitting device.

8. The method of claim 5, wherein the ethernet header decompression is not applied to a service data adaptation protocol (SDAP) header included in the PDCP PDU.

9. A transmitting device in a wireless communication system, the transmitting device comprising:

a transceiver configured to transmit or receive a signal; and a controller coupled with the transceiver and configured to:

obtain, by a packet data convergence protocol (PDCP) layer, from an upper layer, a PDCP service data unit (SDU), the PDCP SDU including a payload, perform, by the PDCP layer, an ethernet header compression (EHC) on an ethernet header included in payload, wherein a robust header compression (ROHC) and the EHC are configured for the PDCP layer associated with a data radio bearer (DRB) by a higher layer, perform, by the PDCP layer, the ROHC on a transmission control protocol/internet protocol (TCP/IP) header included in the payload, generate, by the PDCP layer, a PDCP protocol data unit (PDU), by placing an EHC header in front of a ROHC header, and by placing the ROHC header in front of the payload performed the EHC and the ROHC in the PDCP PDU, and deliver, by the PDCP layer to a lower layer, the PDCP PDU.

10. The transmitting device of claim 9, wherein the EHC header includes information indicating that the ethernet header has been compressed.

11. The transmitting device of claim 9, wherein a destination address field, a source address field, and a type field of the ethernet header are removed by the EHC, and wherein a preamble field, a start of frame delimiter (SDF) field, and a frame checksum (FCS) field of the ethernet header are not transmitted to a receiving device.

12. The transmitting device of claim 9, wherein the EHC is not applied to a service data adaptation protocol (SDAP) header included in the PDCP SDU.

13. A receiving device in a wireless communication system, the receiving device comprising:

a transceiver configured to transmit or receive a signal; and a controller coupled with the transceiver and configured to:

obtain, by a packet data convergence protocol (PDCP) layer, from a lower layer, a PDCP protocol data unit (PDU), identify, by the PDCP layer, an ethernet header compression (EHC) header, a robust header compression (ROHC) header, and a payload included in the PDCP PDU, perform, by the PDCP layer, an ethernet header decompression for an ethernet header included in the payload based on the EHC header, and perform, by the PDCP layer, an ethernet header decompression for a compressed transmission control protocol/internet protocol (TCP/IP) header included in the payload, wherein a robust header decompression and the Ethernet header decompression are configured for the PDCP layer associated with a data radio bearer (DRB) by a higher layer, wherein the EHC header is placed in front of the ROHC header, and wherein the ROHC header is placed in front of the payload performed an EHC and an ROHC in the PDCP PDU.

14. The receiving device of claim 13, wherein the EHC header includes information indicating that the ethernet header has been compressed.

15. The receiving device of claim 13, wherein a destination address field, a source address field, and a type field of the ethernet header are removed by an EHC, and wherein a preamble field, a start of frame delimiter (SDF) field, and a frame checksum (FCS) field, of the ethernet header are not received from a transmitting device.

16. The receiving device of claim 13, wherein the ethernet header decompression is not applied to a service data adaptation protocol (SDAP) header included in the PDCP PDU.

\* \* \* \* \*